United States Patent
Marlin et al.

(10) Patent No.: US 12,129,422 B2
(45) Date of Patent: Oct. 29, 2024

(54) ABRASIVE ARTICLES AND METHODS OF FORMING SAME

(71) Applicant: SAINT-GOBAIN CERAMICS & PLASTICS, INC., Worcester, MA (US)

(72) Inventors: Samuel S. Marlin, Plan d'Orgon (FR); Ralph Bauer, Niagara Falls (CA); Stefan Vujcic, Buffalo, NY (US); Paul W. Rehrig, Sterling, MA (US); Marie-Camille Auscher, Shrewsbury, MA (US); Mark Hampden-Smith, Chelmsford, MA (US); Brahmanandam V. Tanikella, Northborough, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 124 days.

(21) Appl. No.: 17/132,138

(22) Filed: Dec. 23, 2020

(65) Prior Publication Data
US 2021/0198544 A1 Jul. 1, 2021

Related U.S. Application Data

(60) Provisional application No. 62/954,293, filed on Dec. 27, 2019.

(51) Int. Cl.
*C09K 3/14* (2006.01)
*B24D 18/00* (2006.01)

(52) U.S. Cl.
CPC ........ *C09K 3/1427* (2013.01); *B24D 18/0063* (2013.01)

(58) Field of Classification Search
CPC ............. C09K 3/1427; B24D 18/0063
See application file for complete search history.

(56) References Cited

U.S. PATENT DOCUMENTS

| 345,604 A | 7/1886 | Semper |
|---|---|---|
| 1,910,444 A | 5/1933 | Nicholson |
| (Continued) | | |

FOREIGN PATENT DOCUMENTS

| CA | 743715 A | 10/1966 |
|---|---|---|
| CA | 2423788 A1 | 7/2002 |
| (Continued) | | |

OTHER PUBLICATIONS

Torre, "Investigation of Shaped Abrasive Particles vol. 1: Review of U.S. Pat. No. 6,054,093 Apr. 25, 2000" @ Apr. 2011.
(Continued)

*Primary Examiner* — Pegah Parvini
(74) *Attorney, Agent, or Firm* — Abel Schillinger, LLP; Adrian Lawrence

(57) ABSTRACT

A coated abrasive article comprising a substrate and a plurality of abrasive particles having an average solidity of at least 0.87 and less than 0.97, wherein each of the abrasive particles of the plurality of abrasive particles comprises a body and striations extending along an exterior surface of the body in a direction of a length of the body. Further directed to a plurality of extruded shaped abrasive particles comprising an average solidity of at least 0.87.

22 Claims, 13 Drawing Sheets

(56) References Cited

U.S. PATENT DOCUMENTS

| | | |
|---|---|---|
| 2,033,991 A | 3/1936 | Melton et al. |
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Bennet et al. |
| 2,376,343 A | 5/1945 | Carlton |
| 2,563,650 A | 8/1951 | Heinemann |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. et al. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,808,747 A | 5/1974 | Kenagy |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda et al. |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | deKok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,000,760 A | 3/1991 | Ohtsubo et al. |
| 5,008,222 A | 4/1991 | Kameda |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,165 A | 9/1991 | Tselesin |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,177,910 A * | 1/1993 | Norota .................. B24D 11/02 |
| | | 451/529 |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |

(56) References Cited

U.S. PATENT DOCUMENTS

| | | |
|---|---|---|
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson et al. |
| 5,496,386 A | 3/1996 | Broberg et al. |
| 5,498,268 A | 3/1996 | Gagliardi et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman et al. |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,039,775 A | 3/2000 | Ho et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,398,989 B1 | 6/2002 | Bergstrom |
| 6,401,795 B1 | 6/2002 | Cesarano, III et al. |
| 6,403,001 B1 | 6/2002 | Hayashi |
| 6,406,200 B2 | 6/2002 | Mahoney |
| 6,413,286 B1 | 7/2002 | Swei et al. |
| 6,428,392 B1 | 8/2002 | Sunahara et al. |
| 6,451,076 B1 | 9/2002 | Nevoret et al. |
| 6,475,253 B2 | 11/2002 | Culler et al. |

(56) References Cited

U.S. PATENT DOCUMENTS

| | | |
|---|---|---|
| 6,500,493 B2 | 12/2002 | Swei et al. |
| 6,511,938 B1 | 1/2003 | Liu |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,750,173 B2 | 6/2004 | Rizkalla |
| 6,752,700 B2 | 6/2004 | Duescher |
| 6,755,729 B2 | 6/2004 | Ramanath et al. |
| 6,802,878 B1 | 10/2004 | Monroe |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,951,504 B2 | 10/2005 | Adefris et al. |
| 6,974,930 B2 | 12/2005 | Jense |
| 7,022,179 B1 | 4/2006 | Dry |
| 7,044,989 B2 | 5/2006 | Welygan et al. |
| 7,112,621 B2 | 9/2006 | Rohrbaugh et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,604 B2 | 9/2007 | Yoshizawa et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,404,832 B2 | 7/2008 | Ohtsubo et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,632,434 B2 | 12/2009 | Duescher |
| 7,651,386 B2 | 1/2010 | Sung |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,333,360 B2 | 12/2012 | Rule et al. |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 * | 6/2013 | Gonzales ............ C11D 17/0013 510/130 |
| 8,480,772 B2 | 7/2013 | Welygan et al. |
| 8,530,682 B2 | 9/2013 | Sachs |
| 8,568,497 B2 | 10/2013 | Sheridan |
| 8,628,597 B2 | 1/2014 | Palmgren et al. |
| 8,703,685 B2 * | 4/2014 | Gonzales ............ C11D 3/3715 510/132 |
| 8,783,589 B2 | 7/2014 | Hart et al. |
| 8,852,643 B2 | 10/2014 | Gonzales et al. |
| 8,920,527 B2 | 12/2014 | Seider et al. |
| 8,921,687 B1 | 12/2014 | Welser |
| 9,017,439 B2 | 4/2015 | Yener et al. |
| 9,079,154 B2 | 7/2015 | Rosendahl |
| 9,163,200 B2 * | 10/2015 | Gonzales ................ A61K 8/025 |
| 9,181,477 B2 | 11/2015 | Collins et al. |
| 9,211,634 B2 | 12/2015 | Rehrig et al. |
| 9,259,726 B2 | 2/2016 | Gopal |
| 9,375,826 B2 | 6/2016 | Tian et al. |
| 9,540,593 B2 * | 1/2017 | Gonzales ............ C11D 17/049 |
| 9,540,594 B2 * | 1/2017 | Gonzales ................ C11D 3/37 |
| 9,616,002 B2 * | 4/2017 | Gonzales ................ A61Q 19/10 |
| 9,675,531 B2 * | 6/2017 | Gonzales ............ A61K 8/8117 |
| 9,717,674 B1 * | 8/2017 | Guskey ................ A61Q 5/006 |
| 9,758,724 B2 | 9/2017 | Collins et al. |
| 9,982,175 B2 | 5/2018 | Sarangi et al. |
| D849,066 S | 5/2019 | Hanschen et al. |
| D849,067 S | 5/2019 | Hanschen et al. |
| 10,351,745 B2 | 7/2019 | Josseaux et al. |
| 10,364,383 B2 | 7/2019 | Yener et al. |
| D862,538 S | 10/2019 | Hanschen et al. |
| D870,782 S | 12/2019 | Hanschen et al. |
| 10,556,323 B2 | 2/2020 | Alkhas et al. |
| 10,557,068 B2 | 2/2020 | Oldenkotte et al. |
| 10,563,105 B2 | 2/2020 | Cotter et al. |
| 10,655,038 B2 | 5/2020 | Martinez et al. |
| 10,710,211 B2 | 7/2020 | Lehuu et al. |
| 10,717,908 B2 | 7/2020 | Hejtmann et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2003/0228738 A1 | 12/2003 | Beaudoin |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |

(56) References Cited

U.S. PATENT DOCUMENTS

| | | |
|---|---|---|
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0011951 A1 | 1/2007 | Gaeta et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0072500 A1 | 3/2008 | Klett et al. |
| 2008/0098659 A1 | 5/2008 | Sung |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0233845 A1 | 9/2008 | Annen et al. |
| 2008/0262577 A1 | 10/2008 | Altshuler et al. |
| 2008/0271384 A1 | 11/2008 | Puthanangady et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017276 A1 | 1/2009 | Hoglund et al. |
| 2009/0017736 A1 | 1/2009 | Block et al. |
| 2009/0098365 A1 | 4/2009 | Moeltgen |
| 2009/0165394 A1 | 7/2009 | Culler et al. |
| 2009/0165661 A1 | 7/2009 | Koenig et al. |
| 2009/0169816 A1 | 7/2009 | Erickson et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0064594 A1 | 3/2010 | Pakalapati et al. |
| 2010/0068974 A1 | 3/2010 | Dumm et al. |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2010/0330886 A1 | 12/2010 | Wu et al. |
| 2011/0008604 A1 | 1/2011 | Boylan |
| 2011/0081848 A1 | 4/2011 | Chen |
| 2011/0092137 A1 | 4/2011 | Ohishi et al. |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0152548 A1 | 6/2011 | Sachs et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0100366 A1 | 4/2012 | Dumm et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2012/0321567 A1* | 12/2012 | Gonzales ............ C11D 3/3726 510/121 |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0212952 A1 | 8/2013 | Welygan et al. |
| 2013/0236725 A1 | 9/2013 | Yener et al. |
| 2013/0255162 A1 | 10/2013 | Welygan et al. |
| 2013/0260656 A1 | 10/2013 | Seth et al. |
| 2013/0267150 A1 | 10/2013 | Seider et al. |
| 2013/0283705 A1 | 10/2013 | Fischer et al. |
| 2013/0296587 A1 | 11/2013 | Rosendahl |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0107356 A1 | 4/2014 | Gopal et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0256238 A1 | 9/2014 | Van et al. |
| 2014/0287658 A1 | 9/2014 | Flaschberger et al. |
| 2014/0290147 A1 | 10/2014 | Seth et al. |
| 2014/0325917 A1 | 11/2014 | Czerepinski et al. |
| 2014/0345204 A1 | 11/2014 | Wang et al. |
| 2014/0345205 A1 | 11/2014 | Kavanaugh et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0068130 A1 | 3/2015 | Louapre et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0209932 A1 | 7/2015 | Lehuu et al. |
| 2015/0218430 A1 | 8/2015 | Yener et al. |
| 2015/0231042 A1† | 8/2015 | Gonzales |
| 2015/0232727 A1 | 8/2015 | Erickson |
| 2015/0267099 A1 | 9/2015 | Panzarella et al. |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0000292 A1† | 1/2016 | Calderas |
| 2016/0053151 A1 | 2/2016 | Bauer et al. |
| 2016/0090516 A1 | 3/2016 | Yener et al. |
| 2016/0107290 A1 | 4/2016 | Bajaj et al. |
| 2016/0177152 A1 | 6/2016 | Braun |

(56) References Cited

U.S. PATENT DOCUMENTS

| | | |
|---|---|---|
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0289520 A1 | 10/2016 | Bujnowski et al. |
| 2016/0289521 A1 | 10/2016 | Colet et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2016/0375556 A1 | 12/2016 | Seth et al. |
| 2017/0015886 A1 | 1/2017 | Czerepinski et al. |
| 2017/0028531 A1 | 2/2017 | Gaeta et al. |
| 2017/0050293 A1 | 2/2017 | Gaeta et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2017/0145274 A1 | 5/2017 | Yener et al. |
| 2017/0158930 A1 | 6/2017 | Iyengar |
| 2017/0225299 A1 | 8/2017 | Keipert et al. |
| 2017/0247592 A1 | 8/2017 | Bauer et al. |
| 2017/0312190 A1† | 11/2017 | Gonazales |
| 2017/0335155 A1 | 11/2017 | Czerepinski et al. |
| 2017/0335156 A1 | 11/2017 | Bauer et al. |
| 2017/0342303 A1 | 11/2017 | Stevenson et al. |
| 2017/0349797 A1 | 12/2017 | Yener et al. |
| 2018/0002584 A1 | 1/2018 | Yener et al. |
| 2018/0086957 A1 | 3/2018 | Sahlin et al. |
| 2018/0098679 A1* | 4/2018 | Gonzales .............. C08J 9/122 |
| 2018/0155592 A1 | 6/2018 | Josseaux et al. |
| 2018/0161960 A1 | 6/2018 | Wilson et al. |
| 2018/0169837 A1 | 6/2018 | Liu |
| 2018/0187057 A1 | 7/2018 | Bujnowski et al. |
| 2018/0215975 A1 | 8/2018 | Marazano et al. |
| 2018/0215976 A1 | 8/2018 | Cotter et al. |
| 2018/0237675 A1 | 8/2018 | Yener et al. |
| 2018/0318983 A1 | 11/2018 | Wilson et al. |
| 2018/0327644 A1 | 11/2018 | Bauer et al. |
| 2018/0370857 A1 | 12/2018 | Marlin et al. |
| 2019/0022826 A1 | 1/2019 | Franke et al. |
| 2019/0030684 A1 | 1/2019 | Van et al. |
| 2019/0091835 A1 | 3/2019 | Culler et al. |
| 2019/0119540 A1 | 4/2019 | Colet et al. |
| 2019/0126436 A1 | 5/2019 | Westberg et al. |
| 2019/0160630 A1 | 5/2019 | Jiang et al. |
| 2019/0217442 A1 | 7/2019 | Gaeta et al. |
| 2019/0249052 A1 | 8/2019 | Eckel et al. |
| 2019/0270182 A1 | 9/2019 | Eckel et al. |
| 2019/0284461 A1 | 9/2019 | Josseaux et al. |
| 2019/0309201 A1 | 10/2019 | Dumont et al. |
| 2019/0322915 A1 | 10/2019 | Jiwpanich et al. |
| 2019/0330505 A1 | 10/2019 | Bujnowski et al. |
| 2019/0337124 A1 | 11/2019 | Liu et al. |
| 2019/0338172 A1 | 11/2019 | Erickson et al. |
| 2019/0338173 A1 | 11/2019 | Yener et al. |
| 2019/0351531 A1 | 11/2019 | Nelson et al. |
| 2019/0358776 A1 | 11/2019 | Seth et al. |
| 2019/0366511 A1 | 12/2019 | Huber |
| 2019/0382637 A1 | 12/2019 | Braun et al. |
| 2020/0139512 A1 | 5/2020 | Culler et al. |
| 2020/0148927 A1 | 5/2020 | Arcona et al. |
| 2020/0156215 A1 | 5/2020 | Jusuf et al. |
| 2020/0157396 A1 | 5/2020 | Cotter et al. |
| 2020/0157397 A1 | 5/2020 | Stevenson et al. |
| 2020/0199426 A1 | 6/2020 | Yener et al. |
| 2020/0262031 A1 | 8/2020 | Seth et al. |
| 2020/0308462 A1 | 10/2020 | Bauer et al. |
| 2020/0391354 A1 | 12/2020 | Marazano et al. |
| 2021/0024798 A1 | 1/2021 | Czerepinski et al. |
| 2021/0087444 A1 | 3/2021 | Stevenson et al. |
| 2021/0087445 A1 | 3/2021 | Cotter et al. |
| 2021/0108117 A1 | 4/2021 | Bauer et al. |
| 2021/0108118 A1 | 4/2021 | Yener et al. |
| 2021/0130667 A1 | 5/2021 | Arcona et al. |
| 2021/0197339 A1 | 7/2021 | Marlin et al. |
| 2021/0198544 A1 | 7/2021 | Marlin et al. |
| 2021/0198545 A1 | 7/2021 | Marlin et al. |
| 2021/0332278 A1 | 10/2021 | Iyengar |
| 2021/0395587 A1 | 12/2021 | Yener et al. |
| 2022/0001512 A1 | 1/2022 | Gaeta et al. |
| 2022/0025237 A1 | 1/2022 | Sahlin et al. |
| 2023/0065541 A1 | 3/2023 | Colet et al. |
| 2023/0096577 A1 | 3/2023 | Cotter et al. |
| 2023/0135441 A1 | 5/2023 | Seth et al. |
| 2023/0193100 A1 | 6/2023 | Josseaux et al. |
| 2023/0211466 A1 | 7/2023 | Martone et al. |
| 2023/0211467 A1 | 7/2023 | Martone et al. |
| 2023/0211468 A1 | 7/2023 | Martone et al. |
| 2023/0220255 A1 | 7/2023 | Yuyang et al. |
| 2023/0220256 A1 | 7/2023 | Bujnowski et al. |
| 2023/0265326 A1 | 8/2023 | Adefris |
| 2023/0272254 A1 | 8/2023 | Yener et al. |
| 2023/0294247 A1 | 9/2023 | Liu et al. |
| 2023/0332030 A1 | 10/2023 | Bauer et al. |

FOREIGN PATENT DOCUMENTS

| | | |
|---|---|---|
| CH | 685051 A5 | 3/1995 |
| CN | 1229007 A | 7/2005 |
| CN | 1774488 A | 5/2006 |
| CN | 101389466 A | 3/2009 |
| CN | 101970347 A | 2/2011 |
| CN | 101980836 A | 2/2011 |
| CN | 102281992 A | 12/2011 |
| CN | 103189164 A | 7/2013 |
| CN | 103842132 A | 6/2014 |
| CN | 102123837 B | 7/2014 |
| CN | 104125875 A | 10/2014 |
| CN | 104994995 A | 10/2015 |
| CN | 105622071 A | 6/2016 |
| CN | 105713568 A | 6/2016 |
| DE | 3923671 C2 | 2/1998 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A2 | 8/1985 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B1 | 7/2001 |
| EP | 0833803 | 8/2001 |
| EP | 1207015 A2 | 5/2002 |

(56) References Cited

FOREIGN PATENT DOCUMENTS

| | | |
|---|---|---|
| EP | 1356152 A2 | 10/2003 |
| EP | 1371451 A1 | 12/2003 |
| EP | 1383631 A1 | 1/2004 |
| EP | 1015181 B1 | 3/2004 |
| EP | 1492845 A1 | 1/2005 |
| EP | 1851007 | 11/2007 |
| EP | 1960157 A1 | 8/2008 |
| EP | 2176031 A1 | 4/2010 |
| EP | 2184134 A1 | 5/2010 |
| EP | 2242618 A2 | 10/2010 |
| EP | 2390056 A2 | 11/2011 |
| EP | 1800801 B1 | 3/2012 |
| EP | 2445982 A2 | 5/2012 |
| EP | 2507016 A2 | 10/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2012972 B1 | 6/2014 |
| EP | 2720676 B1 | 1/2018 |
| EP | 3319758 A1 | 5/2018 |
| EP | 3342839 A1 | 7/2018 |
| EP | 3444313 B1 | 7/2020 |
| EP | 3830211 A1 | 6/2021 |
| FR | 2354373 A1 | 1/1978 |
| GB | 986847 A | 3/1965 |
| GB | 1456765 A | 11/1976 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 03079277 A | 4/1991 |
| JP | 03-287687 | 12/1991 |
| JP | 05285833 A | 11/1993 |
| JP | 06114739 A | 4/1994 |
| JP | 07008474 B2 | 2/1995 |
| JP | 3030861 U | 8/1996 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 3194269 B2 | 7/2001 |
| JP | 2001180930 A | 7/2001 |
| JP | 2001207160 A | 7/2001 |
| JP | 2001516652 A | 10/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006130586 A | 5/2006 |
| JP | 2006130636 A | 5/2006 |
| JP | 2006159402 A | 6/2006 |
| JP | 2006-192540 A | 7/2006 |
| JP | 2006224201 A | 8/2006 |
| JP | 2007-537891 A | 12/2007 |
| JP | 2008132560 A | 6/2008 |
| JP | 2008194761 A | 8/2008 |
| JP | 2008531305 A | 8/2008 |
| JP | 2012512046 A | 5/2012 |
| JP | 2012512047 A | 5/2012 |
| JP | 2012512048 A | 5/2012 |
| JP | 2012530615 A | 12/2012 |
| JP | 5238725 B2 | 7/2013 |
| JP | 5238726 B2 | 7/2013 |
| JP | 2014503367 A | 2/2014 |
| JP | 2017518889 A | 7/2017 |
| JP | 2017538588 A | 12/2017 |
| JP | 2018510073 A | 4/2018 |
| KR | 1019890014409 A | 10/1989 |
| KR | 1020020042840 A | 6/2002 |
| KR | 20140106713 A | 9/2014 |
| NL | 171464 B1 | 11/1982 |
| WO | 94/02559 A1 | 2/1994 |
| WO | 95/03370 | 2/1995 |
| WO | 1995016756 A1 | 6/1995 |
| WO | 1995017287 A1 | 6/1995 |
| WO | 95/18192 A1 | 7/1995 |
| WO | 95/20469 A1 | 8/1995 |
| WO | 1996012776 A1 | 5/1996 |
| WO | 1996014964 A1 | 5/1996 |
| WO | 96/27189 A1 | 9/1996 |
| WO | 9711484 A1 | 3/1997 |
| WO | 97/14536 A1 | 4/1997 |
| WO | 99/06500 A1 | 2/1999 |
| WO | 99/14016 A1 | 3/1999 |
| WO | 99/38817 A1 | 8/1999 |
| WO | 1999038817 A1 | 8/1999 |
| WO | 99/54424 A1 | 10/1999 |
| WO | 0064630 A1 | 11/2000 |
| WO | 0114494 A1 | 3/2001 |
| WO | 0123323 A1 | 4/2001 |
| WO | 02097150 A2 | 12/2002 |
| WO | 03087236 A1 | 10/2003 |
| WO | 2005080624 A1 | 9/2005 |
| WO | 2005112601 A2 | 12/2005 |
| WO | 2006027593 A3 | 3/2006 |
| WO | 2006062597 A1 | 6/2006 |
| WO | 2007041538 A1 | 4/2007 |
| WO | 2009085578 A2 | 7/2009 |
| WO | 2009085841 A2 | 7/2009 |
| WO | 2009098017 A1 | 8/2009 |
| WO | 2010077509 A1 | 7/2010 |
| WO | 2010085587 A1 | 7/2010 |
| WO | 2010118440 A2 | 10/2010 |
| WO | 2010151201 A1 | 12/2010 |
| WO | 2011005425 A1 | 1/2011 |
| WO | 2011019188 A1 | 2/2011 |
| WO | 2011068714 A2 | 6/2011 |
| WO | 2011068724 A2 | 6/2011 |
| WO | 2011087649 A2 | 7/2011 |
| WO | 2011109188 A2 | 9/2011 |
| WO | 2011133438 A1 | 10/2011 |
| WO | 2011139562 A2 | 11/2011 |
| WO | 2011149625 A2 | 12/2011 |
| WO | 2012018903 A2 | 2/2012 |
| WO | 2012061016 A1 | 5/2012 |
| WO | 2012061033 A2 | 5/2012 |
| WO | 2012092590 A2 | 7/2012 |
| WO | 2012092605 A3 | 7/2012 |
| WO | 2010070294 A1 | 8/2012 |
| WO | 2012112305 A2 | 8/2012 |
| WO | 2012112322 A2 | 8/2012 |
| WO | 2012092590 A3 | 10/2012 |
| WO | 2012140617 A1 | 10/2012 |
| WO | 2012141905 A2 | 10/2012 |
| WO | 2013003830 A2 | 1/2013 |
| WO | 2013003831 A2 | 1/2013 |
| WO | 2013009484 A2 | 1/2013 |
| WO | 2013036402 A1 | 3/2013 |
| WO | 2013040423 A1 | 3/2013 |
| WO | 2013045251 A1 | 4/2013 |
| WO | 2013049239 A1 | 4/2013 |
| WO | 2013070576 A2 | 5/2013 |
| WO | 2013101575 A1 | 7/2013 |
| WO | 2013102170 A1 | 7/2013 |
| WO | 2013102176 A1 | 7/2013 |
| WO | 2013102177 A1 | 7/2013 |

(56) References Cited

FOREIGN PATENT DOCUMENTS

| | | |
|---|---|---|
| WO | 2013106597 A1 | 7/2013 |
| WO | 2013106602 A1 | 7/2013 |
| WO | 2013149209 A1 | 10/2013 |
| WO | 2013151745 A1 | 10/2013 |
| WO | 2013177446 A1 | 11/2013 |
| WO | 2013186146 A1 | 12/2013 |
| WO | 2013188038 A1 | 12/2013 |
| WO | WO-2013187917 A1 * 12/2013 ........... A61K 8/0245 |  |
| WO | 2014005120 A1 | 1/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014161001 A1 | 2/2014 |
| WO | 2014057273 A1 | 4/2014 |
| WO | 2014062701 A1 | 4/2014 |
| WO | 2014070468 A1 | 5/2014 |
| WO | 2014106173 A1 | 7/2014 |
| WO | 2014106211 A1 | 7/2014 |
| WO | 2014124554 A1 | 8/2014 |
| WO | 2014137972 A1 | 9/2014 |
| WO | 2014140689 A1 | 9/2014 |
| WO | 2014165390 A1 | 10/2014 |
| WO | 2014176108 A1 | 10/2014 |
| WO | 2014206739 A1 | 12/2014 |
| WO | 2014206890 A1 | 12/2014 |
| WO | 2014206967 A1 | 12/2014 |
| WO | 2014209567 A1 | 12/2014 |
| WO | 2014210160 A1 | 12/2014 |
| WO | 2014210442 A1 | 12/2014 |
| WO | 2014210532 A1 | 12/2014 |
| WO | 2014210568 A1 | 12/2014 |
| WO | 2015050781 A1 | 4/2015 |
| WO | 2015073346 A1 | 5/2015 |
| WO | 2015048768 A9 | 6/2015 |
| WO | 2015088953 A1 | 6/2015 |
| WO | 2015089527 A1 | 6/2015 |
| WO | 2015089528 A1 | 6/2015 |
| WO | 2015089529 A1 | 6/2015 |
| WO | 2015100018 A1 | 7/2015 |
| WO | 2015100020 A1 | 7/2015 |
| WO | 2015100220 A1 | 7/2015 |
| WO | 2015102992 A1 | 7/2015 |
| WO | 2015112379 A1 | 7/2015 |
| WO | 2015130487 A1 | 9/2015 |
| WO | 2015143461 A1 | 10/2015 |
| WO | 2015158009 A1 | 10/2015 |
| WO | 2015160854 A1 | 10/2015 |
| WO | 2015160855 A1 | 10/2015 |
| WO | 2015160857 A1 | 10/2015 |
| WO | 2015164211 A1 | 10/2015 |
| WO | 2015165122 A1 | 11/2015 |
| WO | 2015167910 A1 | 11/2015 |
| WO | 2015179335 A1 | 11/2015 |
| WO | 2015180005 A1 | 12/2015 |
| WO | 2015184355 A1 | 12/2015 |
| WO | 2016028683 A1 | 2/2016 |
| WO | 2016044158 A1 | 3/2016 |
| WO | 2016064726 A1 | 4/2016 |
| WO | 2016089675 A1 | 6/2016 |
| WO | 2016105469 A1 | 6/2016 |
| WO | 2016105474 A1 | 6/2016 |
| WO | 2016160357 A1 | 10/2016 |
| WO | 2016161157 A1 | 10/2016 |
| WO | 2016161170 A1 | 10/2016 |
| WO | 2016167967 A1 | 10/2016 |
| WO | 2016187570 A1 | 11/2016 |
| WO | 2016196795 A1 | 12/2016 |
| WO | 2016201104 A1 | 12/2016 |
| WO | 2016205133 A1 | 12/2016 |
| WO | 2016205267 A1 | 12/2016 |
| WO | 2016210057 A1 | 12/2016 |
| WO | 2017007703 A1 | 1/2017 |
| WO | 2017007714 A1 | 1/2017 |
| WO | 2017062482 A1 | 4/2017 |
| WO | 2017083249 A1 | 5/2017 |
| WO | 2017083255 A1 | 5/2017 |
| WO | 2016105543 A9 | 9/2017 |
| WO | 2017151498 A1 | 9/2017 |
| WO | 2017197002 A1 | 11/2017 |
| WO | 2017197006 A1 | 11/2017 |
| WO | 2018010730 A2 | 1/2018 |
| WO | 2018026669 A1 | 2/2018 |
| WO | 2018057465 A1 | 3/2018 |
| WO | 2018057558 A1 | 3/2018 |
| WO | 2018063902 A1 | 4/2018 |
| WO | 2018063958 A1 | 4/2018 |
| WO | 2018063960 A1 | 4/2018 |
| WO | 2018063962 A1 | 4/2018 |
| WO | 2018064642 A1 | 4/2018 |
| WO | 2018080703 A1 | 5/2018 |
| WO | 2018080704 A1 | 5/2018 |
| WO | 2018080705 A1 | 5/2018 |
| WO | 2018080755 A1 | 5/2018 |
| WO | 2018080756 A1 | 5/2018 |
| WO | 2018080765 A1 | 5/2018 |
| WO | 2018080778 A1 | 5/2018 |
| WO | 2018080784 A1 | 5/2018 |
| WO | 2018081246 A1 | 5/2018 |
| WO | 2018118688 A1 | 6/2018 |
| WO | 2018118690 A1 | 6/2018 |
| WO | 2018118695 A1 | 6/2018 |
| WO | 2018118699 A1 | 6/2018 |
| WO | 2018134732 A1 | 7/2018 |
| WO | 2018136268 A1 | 7/2018 |
| WO | 2018136269 A1 | 7/2018 |
| WO | 2018136271 A1 | 7/2018 |
| WO | 2018172193 A1 | 9/2018 |
| WO | 2018207145 A1 | 11/2018 |
| WO | 2018226912 A1 | 12/2018 |
| WO | 2018236989 A1 | 12/2018 |
| WO | 2019001908 A1 | 1/2019 |
| WO | 2019069157 A1 | 4/2019 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2019108805 A2 | 6/2019 |
| WO | 2021161129 A1 | 8/2019 |
| WO | 2019167022 A1 | 9/2019 |
| WO | 2019197948 A1 | 10/2019 |
| WO | 2019207415 A1 | 10/2019 |
| WO | 2019207416 A1 | 10/2019 |
| WO | 2019207417 A1 | 10/2019 |
| WO | 2019207423 A1 | 10/2019 |
| WO | 2019215571 A1 | 11/2019 |
| WO | 2020025270 A1 | 2/2020 |
| WO | 2020035764 A1 | 2/2020 |
| WO | 2020075005 A1 | 4/2020 |
| WO | 2020079522 A1 | 4/2020 |
| WO | 2020084382 A1 | 4/2020 |
| WO | 2020084483 A1 | 4/2020 |
| WO | 2020089741 A1 | 5/2020 |
| WO | 2020115685 A1 | 6/2020 |
| WO | 2020128708 A1 | 6/2020 |
| WO | 2020128716 A1 | 6/2020 |
| WO | 2020128717 A1 | 6/2020 |
| WO | 2020128719 A1 | 6/2020 |
| WO | 2020128720 A2 | 6/2020 |
| WO | 2020128752 A1 | 6/2020 |
| WO | 2020128779 A2 | 6/2020 |
| WO | 2020128780 A1 | 6/2020 |
| WO | 2020128781 A1 | 6/2020 |
| WO | 2020128783 A1 | 6/2020 |
| WO | 2020128787 A1 | 6/2020 |
| WO | 2020128794 A1 | 6/2020 |
| WO | 2020128833 A1 | 6/2020 |
| WO | 2020128838 A1 | 6/2020 |
| WO | 2020128842 A1 | 6/2020 |
| WO | 2020128844 A1 | 6/2020 |
| WO | 2020128845 A1 | 6/2020 |
| WO | 2020128852 A1 | 6/2020 |

(56) References Cited

FOREIGN PATENT DOCUMENTS

| | | |
|---|---|---|
| WO | 2020128853 A1 | 6/2020 |
| WO | 2020128856 A1 | 6/2020 |
| WO | 2020212788 A1 | 10/2020 |
| WO | 2021009600 A1 | 1/2021 |
| WO | 2021014271 A1 | 1/2021 |
| WO | 2021074756 A1 | 4/2021 |
| WO | 2021074768 A1 | 4/2021 |
| WO | 2021079331 A1 | 4/2021 |
| WO | 2021081571 A1 | 5/2021 |
| WO | 2021105030 A1 | 6/2021 |
| WO | 2021116883 A1 | 6/2021 |
| WO | 2021133876 A1 | 7/2021 |
| WO | 2021133888 A1 | 7/2021 |
| WO | 2021133901 A1 | 7/2021 |
| WO | 2021137092 A1 | 7/2021 |
| WO | 2021179025 A1 | 9/2021 |
| WO | 2021186326 A1 | 9/2021 |
| WO | 2021214576 A1 | 10/2021 |
| WO | 2021214605 A1 | 10/2021 |
| WO | 2021234540 A1 | 11/2021 |
| WO | 2023130051 A1 | 7/2023 |
| WO | 2023130052 A1 | 7/2023 |
| WO | 2023130053 A1 | 7/2023 |
| WO | 2023209518 A1 | 11/2023 |

OTHER PUBLICATIONS

Austin, Benson M., "Thick-Film Screen Printing," Solid State Technology, Jun. 1969, pp. 53-58.
Avril, Nicolas Joseph "Manufacturing Glass-Fiber Reinforcement for Grinding Wheels" Massachusetts Institute of Technology, Feb. 1996, 105 pages.
Bacher, Rudolph J., "High Resolution Thick Film Printing," E.I. du Pont de Nemours & Company, Inc., Proceedings of the International Symposium on Microelectronics, 1986, pp. 576-581.
Besse, John R., "Understanding and controlling wheel truing and dressing forces when rotary plunge dressing," Cutting Tool Engineering, Jun. 2012, vol. 64, Issue 6, 4 pages.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, Accessed: Sep. 18, 2013, 2 pages.
Wu, J. et al., "Friction and Wear Properties of Kevlar Pulp Reinforced Epoxy Composite under Dry Sliding Condition", Tribology Letters, vol. 22, No. 3, Jun. 2006, pp. 259-263, Abstract only.
J. European Ceramic Society 31 (2011) 2073-2081, Abstract only.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
WINTER Catalogue No. 5, Dressing tools, WINTER diamond tools for dressing grinding wheels, Edition Year: 2010, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.
VSM Actirox Fibre Discs, The Latest Generation of Abrasives for Maximum Stock Removal [PDF] VSM Abrasives Ltd., Apr. 2019 [retrieved on May 15, 2019], 8 pages. Retrieved from https://uk.vsmabrasives.com/fileadmin/user_upload/ACTIROX/VSM-ACTIROX-EN.pdf.
Kumar et al., "Composites by rapid prototyping technology", Material & Design, Feb. 2010, vol. 31, Issue 2, pp. 850-856.
Lewis et al., "Direct Ink Writing of Three-Dimensional Ceramic Structures", Journal of the American Ceramic Society, US, 2006-11-30, vol. 89, Issue 12, pp. 3599-3609.
International Search Report with regard to International application No. PCT/US2017/031998, dated Aug. 21, 2017.
International Search Report with regard to International application No. PCT/US2017/031992, dated Aug. 21, 2017.
International Search Report and Written Opinion for Application No. PCT/US2016/036701, dated Sep. 1, 2016, 12 pages.
Brewer, L. et al., Journal of Materials Research, 1999, vol. 14, No. 10, pp. 3907-3912, Abstract only.
Lewis et al., "Direct Ink Writing of 3D Functional Materials", Advanced Functional Materials, 2006, 16, pp. 2193-2204.
International Search Report and Written Opinion for Application No. PCT/US2020/066817, mailed Apr. 15, 2021, 11 pages.
International Search Report and Written Opinion for Application No. PCT/US2014/058378, mailed Jan. 29, 2015, 18 pages.
International Search Report and Written Opinion for Application No. PCT/US2015/025825) mailed Jul. 16, 2015, 13 pages.

\* cited by examiner
† cited by third party

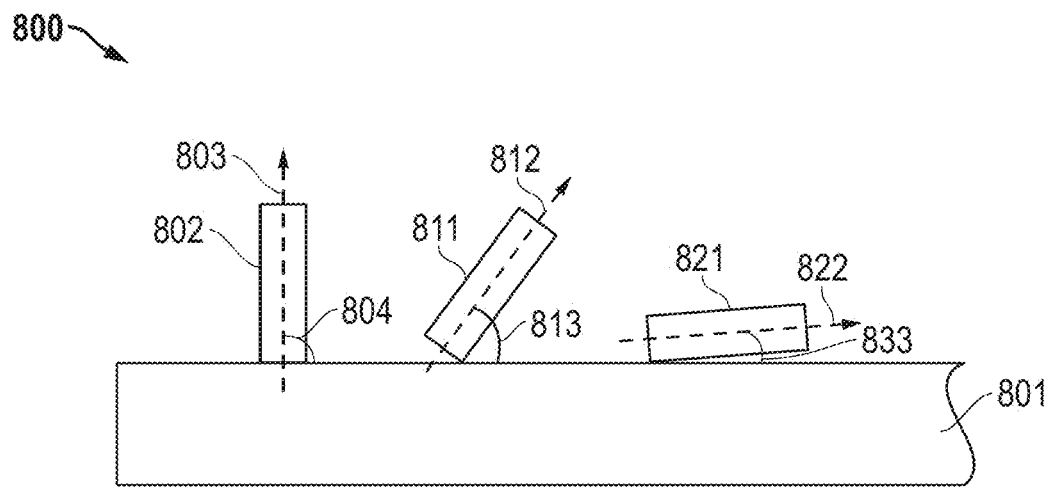
FIG. 8
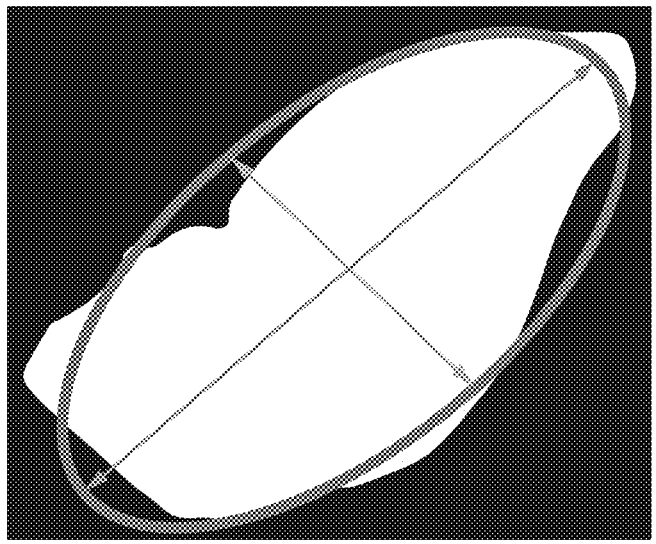 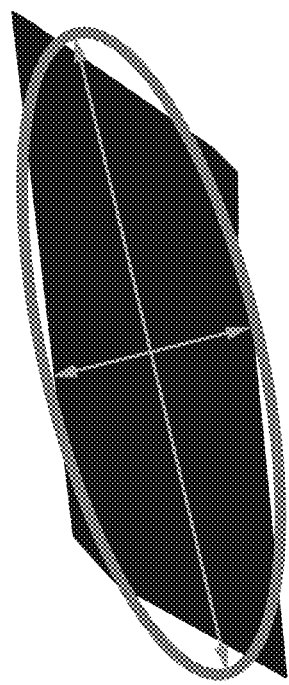
FIG. 9A  FIG. 9B

ABRASIVE ARTICLES AND METHODS OF FORMING SAME

CROSS-REFERENCE TO RELATED APPLICATION(S)

This application claims priority under 35 U.S.C. § 119(e) to U.S. Provisional Patent Application No. 62/954,293, filed Dec. 27, 2019, by Samuel S. MARLIN et al., entitled "ABRASIVE ARTICLES AND METHODS OF FORMING SAME," which is assigned to the current assignee hereof and incorporated herein by reference in its entirety for all purposes.

BACKGROUND

Field of the Disclosure

The following is directed to abrasive articles, and in particular, shaped abrasive particles for use in fixed abrasive articles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,243. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041. Other relevant disclosures on abrasive particles and associated methods of forming and abrasive articles incorporating such particles are available at: http://www.abel-ip.com/publications/.

The industry continues to demand improved abrasive materials and abrasive articles.

SUMMARY

According to one aspect, a plurality of extruded shaped abrasive particles has an average solidity of at least 0.87.

According to another aspect, a coated abrasive article includes a substrate and a plurality of abrasive particles having an average solidity of at least 0.87 and less than 0.97, wherein each of the abrasive particles of the plurality of abrasive particles comprises a body and striations extending along an exterior surface of the body in a direction of a length of the body.

In another aspect, a method for making shaped abrasive particles includes forming a mixture into a green body and sectioning the green body with minimal distortion to create a plurality of precursor shaped abrasive particles having an average solidity of at least 0.87.

BRIEF DESCRIPTION OF THE DRAWINGS

The present disclosure may be better understood, and its numerous features and advantages made apparent to those skilled in the art by referencing the accompanying drawings.

FIG. 8 includes a side-view illustration of abrasive particles on a backing according to an embodiment.

FIGS. 9A and 9B include black and white images of abrasive particles having best-fit ellipses according to embodiments herein.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts. Moreover, unless stated otherwise, reference to any quantified value will be understood to be an average value based on a statistically-relevant sample size.

The following is directed to shaped abrasive particles, methods of forming shaped abrasive particles, and methods of forming coated abrasive articles including shaped abrasive particles. The abrasive articles may be used in a variety of material removal operations for a variety of work pieces.

Figure 1A:
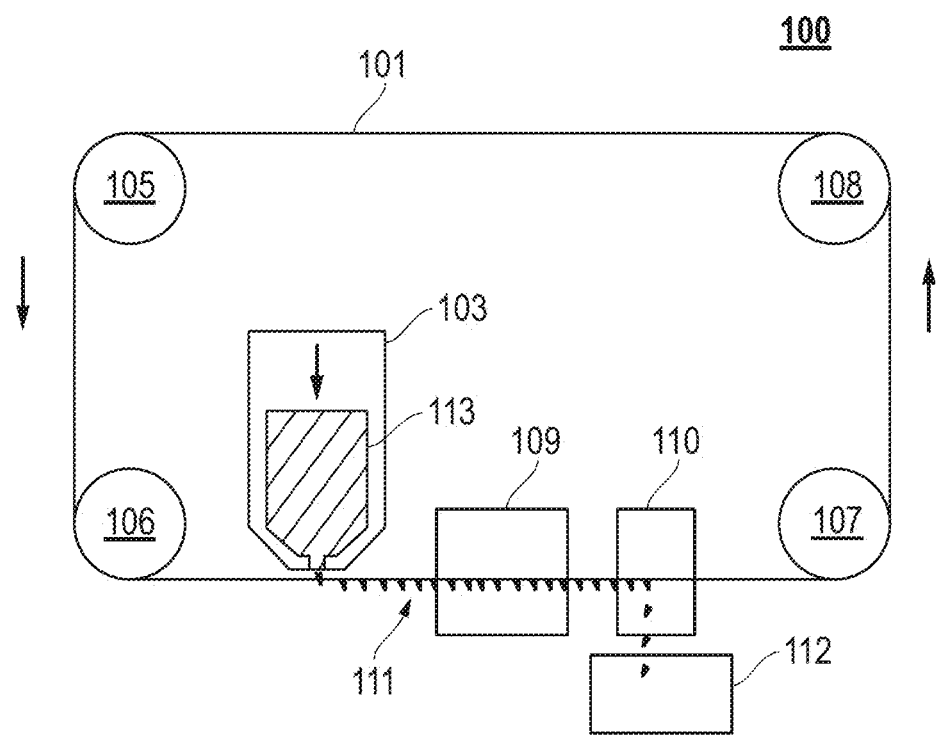
FIG. 1A includes an illustration of a system for forming shaped abrasive particles according to an embodiment.

FIG. 1A includes an illustration of a system for forming shaped abrasive particles according to an embodiment. It will be appreciated that while the illustrated system of FIG. 1A provides an explanation for a process for forming shaped abrasive particles and this embodiment should not be interpreted as limiting. Other processes may be used to form the shaped abrasive particles. Some suitable processes may include, but is not limited to, alternative extrusion techniques, printing, molding, casting, punching, embossing, fracturing, or any combination thereof.

Referring again to FIG. 1A, a system 100 can include a production tool 101 disposed and configured to move around rollers 105, 106, 107, and 108 (105-108). The production tool can include cavities, which may extend through the entire thickness of the production tool 101 and facilitate the movement of a mixture 113 through the cavities. The mixture 113 can be extruded by an extruder 103 through the cavities in the production tool to facilitate shaping of the mixture 113 to form precursor shaped abrasive particles.

In one non-limiting embodiment, the mixture 113 may include at least a ceramic material and a liquid. In particular, the mixture 113 can be a gel formed of a ceramic powder material and a liquid, wherein the gel can be characterized as a shape-stable material having the ability to hold a given shape even in the green state (i.e., unfired or undried gel). In accordance with an embodiment, the gel can be formed of the ceramic powder material as an integrated network of discrete particles.

In certain aspects, control of certain processing conditions may be suitable for forming shaped abrasive particles. For example, the mixture 113 may be formed with a particular content of solid material to facilitate suitably forming the shaped abrasive particles. In one embodiment, the mixture 113 can have a high solids content, including for example, a solids content of at least about 25 wt %, such as at least about 35 wt %, at least about 42 wt %, at least about 44 wt %, at least about 46 wt %, at least about 48 wt %, at least about 50 wt %, at least about 55 wt %, at least about 60 wt %, at least 65 wt % or even at least 68 wt % for the total weight of the mixture 113. Still, in at least one non-limiting embodiment, the solid content of the mixture 113 can be not greater than about 90 wt %, such as not greater than about 85 wt %, not greater than about 82 wt %, not greater than about 80 wt %, not greater than about 78 wt %, not greater than about 75 wt %, not greater than about 73 wt %, or even not greater than about 70 wt %. It will be appreciated that the content of the solids materials in the mixture 113 can be within a range between any of the minimum and maximum percentages noted above.

According to one embodiment, the ceramic powder material can include an oxide, a nitride, a carbide, a boride, an oxycarbide, an oxynitride, a superabrasive material or any combination thereof. It will be appreciated, that in certain alternative embodiments, in place of a ceramic powder material, one may choose to use a precursor of a ceramic powder material. A precursor can be a material, which may or may not be in a powder form that is configured to change at least a portion of its composition or physical properties during processing to form a ceramic material. In particular instances, the ceramic material can include alumina. More specifically, the ceramic material may include a boehmite material, which may be a precursor of alpha alumina. The term "boehmite" is generally used to denote alumina hydrates including mineral boehmite, typically being Al2O3·H2O and having a water content on the order of 15%, as well as pseudoboehmite, having a water content higher than 15%, such as 20-38% by weight. It is noted that boehmite (including pseudoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

Furthermore, the mixture 113 can be formed to have a particular content of liquid material. Some suitable liquids may include inorganic materials, such as water or various organic materials such as alcohol and the like. In accordance with one embodiment, the mixture 113 can be formed to have a liquid content less than the solids content of the mixture 113. In more particular instances, the mixture 113 can have a liquid content of at least about 10 wt %, such as at least about 12 wt % for the total weight of the mixture 113. In other instances, the amount of liquid within the mixture 113 can be greater, such as at least about 15 wt %, at least about 18 wt %, at least about 20 wt %, at least about 22 wt %, at least about 25 wt %, at least about 30 wt %, at least about 35 wt %, or even at least about 40 wt %. Still, in at least one non-limiting embodiment, the liquid content of the mixture can be not greater than about 60 wt %, such as not greater than about 50 wt %, not greater than about 45 wt %, not greater than about 40 wt %, not greater than about 35 wt %, or not greater than about 30 wt %. It will be appreciated that the content of the liquid in the mixture 113 can be within a range between any of the minimum and maximum percentages noted above.

In some instances, the mixture 113 may have particular rheological characteristics to facilitate forming the shaped abrasive particles. For example, the mixture 113 may have a particular storage modulus. In one non-limiting embodiment, the mixture 113 can have a storage modulus of at least about $1 \times 10^4$ Pa, such as at least about $4 \times 10^4$ Pa, such as at least about $1 \times 10^5$ Pa, at least about $1 \times 10^6$ Pa, at least about $1 \times 10^7$ Pa, at least about $1 \times 10^8$ Pa, at least about $1 \times 10^9$ Pa or at least about $1 \times 10^{10}$ Pa or even at least about $40 \times 10^4$ Pa. In at least one non-limiting embodiment, the mixture 113 may have a storage modulus of not greater than about $1 \times 10^{20}$ Pa, not greater than about $1 \times 10^{15}$ Pa, not greater than about $1 \times 10^{10}$ Pa, or even not greater than about $1 \times 10^8$ Pa. It will be appreciated that the storage modulus of the mixture 113 can be within a range between any of the minimum and maximum values noted above.

The storage modulus can be measured via a parallel plate system using ARES or AR-G2 rotational rheometers, with Peltier plate temperature control systems. For testing, the mixture 113 can be extruded within a gap between two plates that are set to be approximately 8 mm apart from each other. After extruding the gel into the gap, the distance between the two plates defining the gap is reduced to 2 mm until the mixture 113 completely fills the gap between the plates. After wiping away excess mixture, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported.

In another non-limiting embodiment, the mixture 113 may have a particular viscosity that facilitates formation of the shaped abrasive particles. For example, the mixture 113 can have a viscosity of at least about $1 \times 10^3$ Pas, at least about $1 \times 10^4$ Pas, at least about $1 \times 10^5$ Pas, at least about $1 \times 10^6$ Pas, at least about $1 \times 10^7$ Pas, at least about $1 \times 10^8$ Pas, at least about $1 \times 10^9$ Pas, at least about $1 \times 10^{10}$ Pas, at least about $1 \times 10^{11}$ Pas, at least about $1 \times 10^{12}$ Pas, at least about $1 \times 10^{13}$ Pas. In at least one non-limiting embodiment, the mixture 113 may have a viscosity of not greater than about $1 \times 10^{20}$ Pas, not greater than about $1 \times 10^{18}$ Pas, not greater than about $1 \times 10^{15}$ Pas, or even not greater than about $1 \times 10^{12}$ Pas. It will be appreciated that the viscosity of the mixture 113 can be within a range between any of the minimum and maximum values noted above. The viscosity can be measured in the same manner as the storage modulus as described above.

In still another non-limiting embodiment, the mixture 113 may have a particular yield stress. For example, the mixture 113 can have a yield stress of at least about $1 \times 10^2$ Pa, at least about $1 \times 10^3$ Pa at least about $1 \times 10^4$ Pa, at least about $1 \times 10^5$ Pa, at least about $1 \times 10^6$ Pa, at least about $1 \times 10^7$ Pa, or at least about $1 \times 10^8$ Pas. In at least one non-limiting embodiment, the mixture 113 may have a yield stress of not greater than about $1 \times 10^{20}$ Pa, not greater than about $1 \times 10^{15}$ Pa, not greater than about $1 \times 10^{12}$ Pa, or even not greater than about $1 \times 10^{10}$ Pa. It will be appreciated that the yield stress of the mixture 113 can be within a range between any of the minimum and maximum values noted above. The yield stress can be measured in the same manner as the storage modulus as described above.

The rheological characteristics of the mixture 113 can be distinct from conventional mixtures and gels, such as those described in certain references. Moreover, the mixture 113 can be formed to have a particular relationship between one or more rheological characteristics (e.g., viscosity, yield stress, storage modulus, etc.) to facilitate forming. Notably, the gel may be significantly more "stiff", having a shear thinning characteristic, which may be entirely distinct from mixtures used in other forming methods.

In some optional embodiments, the mixture 113 can be formed to have a particular content of organic materials, including for example, organic additives that can be distinct from the liquid, to facilitate processing and formation of shaped abrasive particles according to the embodiments herein. Some suitable organic additives may include stabilizers, binders, such as fructose, sucrose, lactose, glucose, UV curable resins, and the like. It will be appreciated that the total content of all materials in the mixture (e.g., ceramic powder material, water, additives, etc.) add up to and do not exceed 100%.

The embodiments herein may utilize a mixture 113 that can be distinct from certain types of slurries. For example, the content of organic materials within the mixture 113, particularly, any of the organic additives noted above may be a minor amount as compared to other components within the mixture 113. In at least one embodiment, the mixture 113 can be formed to have not greater than about 30 wt % organic material for the total weight of the mixture 113. In other instances, the amount of organic materials may be less, such as not greater than about 15 wt %, not greater than about 10 wt %, or even not greater than about 5 wt %. Still, in at least one non-limiting embodiment, the amount of organic materials within the mixture 113 can be at least about 0.5 wt % for the total weight of the mixture 113. It will be appreciated that the amount of organic materials in the mixture 113 can be within a range between any of the minimum and maximum values noted above. In at least one alternative aspect, the mixture 113 may be essentially free of organic material.

In some embodiments, the mixture 113 can be formed to have a particular content of acid or base, which may facilitate processing. Some suitable acids or bases can include nitric acid, sulfuric acid, citric acid, hydrochloric acid, tartaric acid, phosphoric acid, ammonium nitrate, and/or ammonium citrate. According to one particular embodiment, the mixture 113 can have a pH of less than about 5, and more particularly, within a range between at least about 2 and not greater than about 4, using a nitric acid additive. Alternatively, the rheology of the acidic gel can be further modified by converting the acidic gel to a basic gel through the use of bases such as ammonium hydroxide, sodium hydroxide, organics amines such as hexamethylenetetramine and the like.

In one embodiment, extrusion of the mixture 113 from the extruder 103 and through the cavities in the production tool 101 can include applying a force on the mixture 113 to facilitate extrusion. In accordance with an embodiment, a particular pressure may be utilized during extrusion. For example, the pressure can be at least about 10 kPa, such as at least about 50 kPa, at least about 100 kPa, at least about 200 kPa or at least about 300 kPa or at least 400 kPa or at least 500 kPa at least about 1,000 kPa, at least about 5,000 kPa or at least about 8,000 kPa or at least 10,000 kPa or at least 15,000 kPa, at least about 20,000 kPa, at least about 30,000 kPa. Still, in at least one non-limiting embodiment, the pressure utilized during extrusion can be not greater than about 100,000 kPa, such as not greater than about 80,000 kPa not greater than about 60,000 kPa or not greater than 50,000 kPa or not greater than 40,000 kPa, not greater than about 30,000 kPa not greater than about 20,000 kPa or not greater than 10,000 kPa or not greater than 8,000 kPa or not greater than 5,000 kPa not greater than about 1,000 kPa not greater than about 800 kPa or not greater than 600 kPa. It will be appreciated that the pressure used to extrude the mixture 113 can be within a range between any of the minimum and maximum values noted above.

In another non-limiting aspect, the pressure used to extrude the mixture 113 may have a particular relationship to the solids loading, which may facilitate certain features of the shaped abrasive particles of the embodiments herein. For example, in one non-limiting embodiment, the mixture may have a solids loading within a range of at least 40 wt % to not greater than 60 wt % and be extruded at a pressure within a range of at least 10 kPa and not greater 10,000 kPa, such as within a range of at least 100 kPa and not greater than 5,000 kPa or within a range of at least 200 kPa and not greater than 1,000 kPa.

In an alternative embodiment, the pressure used to extrude the mixture 113 may have a particular relationship to the solids loading, which may facilitate certain features of the shaped abrasive particles of the embodiments herein. For example, in one non-limiting embodiment, the mixture may have a solids loading within a range of at least 61 wt % to not greater than 80 wt % and be extruded at a pressure within a range of at least 15,000 kPa and not greater 100,000 kPa, such as within a range of at least 100 kPa and not greater than 5,000 kPa or within a range of at least 200 kPa and not greater than 1,000 kPa.

In accordance with one embodiment, the mixture 113 can have a coil value of at least about 1800 N. The coil value can be measured on an instrument called a Shimpo compression tester manufactured by Shimpo Instruments, Itasca Illinois, using a sample of mixture ranging from 30-60 grams in mass, which is manually pressed into a plastic/stainless steel cylinder of 2" in diameter. At the extrusion end of the cylinder, a plastic insert with a cylindrical hole establishes the compressed extrudate size of 0.25 inches in diameter. A plunger slides into the cylinder and when the test is started, the plunger will extrude the gel once the threshold coil force is reached. When the cylinder assembly is in position, the Shimpo compression tester moves a force probe down towards the plunger at a constant rate of 95-97 mm/min. When the threshold coil force is reached, the gel is extruded out of the insert hole and an output meter generates a peak force, which is the coil value. In another embodiment, the coil value of the mixture 113 can be at least about 200 N, such as at least about 300 N, at least about 400 N, at least about 500 N, at least about 600 N, at least about 700 N, at least about 800 N, at least about 900 N, at least about 1000 N. In one non-limiting embodiment, the coil value can be not greater than about 5000 N, such as not greater than about 4000 N, not greater than about 3000 N or even not greater than 2000 N. Thus, certain mixtures according to the embodiments herein can be significantly more flow resistant compared to conventional mixtures.

In accordance with an embodiment, the production tool 101 can include cavities in the form of apertures that extend through the thickness of the production tool 101. The production tool 101 may be in the form of an endless belt for continuous operations. Additionally, the production tool may include a plurality of cavities for improving the production capabilities of the process. The cavities can have any two-dimensional shape and size depending upon the intended cross-sectional shape of the shaped abrasive particles. In one particular embodiment, the cavities can have a quadrilateral two-dimensional shape as viewed in the plane of the length and width of the production tool 101.

As further illustrated in FIG. 1A, the mixture 113 can be extruded through the cavities in the production tool 101. More specifically, in an embodiment, as the cavities translate past the die opening of the extruder 103, the mixture 113 can be forced from the extruder 103 and through the cavities in the production tool 101. As the production tool 101 continues to translate, the cavities pass by the die opening, stopping any further extrusion of the mixture 113 into the filled cavities. Extrusion may continue into the next group of cavities that are exposed to the die opening. The mixture 113 that is forced through the cavities can protrude through the cavities on the side of the production tool 101 that is opposite the side of the production tool 101 that is adjacent the die opening of the extruder 103.

In one embodiment, the rate of translation of the production tool 101 may be controlled to facilitate the formation of precursor shaped abrasive particles and shaped abrasive particles having one or more features of the embodiments herein. In one particular embodiment, the rate of translation of the production tool 101 can be controlled relative to the rate of extrusion.

In one non-limiting embodiment, the mixture 113 may be extruded at an extrusion rate of at least 0.0015 cm/s, such as at least 0.005 cm/s, at least 0.008 cm/s, at least 0.01 cm/s, at least 0.015 cm/s, at least 0.02 cm/s, at least 0.05 cm/s, at least 0.08 cm/s, at least 0.10 cm/s, at least 0.20 cm/s, at least 0.30 cm/s, at least 0.40 cm/s, at least 0.50 cm/s. Still, in one non-limiting embodiment, the mixture 113 may be extruded at an extrusion rate of not greater than 5 m/s, such as not greater than 1 m/s, not greater than 0.5 m/s, not greater than 100 cm/s, not greater than 50 cm/s, not greater than 10 cm/s, not greater than 1 cm/s. It will be appreciated that the mixture 113 may be extruded at an extrusion rate within a range between any of the minimum and maximum values noted above.

In one non-limiting embodiment, the production tool may be translated at a translation rate of at least 0.10 cm/s, such as at least 0.50 cm/s, at least 0.80 cm/s, at least 1.0 cm/s, at least 1.5 cm/s, at least 2 cm/s, at least 3 cm/s, at least 4 cm/s, at least 5 cm/s, at least 6 cm/s, at least 7 cm/s, at least 8 cm/s, at least 9 cm/s. Still, in one non-limiting embodiment, the production tool 101 may be translated at a rate of not greater than 5 m/s, such as not greater than 1 m/s, not greater than 0.5 m/s, not greater than 100 cm/s, not greater than 50 cm/s, not greater than 25 cm/s, not greater than 15 cm/s. It will be appreciated that the production tool may be translated at a rate within a range between any of the minimum and maximum values noted above.

The production tool 101 may include an inorganic material, including for example, but not limited a ceramic, a metal, a metal alloy, or any combination thereof. In an alternative embodiment, the production tool 101 may include an organic material, such as a polymer, including for example, a fluoropolymer, such as polytetrafluoroethylene (PTFE).

In an alternative embodiment, the production tool 101 may include a specific composition that may be imparted to the mixture 113 contained on the surfaces of the cavities. For example, the surfaces of the cavities may be coated with an additive. The additive may be an inorganic material, organic material, or any combination thereof. In certain instances, the additive may be a dopant. In such embodiments, the mixture 113 may be doped while being extruded through the cavities of the production tool 101.

After extrusion of the mixture 113, the extruded mixture can be translated on the production tool 101 to undergo further optional post-shaping processing at stage 109. Some non-limiting examples of the post-shaping processing at stage 109 may include drying, cooling, spraying, doping, coating, or any combination thereof.

After conducting any optional post-shaping processing at stage 109, the extruded mixture can be translated to a release zone 110 where the extruded mixture portions are released from the cavities of the production tool 101 to form precursor shaped abrasive particles. The extruded mixture portions can be released from the production tool 101 using various techniques, including but not limited to, mechanical manipulation, vibration, impingement of a gas or liquid phase material, change in temperature (i.e., heating, cooling, freezing, etc.), and the like. In a preferred embodiment, the extruded mixture portions are engaged with a blade that facilitates separation from the production tool 101. In one non-limiting embodiment, the speed of the blade, rheology of the mixture, and speed of extrusion are adjusted relative to each other to facilitate formation of precursor shaped abrasive particles with minimal deflection and having one or more of the features of the abrasive particles of the embodiments herein.

In accordance with an embodiment, the mixture 113 can experience a change in weight of less than about 5% for the total weight of the mixture 113 for the duration the mixture 113 is connected to the production tool 101. In other embodiments, the weight loss of the mixture 113 can be less, such as less than about 4%, less than about 3%, less than about 2%, less than about 1%, or even less than about 0.5%. Still, in one particular embodiment, the mixture 113 may have essentially no change in weight for the duration the mixture 113 is in the production tool 101.

Furthermore, during processing, the mixture 113 may experience a limited change in volume (e.g., shrinkage) for the duration the mixture 113 is connected to the production tool 101. For example, the change in volume of the mixture 113 can be less than about 5% for the total volume of the mixture 113, such as less than about 4%, less than about 3%, less than about 2%, less than about 1%, or even less than about 0.5%. In one particular embodiment, the mixture 113 may experience essentially no change in volume for the entire duration the mixture 113 is connected to the production tool 101.

In one non-limiting embodiment, the mixture 113 may undergo a controlled heating process, while the mixture 113 is connected to the production tool 101. For example, the heating process may include heating the mixture at a temperature greater than room temperature for a limited time. The temperature may be at least about 30° C., such as at least about 35° C., at least about 40° C., such as at least about 50° C., at least about 60° C., or even at least about 100° C. Still, the temperature may be not greater than about 300° C., such as not greater than about 200° C., or even not greater than about at least about 150° C., or even not greater than about 100° C. The duration of heating can be particularly short, such as not greater than about 10 minutes, not greater than about 5 minutes, not greater than about 3 minutes, not greater than about 2 minutes, or even not greater than about 1 minute.

The heating process may utilize a radiant heat source, such as infrared lamps to facilitate controlled heating of the mixture 113. Moreover, the heating process may be adapted to control the characteristics of the mixture and facilitate particular aspects of the shaped abrasive particles according to embodiments herein.

In certain instances, the precursor shaped abrasive particles can be gathered and undergo further processing. For example, further processing can include doping, calcining, impregnating, drying, sintering, and the like. In one embodiment, the precursor shaped abrasive particles may have a dopant material applied to one or more exterior surfaces. In accordance with an embodiment, applying a dopant material can include the application of a particular material, such as a salt, which can be a precursor salt material that includes a dopant material to be incorporated into the finally-formed shaped abrasive particles. For example, a metal salt can include an element or compound that is the dopant material. It will be appreciated that the salt material may be in liquid form, such as in a dispersion comprising the salt and liquid carrier. The salt may include nitrogen, and more particularly, can include a nitrate. In one embodiment, the salt can include a metal nitrate, and more particularly, consist essentially of a metal nitrate.

In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, silicon, boron, carbon and a combination thereof.

In one embodiment, the precursor shaped abrasive particle may be dried. Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 10° C., such as at least 20° C. or at least 30° C. or at least 40° C. It will be appreciated that the drying temperature may be within a range between any of the minimum and maximum temperatures noted above.

In accordance with an embodiment, the process of forming the shaped abrasive particles may include calcining, which includes removal of volatiles and a phase change in the material, including for example, a high-temperature phase material (e.g., alpha alumina). In yet another embodiment, the process for forming shaped abrasive particles may include impregnation of calcined precursor shaped abrasive particles with a dopant. In another embodiment, formation of the shaped abrasive particles from the precursor shaped abrasive particles can include sintering. Sintering may be conducted to densify the particles. In a particular instance, the sintering process can facilitate the formation of a high-temperature phase ceramic material. For example, in one embodiment, the precursor shaped abrasive particle may be sintered such that a high-temperature phase of alumina, such as alpha alumina is formed. It will be appreciated that certain additional processes, such as cleaning, may be completed on the production tool 101, to facilitate regular and repetitive processing.

After forming the shaped abrasive particles, such particles may be disposed onto a substrate to form a fixed abrasive article, such as a coated abrasive article. Further details on the coated abrasive articles and methods for forming such articles are described herein.

In an alternative embodiment, the mixture 113 can be extruded through a die rather than a translating production tool. In such embodiments, the mixture can be extruded through openings in a die and undergo sectioning upon being extruded to a particular length. For these particular embodiments, the sectioning of the mixture to form precursor shaped abrasive particles occurs at or near the surface of the die.

Figure 1B:
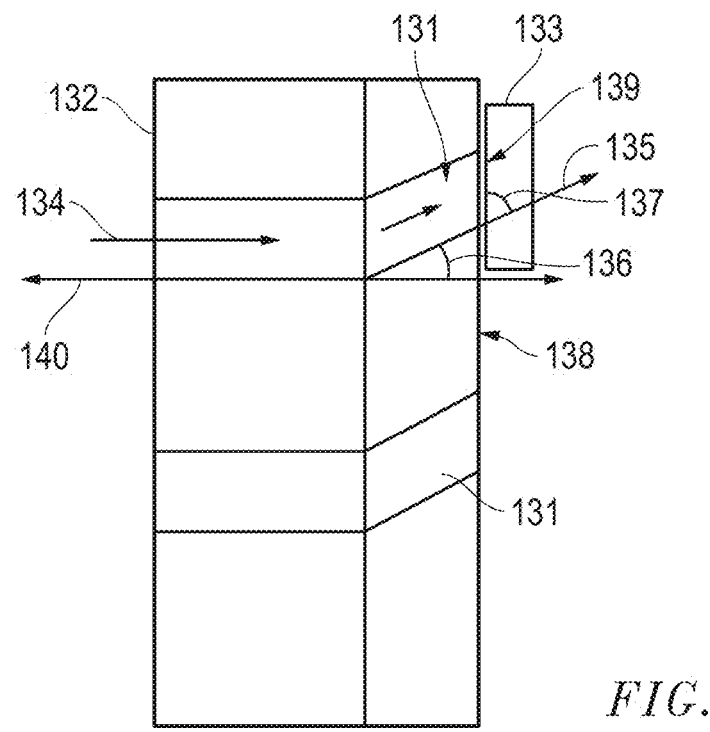
FIG. 1B includes an illustration of a portion of a system for forming shaped abrasive particles according to an embodiment.
Figure 1C:
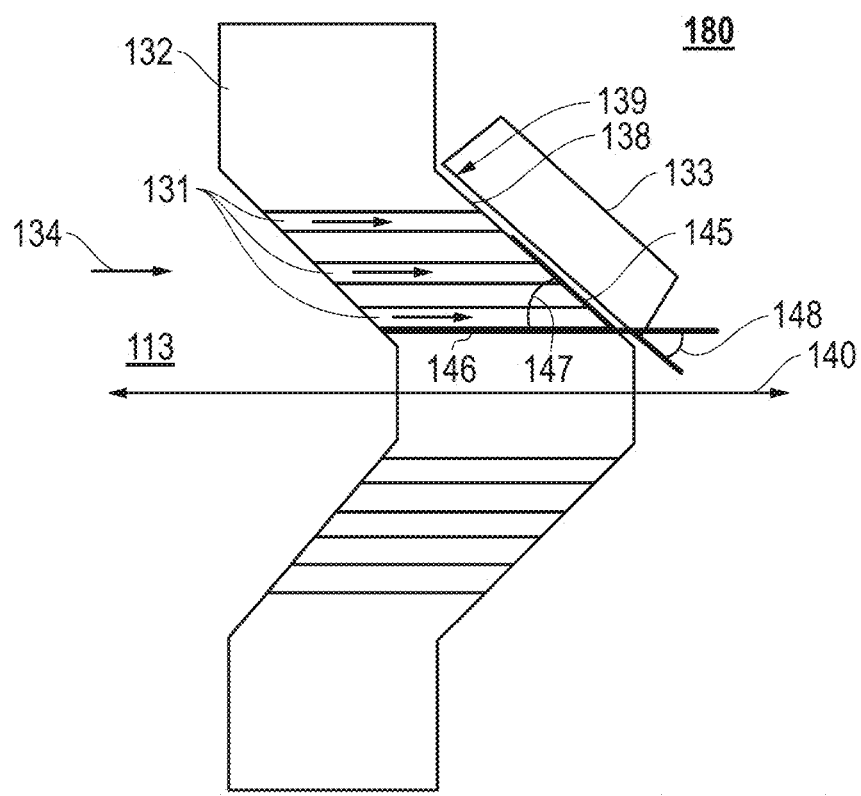
FIG. 1C includes an illustration of a portion of a system for forming shaped abrasive particles according to an embodiment.

FIGS. 1B, and 1C include systems that may not necessarily incorporate a translating production tool. Rather, such systems may conduct continuous forming of the precursor shaped abrasive particles by continuous extrusion and simultaneous sectioning. It should be noted that such systems may be modified to utilize a translating production tool and the embodiments herein are not so limited. The systems for forming shaped abrasive particles of FIGS. 1B, and 1C, may be suitable for creating shaped abrasive particles having one or more combination of features described herein.

According to one aspect, the process for forming the shaped abrasive particles can include forming the mixture 113 into a green body and sectioning the green body with minimal distortion to create a plurality of precursor shaped abrasive particles with certain features. Referring to FIG. 1B, the mixture 113 may be formed via extrusion through one or more openings 131 in a die 132, which may be positioned at the end of an extruder 103. The mixture 113 can be extruded through the one or more openings 131 in the direction 134.

In one particular embodiment, as illustrated in FIG. 1B, the one or more openings 131 can have a particular opening axis 135 that is angled relative to the primary extrusion axis 140 and/or a major surface 138 of the die 132. The smallest angle between the primary extrusion axis 140 and opening axis 135 can be defined as an extrusion angle 136, which in some non-limiting embodiments, may be non-parallel to the primary extrusion axis 140.

In one non-limiting embodiment, the extrusion angle 136 can be at least 5 degrees, such as at least 8 degrees or at least 10 degrees or at least 15 degrees or at least 20 degrees or at least 25 degrees or at least 30 degrees or at least 35 degrees or at least 40 degrees or at least 45 degrees. Still, in another non-limiting embodiment, the extrusion angle 136 may be not greater than 85 degrees, such as not greater than 80 degrees or not greater than 70 degrees or not greater than 60 degrees or not greater than 50 degrees or not greater than 40 degrees or not greater than 30 degrees. It will be appreciated that the extrusion angle 136 can be within a range including any of the minimum and maximum values noted above.

According to another embodiment, the mixture 113 can be formed into a green body as it exits the one or more openings 131. The portion of the mixture 113 extending from the one or more die openings 131 can be a green body having a cross-sectional shape substantially similar to the cross-sectional shape of the one or more die openings 131. In at least one embodiment, the extrudate, and thus the precursor shaped abrasive particles, and the resulting shaped abrasive particles can have a cross-sectional shape from the group of a regular polygon, an irregular polygon, an ellipse, a circle or any combination thereof.

In one particular aspect, the green body can be sectioned by a sectioning device 133. The sectioning device 133 may be one or more devices, such as blades or other objects suitable for separating the green body from the mixture 113. Other suitable devices may include sectioning devices using sectioning mediums that are ejected from the sectioning device and may include a gas and/or a liquid. The separation may be at or near the major surface 138 of the die 132. In the illustrated embodiment of FIG. 1B, the sectioning device 133 may be coupled to an actuation device (e.g., a motor) configured to move the sectioning device relative to the major surface 138 of the die 132.

According to one aspect, sectioning can be conducted in a plane non-perpendicular to the opening axis 135. In another embodiment, sectioning can be conducted in a plane that is non-perpendicular to the longitudinal axis of the green body as it is extruded from the one or more openings 131 of the die 132. For example, as illustrated in the embodiment of FIG. 1B, the leading edge 139 of the sectioning device 133, which his configured to conduct sectioning of the green body, defines a plane that is non-perpendicular to the opening axis 135 and a longitudinal axis of the green body.

In at least one embodiment, a sectioning angle 137 is defined as the smallest angle between the opening axis 135 and the leading edge 139 of the sectioning device 133 as viewed in a plane perpendicular to the extrusion direction 134. For example, the sectioning angle 137 can be at least 5 degrees, such as at least 8 degrees or at least 10 degrees or at least 15 degrees or at least 20 degrees or at least 25 degrees or at least 30 degrees or at least 35 degrees or at least 40 degrees or at least 45 degrees. Still, in another non-limiting embodiment, the sectioning angle 137 may be not greater than 85 degrees, such as not greater than 80 degrees or not greater than 70 degrees or not greater than 60 degrees or not greater than 50 degrees or not greater than 40 degrees or not greater than 30 degrees. It will be appreciated that the sectioning angle 137 can be within a range including any of the minimum and maximum values noted above.

According to one aspect, sectioning can create at least one end surface of the precursor shaped abrasive particle and finally-formed shaped abrasive particle that is a cut surface. In one non-limiting embodiment, the cut surface can be at an end of a body of a precursor shaped abrasive particle or shaped abrasive particle. It will be appreciated that in certain continuous processing operations, two opposing ends of the shaped abrasive particles may be cut surfaces.

In one embodiment, sectioning can be conducted in a particular manner to control one or more angles of one or more end surfaces of the bodies of the precursor shaped abrasive particles and the finally-formed shaped abrasive particles. In one embodiment, sectioning includes simultaneous sectioning of the green body during forming of the green body. In still another non-limiting embodiment, sectioning can include continuous and simultaneous sectioning of portions of the green body during extrusion of the green bodies through the one or more openings 131 of the die 132. For example, one or more sectioning devices 133 may be continuously moving and sectioning extruded green bodies to form precursor shaped abrasive particles, while on another portion of the die apart from the sectioning devices 133, new green bodies are being formed by extruding the mixture 113 through the one or more openings 131. In another non-limiting embodiment, the mixture 113 can be continuously extruded while the one or more sectioning devices 133 are sectioning the green bodies at or near the surface 138 of the die 132.

In one optional embodiment, the process may include treating at least one surface of the green body after forming and before sectioning. In certain instances, it may be suitable to treat at least a portion of the green bodies to improve the sectioning operation, which may also limit deformation of the green bodies during sectioning. In one embodiment, treating can include forming of an additive on at least one surface of the green body, forming a coating on at least a portion of the green body, wrapping at least a portion of the green body, changing the temperature of the green body or any combination thereof. In one aspect, treating may include altering the mechanical or chemical nature of at least a portion of the green body to facilitate improved sectioning. In still another non-limiting embodiment, treating may include altering at least a surface of the green body to facilitate improved sectioning. According to one particular embodiment, treating can include stiffening of the green body through a chemical, mechanical or physical change of at least a portion of the green body, which may serve to limit deformation of the body during sectioning. For example, in some instances, a coating may be applied to the surface of the green bodies prior to sectioning. The coating would preferably be removed (e.g., volatilized) during later processing. In another instance, the green body can be rapidly cooled to facilitate stiffening of the gel prior to sectioning.

In still another aspect, treating may also include treating of the one or more sectioning devices 133 to improve sectioning by minimizing distortion of the green body during sectioning. For example, in one particular embodiment, sectioning may include addition of at least one sectioning additive to the sectioning mechanism to minimize distortion of the green body during sectioning. A sectioning additive may include for example, a lubricant on the surface of the one or more sectioning devices that may assist with clean and smooth sectioning of the green body.

FIG. 1C includes an illustration of a portion of a system for forming shaped abrasive particles according to an embodiment. Specifically, the system 180 can include a die 132 and at least one sectioning devices 133 that may facilitate formation of shaped abrasive particles having one or more features of the embodiments herein. In the illustrated embodiment of FIG. 1C, the die 132 can include one or more openings 131 to facilitate extrusion of the mixture therethrough and facilitate formation of green bodies that can be sectioned by one or more sectioning devices 133. The mixture 113 can be extruded through the one or more openings 131 in the direction 134. In one particular embodiment, as illustrated in FIG. 1C, the one or more openings 131 can have a particular opening axis 146 that is angled relative to a major surface axis 145 where the one or more openings 131 intersect the major surface 145.

According to one embodiment, the smallest angle between the opening axis 146 and major surface axis 145 can be an extrusion angle 147. In some instances, the extrusion angle 147 can be at least 5 degrees, such as at least 8 degrees or at least 10 degrees or at least 15 degrees or at least 20 degrees or at least 25 degrees or at least 30 degrees or at least 35 degrees or at least 40 degrees or at least 45 degrees. Still, in another non-limiting embodiment, the extrusion angle 146 may be not greater than 85 degrees, such as not greater than 80 degrees or not greater than 70 degrees or not greater than 60 degrees or not greater than 50 degrees or not greater than 40 degrees or not greater than 30 degrees.

It will be appreciated that the extrusion angle 147 can be within a range including any of the minimum and maximum values noted above.

According to one embodiment, the smallest angle between the opening axis 146 and the leading edge 139 of the one or more sectioning devices 133 can be a sectioning angle 148. In some instances, the sectioning angle 148 can be at least 5 degrees, such as at least 8 degrees or at least 10 degrees or at least 15 degrees or at least 20 degrees or at least 25 degrees or at least 30 degrees or at least 35 degrees or at least 40 degrees or at least 45 degrees. Still, in another non-limiting embodiment, the sectioning angle 148 may be not greater than 85 degrees, such as not greater than 80 degrees or not greater than 70 degrees or not greater than 60 degrees or not greater than 50 degrees or not greater than 40 degrees or not greater than 30 degrees. It will be appreciated that the sectioning angle 148 can be within a range including any of the minimum and maximum values noted above. The extrusion angle 147 and/or sectioning angle 148 may impact one or more features of the shaped abrasive particles according to embodiments herein.

According to another embodiment, the mixture 113 can be formed into a green body as it exits the one or more openings 131. The portion of the mixture 113 extending from the one or more die openings 131 can be a green body having a cross-sectional shape substantially similar to the cross-sectional shape of the one or more die openings 131. In one particular aspect, the green body can be sectioned by a sectioning device 133 to form a precursor shaped abrasive particle. The sectioning device 133 may be one or more devices, such as blades or other objects suitable for separating the green body from the mixture 113. Other suitable devices may include sectioning devices using sectioning mediums that are ejected from the sectioning device and may include a gas and/or a liquid. The separation may be at or near the major surface 138 of the die 132. In the illustrated embodiment of FIG. 1C, the sectioning device 133 may be coupled to an actuation portion that is configured to move the one or more sectioning devices 133 relative to the major surface 138 of the die 132 and facilitate continuous sectioning of the green bodies to form precursor shaped abrasive particles.

According to one aspect, sectioning can be conducted in a plane non-perpendicular to the opening axis 135, which in the illustrated embodiment of FIG. 1C. In another embodiment, sectioning can be conducted in a plane that is non-perpendicular to the longitudinal axis of the green body as it is extruded from the one or more openings 131 of the die 132. As illustrated in the embodiment of FIG. 1C, the leading edge 139 of the one or more sectioning devices 133, which his configured to conduct sectioning of the green body, defines a plane that is non-perpendicular to the primary extrusion axis 140 and a longitudinal axis of the green body.

According to one aspect, sectioning can create at least one end surface of the precursor shaped abrasive particle and finally-formed shaped abrasive particle that is a cut surface. In one non-limiting embodiment, the cut surface can be at an end of a body of a precursor shaped abrasive particle or shaped abrasive particle. It will be appreciated that in certain continuous processing operations, two opposing ends of the shaped abrasive particles may be cut surfaces.

In one embodiment, sectioning can be conducted in a particular manner to control one or more angles of one or more end surfaces of the bodies of the precursor shaped abrasive particles and the finally-formed shaped abrasive particles. In one embodiment, sectioning may include simultaneous sectioning of the green body during forming of the green body. In still another non-limiting embodiment, sectioning can include continuous and simultaneous sectioning of portions of the green body during extrusion of the green bodies through the one or more openings 131 of the die 132. For example, one or more sectioning devices 133 may be continuously moving and sectioning extruded green bodies to form precursor shaped abrasive particles, while on another portion of the die 132 apart from the sectioning devices 133, new green bodies are being formed by extruding the mixture 113 through the one or more openings 131. In another non-limiting embodiment, the mixture 113 can be continuously extruded while the one or more sectioning devices 133 are sectioning the green bodies at or near the surface 138 of the die 132.

In one embodiment, the sectioning devices 133 may be angled with respect to the major surface 138. Specifically, the sectioning devices 133 can be angled and rotated in the direction 148, such that the leading edge 139 first contacts the green bodies extending from the one or more openings 131 to facilitate sectioning. Such a configuration can avoid contact of the green bodies with other portions of the sectioning devices 133 that may otherwise cause distortion of the green bodies. Movement of the sectioning devices 133 can be continuous or intermittent depending upon the speed of extrusion and the desired features of the shaped abrasive particles. Without wishing to be tied to a particular theory, control of process elements in combination with the orientation of the openings relative to the major surface and one or more sectioning devices may facilitate formation of shaped abrasive particles having certain features of the embodiments herein.

It will be appreciated that the process of using the system of FIG. 1C can include any of the processes of other embodiments herein. For example, the process may include an optional treating process, which can include treating at least one surface of the green body after forming and before sectioning. In certain instances, it may be suitable to treat at least a portion of the green bodies to improve the sectioning operation, which may also limit deformation of the green bodies during sectioning. Treating may include, but is not limited to, forming of an additive on at least one surface of the green body, forming a coating on at least a portion of the green body, wrapping at least a portion of the green body, changing the temperature of the green body or any combination thereof.

It will also be appreciated that the precursor shaped abrasive particles formed through the systems and processes described in conjunction with the embodiments of FIGS. 1B-1C can undergo further processing. Such further processing can include any of the processes described herein, including for example, but not limited to doping, calcining, impregnating, drying, sintering, or any combination thereof.

Figure 2A:
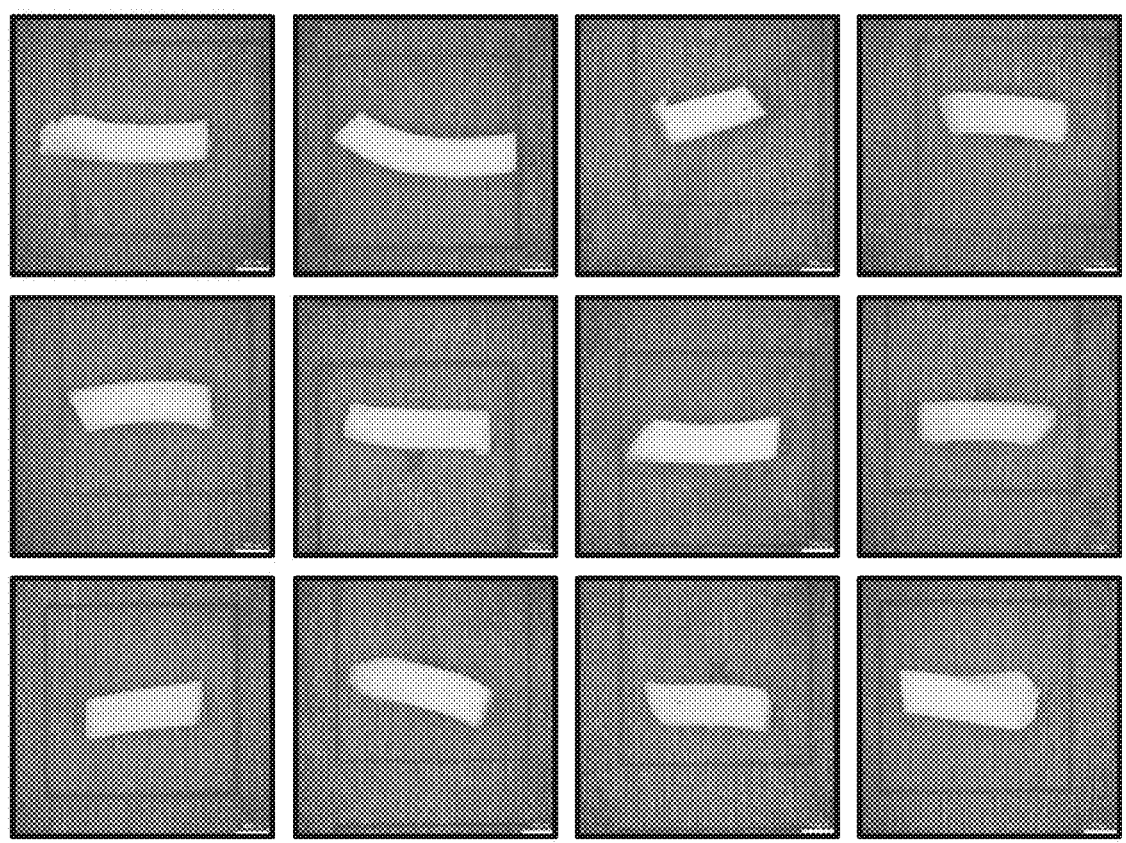
FIG. 2A includes an image of a plurality of shaped abrasive particles according to an embodiment.
Figure 2B:
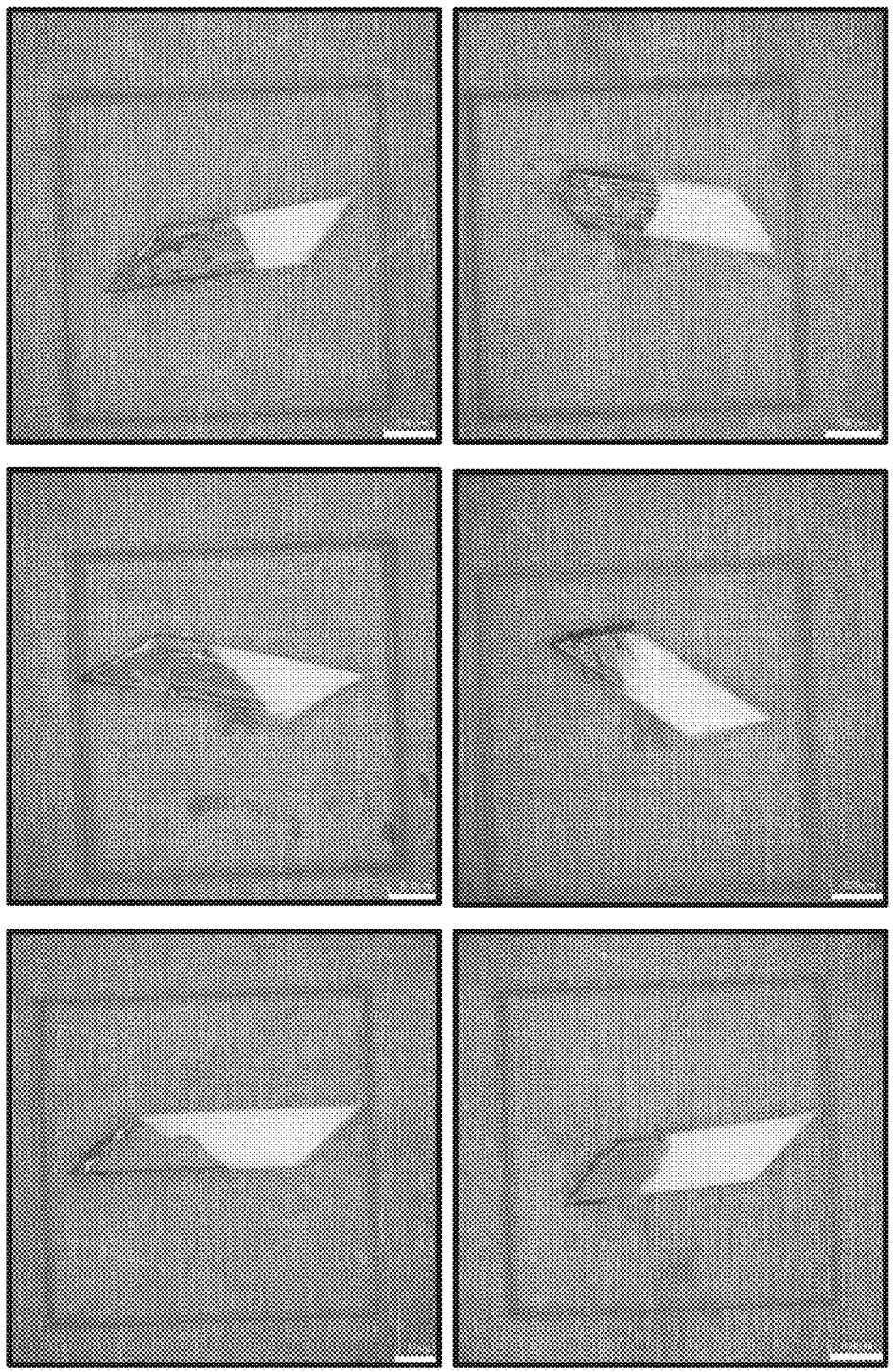
FIG. 2B includes an image of a plurality of shaped abrasive particles according to an embodiment.

FIGS. 2A and 2B illustrate a plurality of shaped abrasive particles according to embodiments herein. In particular, the particles of FIGS. 2A and 2B can be made through an extrusion and sectioning process, wherein the sectioning process is conducted at a particular angle. The particles of FIG. 2A were formed through a continuous extrusion and sectioning process using a system substantially similar to the system of FIG. 1B and having an extrusion angle of approximately 15 degrees. The particles of FIG. 2B were made via extrusion and sectioning with an extrusion angle of approximately 45 degrees.

Figure 2C:
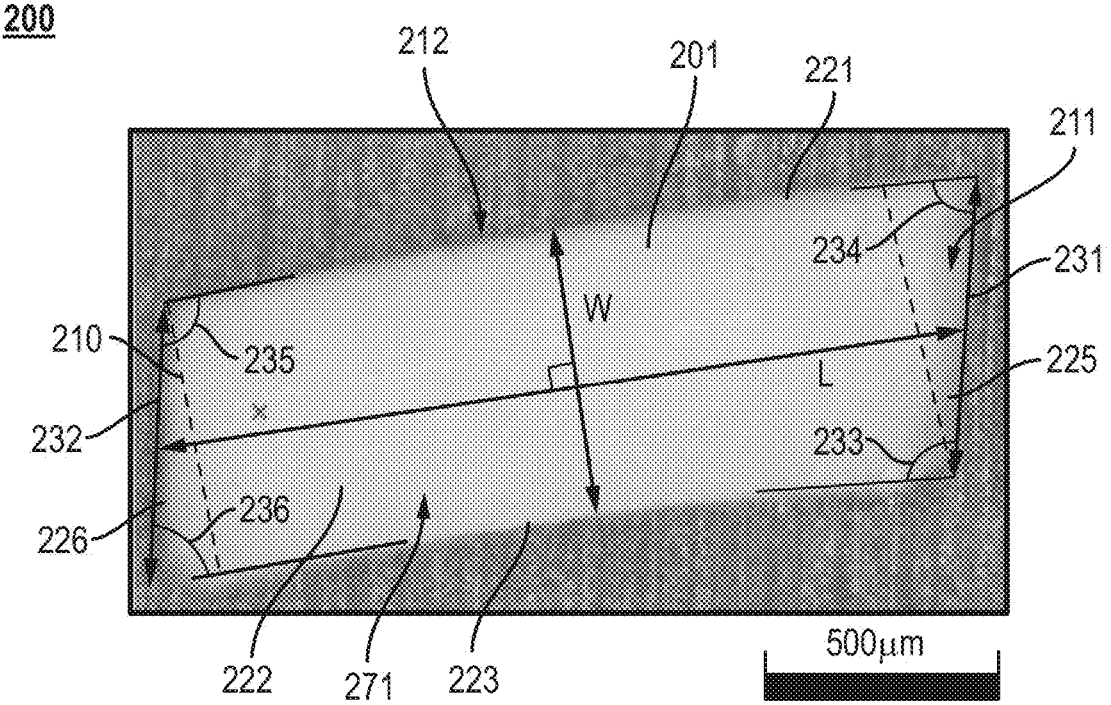
FIG. 2C includes an image of a shaped abrasive particle in a plane defined by a length and width of the body according to an embodiment.
Figure 2D:
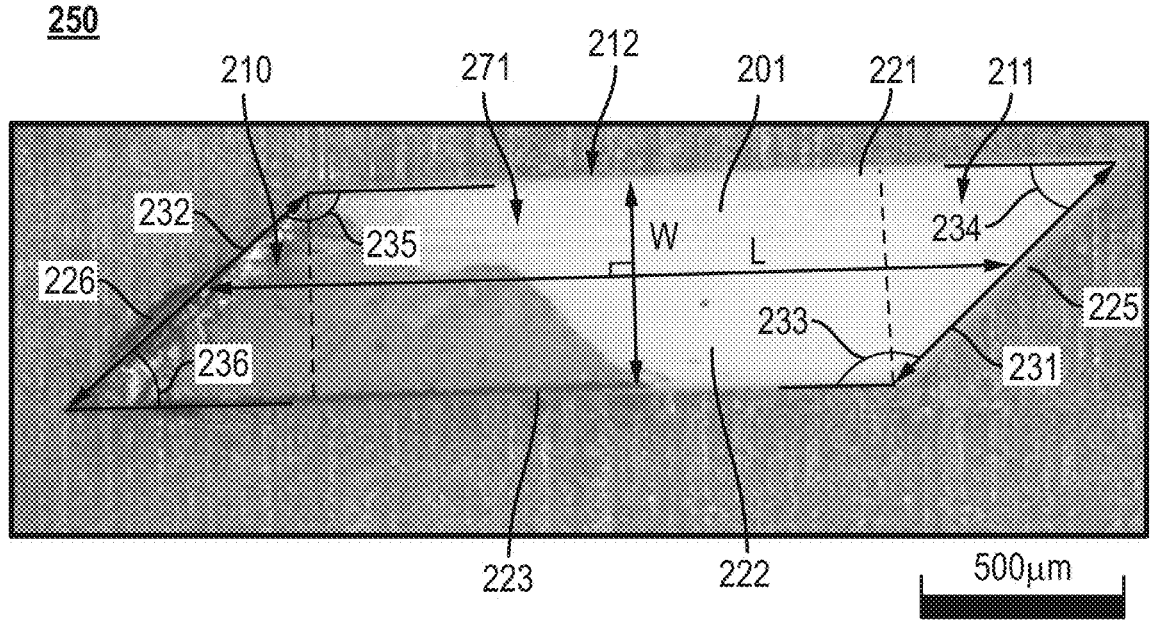
FIG. 2D includes an image of a shaped abrasive particle in a plane defined by a length and width of the body according to an embodiment.

Referring now to FIGS. 2C and 2D, certain features of the shaped abrasive particles of the embodiments herein are described. The features of the embodiments herein are described in the context of finally-formed shaped abrasive particles, but it will be appreciated that the precursor shaped abrasive particles can have any one or more combinations of features described in any of the embodiments herein.

According to one non-limiting embodiment, the plurality of abrasive particles can include a blend of different types of abrasive particles. A blend can include a first portion of abrasive particles and a second portion of abrasive particles. The shaped abrasive particles of the embodiments herein can be present in the first portion, the second portion, or both the first portion and second portion. In one instance, the first portion or the second portion may include only shaped abrasive particles. According to one embodiment, the blend can include a first portion of abrasive particles of a first type and a second portion of abrasive particles of a second type, wherein the first type and second type are different from each other based on at least one abrasive characteristic selected from the group of average grain size, average particle size, friability, toughness, hardness, two-dimensional shape, three-dimensional shape, any of the features described in the embodiments herein, or any combination thereof.

In one non-limiting aspect, the plurality of abrasive particles can include at least 10 grams of abrasive particles, such as at least 100 grams abrasive particles, at least 500 grams of abrasive particles, at least 1 kg of abrasive particles or at least 10 kg of abrasive particles.

In another aspect, the plurality of abrasive particles may include at least 10 abrasive particles, such as at least 20 abrasive particles or at least 30 abrasive particles or at least 50 abrasive particles or at least 100 abrasive particles or at least 500 abrasive particles. It will be appreciated that the number of abrasive particles of the in the plurality of abrasive particles may be within a range of at least 10 abrasive particles to not greater than 100,000 abrasive particles, such as within a range of at least 10 abrasive particles to not greater than 1000 abrasive particles or within range of at least 20 abrasive particles are not greater than 100 abrasive particles.

In still another aspect, the plurality of abrasive particles may include at least a portion, and in some cases, all of the abrasive particles included in a fixed abrasive article, such as, a coated abrasive article. In another embodiment, the plurality of abrasive particles may include all of the abrasive particles in a plurality of fixed abrasive articles.

Referring to one embodiment, the shaped abrasive particles of the embodiments herein may include extruded shaped abrasive particles. The extruded shaped abrasive particles may be formed through an extrusion process. In some embodiments, the extrusion process can create certain features. In one non-limiting embodiment, referring to the shaped abrasive particle 200 of FIG. 2C and the shaped abrasive particle 250 of FIG. 2D, the body 201 can include side surfaces 221, 222, and 223. It will be appreciated that the body 201 can include a fourth side surface, which is not shown, and can be opposite and substantially parallel to the side surface 222. The body 201 can further include end surfaces 225 and 226. In one particular aspect, the side surfaces 221-223 can extend extending between the end surfaces 225 and 226. In a more particular embodiment, the side surfaces 221-223 can abut the end surfaces 225 and 226. In yet another embodiment, the side surfaces 221-223 can have a greater surface area as compared to a total surface area of the end surfaces 225 and 226.

According to one particular embodiment, the shaped abrasive particles 200 and 250 may have striations 271, which may be formed during processing on certain surfaces.

For example, in one embodiment, the striations 271 can be formed on at least one side surface 221-223. In another embodiment the striations 271 may be present on at least a portion of all of the side surfaces 221-223. In one non-limiting embodiment, the striations 271 may extend in a direction of the length (L) of the body 201. In still another embodiment, the striations 271 may extend over a majority of the surface area of at least one or more side surfaces 221-223. According to one particular embodiment, the striations 271 extend over a majority of the surface area of all of the side surfaces 221-223.

In another embodiment, the end surfaces 225 and 226 can have different surface features as compared to the side surfaces 221-223. For example, in one non-limiting embodiment, the end surfaces 225 and 226 may have fewer striations as compared to the side surfaces 221-223. In a more particular embodiment, at least one of the end surfaces 225 and 226 may be substantially free of striations 271, and more particularly, may have no striations 271. Still, in another embodiment, both ends surfaces may be substantially free of striations 271, and more particularly, both end surfaces can have no striations 271.

Figure 2E:
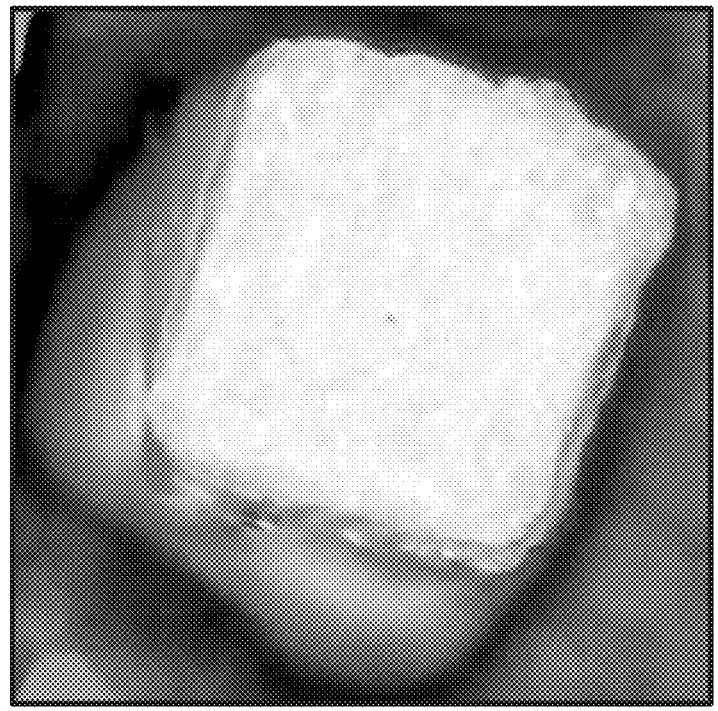
FIG. 2E includes an image of an end surface of a shaped abrasive particles like that illustrated in FIG. 2C.
Figure 2F:
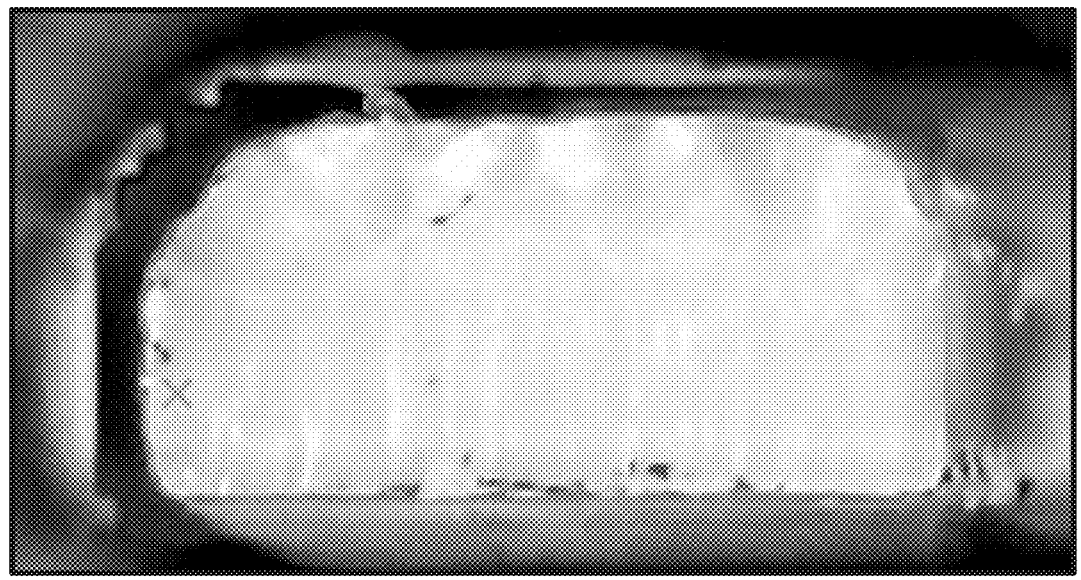
FIG. 2F includes an image of an end surface of a shaped abrasive particles like that illustrated in FIG. 2D.

According to another aspect, at least one of the end surfaces 225 and 226 may be cut surfaces formed from a sectioning operation. In one embodiment, both of the end surfaces 225 and 226 may be cut surfaces. For example, FIG. 2E includes an image of an end surface of a shaped abrasive particles like that illustrated in FIG. 2C. FIG. 2F includes an image of an end surface of a shaped abrasive particles like that illustrated in FIG. 2D. Notably, as illustrated, the shaped abrasive particle of FIG. 2F had a rectangular cross-sectional shape, such that the length was greater than the width and the width was greater than the thickness.

In one non-limiting embodiment, at least one of the end surfaces 225 and 226 can have a different surface contour as compared to at least one of the side surfaces 221-223. In one aspect, at least one of the end surfaces 225 and 226 can have a different surface roughness (Ra) as compared to a surface roughness of at least one side surface 221-223. For one particular embodiment, at least one of the end surfaces 225 and 226 may have an average surface roughness (Ra1) that can be different than an average surface roughness (Ra2) of at least one of the side surfaces 221-223. In another embodiment, Ra1 may be less than Ra2. In another non-limiting embodiment, Ra1 may be at least 10% less than Ra2 as measured according to Ra1<[Ra2−(Ra2×0.10)], such as at least 15% less or at least 20% less or at least 25% less than Ra2.

It will be appreciated that in another embodiment, both of the end surfaces 225 and 226 can have an average surface roughness that is less than a surface roughness of any of the side surfaces 221-223. In still another aspect, both of the end surfaces 225 and 226 can have an average surface roughness that is less than the average surface roughness of all of the side surfaces 221-223.

In another embodiment, the body 201 may have end surfaces 225 and 226 that can be formed with minimal deformation. For example, the end surfaces 225 and 226 may be substantially parallel to each other. In one aspect, the end surfaces 225 and 226 may have a parallelism as measured by the value of an angle at the intersection of the line segments 231 and 232. The line segments 231 and 232 are lines drawn on the end surfaces 225 and 226, respectively as viewed in cross section. The angle of intersection of the line segments 231 and 232 is based on an assumption that the line segments represent radial axes extending from a center of the circle, and the angle of intersection is the central angle between the line segments 231. In one embodiment, the angle of intersection can be not greater than 10 degrees, such as not greater than 8 degrees or not greater than 6 degrees or not greater than 4 degrees or not greater than 3 degrees or not greater than 2 degrees or not greater than 1 degree or not greater than 0.1 degree or not greater than 0.01 degree. In at least one embodiment, the angel of intersection, which can define the parallelism can be at least 0.000001 degrees, such as at least 0.00001 degrees. It will be appreciated that the angle of intersection can be within a range including any of the minimum and maximum values noted above.

In one embodiment, at least one end surface 225, such as a first end surface 225, can be joined to at least one side surface, such as a first side surface 223, at a first obtuse angle 233. In another embodiment, the first end surface 225 can be joined to a second side surface, such as side surface 221 at a first acute angle 234. In one particular embodiment, the first side surface 223 and second side surface 221 can be opposite each other across the width (W) of the body 201. According to another embodiment, the side surface 223 may be substantially parallel to the side surface 221. For still another embodiment, the side surface 223 can be separate from the side surface 221 by at least one intervening side surface 222.

In another aspect, at least one end surface 225 or 226 can be angled with respect to an abutting side surfaces in a non-perpendicular manner Without wishing to be tied to a particular theory, the formation of non-perpendicular angles between the end surfaces 225 and 226 side surfaces 221-223 may facilitate improved performance of the shaped abrasive particles and corresponding fixed abrasive articles using such shaped abrasive particles.

It will also be understood, that in another embodiment from a perpendicular plane defined by the length (L) and thickness of the body 201, the end surface 225 can have an obtuse angle and acute angle between side surface 222 and a side surface opposite and generally parallel to the side surface 222. Still, in another embodiment, the first obtuse angle 233 and first actuate angle 234 may only be visible in view in the plane of the length (L) and width (W) of the body 201.

According to one embodiment, the first acute angle 234 can have a particular angle that may result from particular forming processes, may also facilitate improved performance of the shaped abrasive particles, and may facilitate improved performance of fixed abrasives incorporating such shaped abrasive particles. In one aspect, the first acute angle 234 can be at least 5 degrees, such as at least 8 degrees or at least 10 degrees or at least 15 degrees or at least 20 degrees or at least 25 degrees or at least 30 degrees or at least 35 degrees or at least 40 degrees or at least 45 degrees. In another non-limiting embodiment, the first acute angle 234 may be not greater than 85 degrees, such as not greater than 80 degrees or not greater than 70 degrees or not greater than 60 degrees or not greater than 50 degrees or not greater than 40 degrees or not greater than 30 degrees. It will be appreciated that the first acute angle 234 can have a value within a range including any of the minimum and maximum values noted above.

According to another aspect, the first obtuse angle 233 can have a particular angle that may result from particular forming processes, may also facilitate improved performance of the shaped abrasive particles, and may facilitate improved performance of fixed abrasives incorporating such shaped abrasive particles. In one aspect, the first obtuse angle 233 can be at least 95 degrees, such as at least 100 degrees or at least 110 degrees or at least 120 degrees or at least 130 degrees or at least 140 degrees or at least 150 degrees or at least 160 degrees. In another non-limiting embodiment, the first obtuse angle 233 may be not greater than 175 degrees, such as not greater than 170 degrees or not greater than 160 degrees or not greater than 150 degrees or not greater than 140 degrees or not greater than 130 degrees. It will be appreciated that the first obtuse angle 233 can have a value within a range including any of the minimum and maximum values noted above.

In certain instances, the first obtuse angle 233 and first actuate angle 234 may have a particular relationship. For example, in one embodiment, the first obtuse angle 233 and first actuate angle 234 may be substantially supplementary angles, wherein the sum of the angles is 180 degrees (plus or minus 10 degrees). In a more particular embodiment, the first obtuse angle 233 and first actuate angle 234 may be pure supplementary angles, wherein the sum of the angles is exactly 180 degrees.

In another embodiment, the body 201 can have a second end surface 226 that can be displaced from the first end surface 225 across the length (L) of the body 201. In a particular aspect, the second end surface 226 can be joined to the first side surface 223 at a second obtuse angle 235. In another non-limiting embodiment, the body 201 may have a second acute angle 236 between the second side surface 226 and the second side surface 221.

According to one embodiment, the second acute angle 236 can have a particular angle that may result from particular forming processes, may also facilitate improved performance of the shaped abrasive particles, and may facilitate improved performance of fixed abrasives incorporating such shaped abrasive particles. In one aspect, the second acute angle 236 can be at least 5 degrees, such as at least 8 degrees or at least 10 degrees or at least 15 degrees or at least 20 degrees or at least 25 degrees or at least 30 degrees or at least 35 degrees or at least 40 degrees or at least 45 degrees. In another non-limiting embodiment, the second acute angle 236 may be not greater than 85 degrees, such as not greater than 80 degrees or not greater than 70 degrees or not greater than 60 degrees or not greater than 50 degrees or not greater than 40 degrees or not greater than 30 degrees. It will be appreciated that the second acute angle 236 can have a value within a range including any of the minimum and maximum values noted above.

According to another aspect, the second obtuse angle 235 can have a particular angle that may result from particular forming processes, may also facilitate improved performance of the shaped abrasive particles, and may facilitate improved performance of fixed abrasives incorporating such shaped abrasive particles. In one aspect, the second obtuse angle 235 can be at least 95 degrees, such as at least 100 degrees or at least 110 degrees or at least 120 degrees or at least 130 degrees or at least 140 degrees or at least 150 degrees or at least 160 degrees. In another non-limiting embodiment, the second obtuse angle 235 may be not greater than 175 degrees, such as not greater than 170 degrees or not greater than 160 degrees or not greater than 150 degrees or not greater than 140 degrees or not greater than 130 degrees. It will be appreciated that the second obtuse angle 235 can have a value within a range including any of the minimum and maximum values noted above.

In some aspects, the angles of the body 201 may have particular relationships to each other. For example, in one embodiment, the first obtuse angle 233 and second acute angle 236 may be substantially supplementary angles, wherein the sum of the angles is 180 degrees (plus or minus 10 degrees). In a more particular embodiment, the first obtuse angle 233 and second acute angle 236 may be pure supplementary angles, wherein the sum of the angles is exactly 180 degrees.

In another non-limiting embodiment, the first acute angle 234 and second obtuse angle 235 may be substantially supplementary angles, wherein the sum of the angles is 180 degrees (plus or minus 10 degrees). In a more particular embodiment, the first acute angle 234 and second obtuse angle 235 may be pure supplementary angles, wherein the sum of the angles is exactly 180 degrees.

In another non-limiting embodiment, the first acute angle 234 and second acute angle 236 may be substantially complementary angles, wherein the sum of the angles is 90 degrees (plus or minus 10 degrees). In a more particular embodiment, the first acute angle 234 and second acute angle 236 may be pure complementary angles, wherein the sum of the angles is exactly 90 degrees.

In another non-limiting embodiment, the first acute angle 234 and second acute angle 236 may be substantially complementary angles, wherein the sum of the angles is 90 degrees (plus or minus 10 degrees). In a more particular embodiment, the first acute angle 234 and second acute angle 236 may be pure complementary angles, wherein the sum of the angles is exactly 90 degrees.

In one aspect, the first acute angle 234 and second acute angle 236 may have a particular relationship. For example, in one non-limiting embodiment, the first acute angle 234 (Aa1) may have a value that is not more than 20% different as compared to the value of the second acute angle 236 (Aa2). That is, for example, [Aa1/Aa2]×100%, when Aa1 is less than Aa2 or [Aa2/Aa1]×100% when Aa2 is less than Aa1. In a more particular embodiment, the first acute angle 234 can be no more than 18% different from the value of the second acute angle 236, such as not more than 16% different or not more than 14% different or not more than 12% different or not more than 10% different or not more than 8% different or not more than 6% different or not more than 4% different or not more than 2% different from the value of the second acute angle 236.

In yet another aspect, the first obtuse angle 233 and second obtuse angle 235 may have a particular relationship. For example, in one non-limiting embodiment, the first obtuse angle 233 (Ao1) may have a value that is not more than 20% different as compared to the value of the second obtuse angle 235 (Ao2). That is, for example, [Ao1/Ao2]× 100%, when Ao1 is less than Ao2 or [Ao2/Ao1]×100% when Ao2 is less than Ao1. In a more particular embodiment, the first obtuse angle 233 can be no more than 18% different from the value of the second obtuse angle 235, such as not more than 16% different or not more than 14% different or not more than 12% different or not more than 10% different or not more than 8% different or not more than 6% different or not more than 4% different or not more than 2% different from the value of the second obtuse angle 235.

FIG. 2C includes an image of a shaped abrasive particle in a plane defined by a length and width of the body 201. FIG. 2D includes an image of a shaped abrasive particle in a plane defined by a length and width of the body 201.

As illustrated in the non-limiting embodiments of FIGS. 2C-2D, the shaped abrasive particles 200 and 250 may include a body 201 having a length (L) a width (W), and a thickness (not-illustrated). In one embodiment, the length can be greater than the width. In another embodiment, the length can be greater than the thickness. In still another embodiment, the width may be greater than, equal to or less than the thickness. Unless otherwise stated, reference to any dimensions herein is understood to be reference to an average value from a suitable sample size of measurements and/or particles. For example, reference to the length includes an average length measured as close as possible to the mid-point of the body 201 along the longitudinal axis (L). The width can be measured in a direction perpendicular to the longitudinal axis (L) in the plane of the length and width. The width can be measured as close as possible to the midpoint of the body 201, which can be assumed to be the midpoint between the points where the longitudinal axis (L) intersects the edges of the body 201. The thickness can be measured in the same manner as the width, but in a plane defined by the length and thickness of the particle, wherein the thickness extends in a direction normal to the plane defined by the length and width of the body 201.

In one non-limiting embodiment, a shaped abrasive particle can include a body 201 having a first tip region 210, a second tip 211 and an elongated region 212 between the first and second tip regions 210 and 211. The length of the first tip region 210 and second tip region 211 as measured as the greatest dimension in the direction of the longitudinal axis (L) can vary depending upon the angles between the end surfaces 225 and 226 and side surfaces 221-223. In one aspect, the body 201 may be substantially linear for a majority of the total length of the body 201. As used herein, the term substantially linear refers to a body that does not deviate from a linear axis more than 20%, such as not greater than 10% or not greater than 5%.

In one embodiment, the first and/or second tip regions 210 and 211 may have a tip region length (measured as the greatest distance in the direction of length in the region defined by a reducing width) that is not greater than 90% of the length of the body 201, such as not greater than 80% or not greater than 70% or not greater than 60% or not greater than 50% or not greater than 40% or not greater than 30% or not greater than 20% or not greater than 10% or not greater than 5% of the total average length of the body. In still another non-limiting embodiment, the first and/or second tip regions 210 and 211 can have a tip region length of at least 5% of the length of the body 201, such as at least 10% or at least 15% or at least 20% or at least 25% or at least 30% or at least 40%. It will be appreciated that the tip region length can be within a range including any of the minimum and maximum percentages noted above.

As noted herein, the shaped abrasive particles of certain embodiments may include and elongated region 212 disposed between the first tip region 210 and the second tip region 211. More specifically, the elongated region 212 can extend between the tip regions 210 and 211. In one non-limiting embodiment, the elongated region 212 can have a substantially constant width. For example, in one embodiment the elongated region 212 may have a change in width of not greater than 10% over the length of the elongated region 212, such as not greater than 8% or not greater than 5% or not greater than 3%. In at least one embodiment, the elongated region 212 may have a change in width of at least 0.5%, such as least 1% or at least 2% over the length of the elongated region 212. It will be appreciated that the change in the width of the body 201 in the elongated region 212 may be within a range including any of the minimum and maximum percentages noted above.

In another embodiment, the elongated region 212 may have a change in thickness of not greater than 10% over the length of the elongated region 212, such as not greater than 8% or not greater than 5% or not greater than 3%. In at least one embodiment, the elongated region 212 may have a change in thickness of at least 0.5%, such as least 1% or at least 2% over the length of the elongated region 212. It will be appreciated that the change in the thickness of the body 201 in the elongated region 212 may be within a range including any of the minimum and maximum percentages noted above.

According to one embodiment, the body 201 of the shaped abrasive particles may have a particular primary aspect ratio (length/width) that may result from the disclosed forming process and may also facilitate certain features and/or improved performance. In one aspect, the shaped abrasive particles may have a primary aspect ratio of (length/width) of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10. In another non-limiting embodiment, the body 201 can have a primary aspect ratio of (length/width) of not greater than 1000 or not greater than 100 or not greater than 50 or not greater than 20 or not greater than 10 or not greater than 5 or not greater than 3 or not greater than 2.5. It will be appreciated that the primary aspect ratio of the body 201 can be with a range including any of the minimum and maximum ratios noted above. Furthermore, it will be appreciated that the primary aspect ratio may represent a primary aspect ratio of a single shaped abrasive particle or an average of a plurality of shaped abrasive particles.

All aspect ratios of the embodiments herein are measured by image processing. A plurality of shaped abrasive particles are mounted and set on a stage for imaging. Imaging may be completed via an optical microscope such as a DSX 700 Olympus at a suitable magnification, such as 2×-8×. After taking a suitable image of a suitable statistically relevant sample size of the particles (e.g., at least 200 particles), the image (RGB color or grayscale) is saved as a representative image of the particle's length and width dimensions. See, for example, FIG. 10. The particles are then rotated 90 degrees around the longitudinal axis, such that the dimension of the thickness of each of the particles is visible. An image of the particles is taken and saved as relevant to each particles thickness. The lengths, widths, and thicknesses for each of the particles are measured and the average length, width, and thickness is calculated from the images by image processing software (e.g., ImageJ). For the first picture of the particles in the plane of the length and width, the image is converted to a black and white image via Otsu's method where the white pixels represent the body of the particle. From the black and white image, a best fit ellipse is fit around each of the images of the particles. A best fit ellipse is generated so that the second-moment of the region is preserved. The perpendicular axes of the ellipse (i.e., major axis and minor axis) are used for the length and width, wherein the longer axis represents the length and the shorter axis represents the width or thickness depending upon the plane of the image. The major axis, which defines the length, is defined as the axis on which the foci of the fitted ellipse are presented. The minor axis, which defines the width of the body, is perpendicular to the major axis of the fitted ellipse. The average length and average width are calculated from this image for the plurality of particles. FIGS. 9A and 9B include images of shaped abrasive particles having a best-fit ellipse. The average thickness of the particles is measured in the same manner using the image of the particles in the dimension of length and thickness. The image is altered to a black and white only image, a best fit ellipse is created around each image of each particle and the thickness is measured as the value of the shortest axis of the ellipse. The average thickness is calculated from all of the measured thickness values.

The primary, secondary, and tertiary standard deviations are also calculated from the measured length, width, and thickness values.

In another aspect, the shaped abrasive particles may have a particular primary aspect ratio standard deviation that is distinct from other abrasive particles, particularly elongated shaped abrasive particles that may be formed by particular process, including but not limited to, extrusion. According to one embodiment, the body 201 can have a primary aspect ratio standard deviation [STDEV(length/width)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15. Still, in another non-limiting embodiment, the primary aspect ratio standard deviation [STDEV(length/width)] may be at least 0.01 or at least 0.05 or at least 0.1 or at least 0.15 or at least 0.2 or at least 0.25 or at least 0.30 or at least 0.35 or at least 0.4. It will be appreciated that the primary aspect ratio standard deviation of the body 201 can be with a range including any of the minimum and maximum ratios noted above. Furthermore, it will be appreciated that the primary aspect ratio may represent a primary aspect ratio of a single shaped abrasive particle or an average of a plurality of shaped abrasive particles.

According to one embodiment, the body 201 of the shaped abrasive particles may have a particular secondary aspect ratio (length/thickness) that may result from the disclosed forming process and may also facilitate certain features and/or improved performance. In one non-limiting embodiment, the body 201 can have a secondary aspect ratio of length/thickness that can be at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10. Still, in another non-limiting embodiment, the secondary aspect ratio (length/thickness) may be not greater than 1000 or not greater than 100 or not greater than 50 or not greater than 20 or not greater than 10 or not greater than 5 or not greater than 3 or not greater than 2.5. It will be appreciated the secondary aspect ratio of length/thickness can be with a range including any of the minimum and maximum ratios of above. Furthermore, it will be appreciated that the secondary aspect ratio may represent a secondary aspect ratio of a single shaped abrasive particle or an average of a plurality of shaped abrasive particles.

In another aspect, the shaped abrasive particles may have a particular secondary aspect ratio standard deviation that is distinct from other abrasive particles, particularly elongated shaped abrasive particles that may be formed by particular process, including but not limited to, extrusion. According to one embodiment, the body 201 can have a secondary aspect ratio standard deviation [STDEV(length/thickness)] of not greater than 0.55, such as not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10. Still, in another non-limiting embodiment, the secondary aspect ratio standard deviation [STDEV(length/thickness)] may be at least 0.01 or at least 0.05 or at least 0.07 or at least 0.1 or at least 0.15 or at least 0.2 or at least 0.25 or at least 0.30 or at least 0.35 or at least 0.4. It will be appreciated that the secondary aspect ratio standard deviation of the body 201 can be with a range including any of the minimum and maximum ratios noted above. Furthermore, it will be appreciated that the secondary aspect ratio may represent a secondary aspect ratio of a single shaped abrasive particle or an average of a plurality of shaped abrasive particles.

According to one embodiment, the body 201 of the shaped abrasive particles may have a particular tertiary aspect ratio (width/thickness) that may result from the disclosed forming process and may also facilitate certain features and/or improved performance. In another embodiment, the body 201 can have a tertiary aspect ratio (width/thickness) of at least 0.5, such as at least 0.6 or at least 0.7 or at least 0.8 or at least 0.9 or at least 1.0 or at least 1.1 or at least 1.2 or at least 1.3 or at least 1.4 or at least 1.5 or at least 2 or at least 2.5 or at least 3 or at least 4. In another non-limiting embodiment, the tertiary aspect ratio (width/thickness) can be not greater than 10, such as not greater than 8 or not greater than 5 or not greater than 3 or not greater than 2 or not greater than 1.5 or not greater than 1.3 or not greater than 1.1. It will be appreciated that the tertiary aspect ratio can be with a range including any of the minimum and maximum ratios noted above. Furthermore, it will be appreciated that the tertiary aspect ratio may represent a tertiary aspect ratio of a single shaped abrasive particle or an average of a plurality of shaped abrasive particles.

In another aspect, the shaped abrasive particles may have a particular tertiary aspect ratio standard deviation that is distinct from other abrasive particles, particularly elongated shaped abrasive particles that may be formed by particular process, including but not limited to, extrusion. According to one embodiment, the body 201 can have a tertiary aspect ratio standard deviation [STDEV(width/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10. Still, in another non-limiting embodiment, the tertiary aspect ratio standard deviation [STDEV(width/thickness)] is at least 0.01 or at least 0.05 or at least 0.07 or at least 0.1 or at least 0.15 or at least 0.2 or at least 0.25 or at least 0.30 or at least 0.35 or at least 0.4. It will be appreciated that the tertiary aspect ratio standard deviation of the body 201 can be with a range including any of the minimum and maximum ratios noted above. Furthermore, it will be appreciated that the tertiary aspect ratio may represent a secondary aspect ratio of a single shaped abrasive particle or an average of a plurality of shaped abrasive particles.

In certain instances, a plurality of abrasive particles may include only shaped abrasive particles or a blend of shaped abrasive particles with particles of a different shape. The plurality of abrasive particles may have particular "batch" features as described in embodiments herein. According to one aspect, the plurality of abrasive particles can have particular batch aspect ratios and batch aspect ratio standard deviations that may result from the processes disclosed herein and may further facilitate improved performance. In one non-limiting embodiment, the plurality of abrasive particles may have a primary batch aspect ratio [B(length/width)] of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10. In another non-limiting embodiment, the primary batch aspect ratio [B(length/width)] may be not greater than 1000 or not greater than 100 or not greater than 50 or not greater than 20 or not greater than 10 or not greater than 5 or not greater than 3 or not greater than 2.5. It will be appreciated that the primary batch aspect ratio can be with a range including any of the minimum and maximum ratios noted above. The batch aspect ratios and aspect ratio standard deviations are measured in the same manner as provided above with respect to the aspect ratio and aspect ratio standard deviations for the shaped abrasive particles.

In another aspect, the plurality of abrasive particles may have a particular primary batch aspect ratio standard deviation that is distinct from other abrasive particles, particularly elongated shaped abrasive particles that may be formed by particular process, including but not limited to, extrusion. According to one embodiment, the plurality of particles can have a primary batch aspect ratio standard deviation [STDEV-B(length/width)] of not greater than 0.55, such as not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15. Still, in another non-limiting embodiment, the primary batch aspect ratio standard deviation [STDEV-B(length/width)] can be at least 0.01 or at least 0.05 or at least 0.1 or at least 0.15 or at least 0.2 or at least 0.25 or at least 0.30 or at least 0.35 or at least 0.4. It will be appreciated that the primary batch aspect ratio standard deviation can be with a range including any of the minimum and maximum ratios noted above.

In one non-limiting embodiment, the plurality of abrasive particles may have a secondary batch aspect ratio [B(length/thickness)] of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10. In another non-limiting embodiment, the secondary batch aspect ratio [B(length/thickness)] may be not greater than 1000 or not greater than 100 or not greater than 50 or not greater than 20 or not greater than 10 or not greater than 5 or not greater than 3 or not greater than 2.5. It will be appreciated that the secondary batch aspect ratio can be with a range including any of the minimum and maximum ratios noted above.

In another aspect, the plurality of abrasive particles may have a particular secondary batch aspect ratio standard deviation that is distinct from other abrasive particles. According to one embodiment, the plurality of particles can have a secondary batch aspect ratio standard deviation [STDEV-B(length/thickness)] of not greater than 0.55, such as not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10. Still, in another non-limiting embodiment, the secondary batch aspect ratio standard deviation [STDEV-B(length/thickness)] can be at least 0.01 or at least 0.05 or at least 0.07 or at least 0.1 or at least 0.15 or at least 0.2 or at least 0.25 or at least 0.30 or at least 0.35 or at least 0.4. It will be appreciated that the secondary batch aspect ratio standard deviation can be with a range including any of the minimum and maximum ratios noted above.

In one non-limiting embodiment, the plurality of abrasive particles may have a tertiary batch aspect ratio [B(width/thickness)] of at least 0.5 or at least 0.6 or at least 0.7 or at least 0.8 or at least 0.9 or at least 1.0 or at least 1.1 or at least 1.2 or at least 1.3 or at least 1.4 or at least 1.5 or at least 2 or at least 2.5 or at least 3 or at least 4. In another non-limiting embodiment, the tertiary batch aspect ratio [B(width/thickness)] may be not greater than 10 or not greater than 8 or not greater than 5 or not greater than 3 or not greater than 2 or not greater than 1.5 or not greater than 1.3 or not greater than 1.1. It will be appreciated that the tertiary batch aspect ratio can be with a range including any of the minimum and maximum ratios noted above.

In another aspect, the plurality of abrasive particles may have a particular tertiary batch aspect ratio standard deviation that is distinct from other abrasive particles. According to one embodiment, the plurality of particles can have a tertiary batch aspect ratio standard deviation [STDEV-B(width/thickness)] of not greater than 0.55, such as not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10. Still, in another non-limiting embodiment, the tertiary batch aspect ratio standard deviation [STDEV-B(width/thickness)] can be at least 0.01 or at least 0.05 or at least 0.07 or at least 0.1 or at least 0.15 or at least 0.2 or at least 0.25 or at least 0.30 or at least 0.35 or at least 0.4. It will be appreciated that the tertiary batch aspect ratio standard deviation can be with a range including any of the minimum and maximum ratios noted above.

The shaped abrasive particles of the embodiments herein can have a body including a crystalline material, and more particularly, a polycrystalline material. Notably, the polycrystalline material can include abrasive grains (i.e., crystallites). In one embodiment, the body of the abrasive particle can be essentially free of an organic material, including for example, a binder. In at least one embodiment, the abrasive particles can consist essentially of a polycrystalline material.

The abrasive grains (i.e., crystallites) contained within the body 201 of the shaped abrasive particles may have an average grain size that is generally not greater than 20 microns, such as not greater than 18 microns or not greater than 16 microns or not greater than 14 microns or not greater than 12 microns or not greater than 10 microns or not greater than 8 micron or not greater than 5 microns or not greater than 2 microns or not greater than 1 micron or not greater than 0.9 microns or not greater than 0.8 microns or not greater than 0.7 microns or even not greater than 0.6 microns or even not greater than 0.2 microns. Still, the average grain size of the abrasive grains contained within the body 201 of the abrasive particles can be at least 0.01 microns, such as at least 0.05 microns or at least 0.06 microns or at least 0.07 microns or at least 0.08 microns or at least 0.09 microns or at least 0.1 microns or at least 0.12 microns or at least 0.15 microns or at least 0.17 microns or at least 0.2 microns or even at least 0.5 microns. It will be appreciated that the abrasive grains can have an average grain size within a range including any of the minimum and maximum values noted above. The average grain size can be calculated using the uncorrected intercept method as known to those of skill in the art.

In accordance with an embodiment, the body 201 of the shaped abrasive particle can have an average particle size, as measured by the largest dimension measurable on the body (i.e., the length), of at least 100 microns. In fact, the body 201 of the shaped abrasive particle can have an average particle size of at least 150 microns, such as at least 200 microns or at least 300 microns or at least 400 microns or at least 500 microns or at least 500 microns or at least 600 microns or at least 800 microns or even at least 900 microns. Still, the body 201 of the shaped abrasive particle can have an average particle size that is not greater than 5 mm, such as not greater than 3 mm or not greater than 2 mm or even not greater than 1.5 mm. It will be appreciated that the body of the abrasive particle can have an average particle size within a range including any of the minimum and maximum values noted above.

Particles for use in the abrasives industry are generally graded to a given particle size distribution before use. Such distributions typically have a range of particle sizes, from coarse particles to fine particles. In the abrasive art, this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, PI 80, P220, P320, P400, P500, P600, P800, P1000, and P1000. JIS grade designations include JIS8, JIS12, JIS 16, JIS24, JIS36, JIS46, JIS54, JIS60, JIS80, JIS 100, JIS150, JIS180, JIS220, JIS240, JIS280, JIS320, JIS360, JIS400, JIS600, JIS800, JIS 1000, JIS 1500, JIS2500, JIS4000, JIS6000, JIS8000, and JIS10,000. Alternatively, the abrasive particles can be graded to a nominal screened grade using U.S.A. Standard Test Sieves conforming to ASTM E-11 "Standard Specification for Wire Cloth and Sieves for Testing Purposes." ASTM E-11 prescribes the requirements for the design and construction of testing sieves using a medium of woven wire cloth mounted in a frame for the classification of materials according to a designated particle size. A typical designation may be represented as −18+20 meaning that the particles pass through a test sieve meeting ASTM E-11 specifications for the number 18 sieve and are retained on a test sieve meeting ASTM E-11 specifications for the number 20 sieve. In various embodiments, the particulate material can have a nominal screened grade comprising: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100. The body of the particulate material may be in the form of a shaped abrasive particle, as described in more detail herein.

Some suitable materials for use in the body 201 of the shaped abrasive particles can include a ceramic material, including but not limited to, nitrides, oxides, carbides, borides, oxynitrides, oxyborides, oxycarbides, carbon-based materials, diamond, naturally occurring minerals, rare-earth-containing materials, natural minerals, synthetic materials, or any combination thereof. In particular instances, the shaped abrasive particles can include an oxide compound, such as aluminum oxide, zirconium oxide, titanium oxide, yttrium oxide, chromium oxide, strontium oxide, silicon oxide, magnesium oxide, rare-earth oxides, or any combination thereof.

In one particular embodiment, the body 201 can include at least 95 wt % alumina for the total weight of the body 201. Still, in certain instances, the body can include not greater than 99.5 wt % alumina for the total weight of the body. In at least one embodiment, the body 201 can consist essentially of alumina, and more particularly, consist essentially of alpha alumina. In certain instances, the body 201 may be formed such that it includes not greater than about 1 wt % of any low-temperature alumina phases. As used herein, low temperature alumina phases can include transition phase aluminas, bauxites or hydrated alumina, including for example gibbsite, boehmite, diaspore, and mixtures containing such compounds and minerals. Certain low temperature alumina materials may also include some content of iron oxide. Moreover, low temperature alumina phases may include other minerals, such as goethite, hematite, kaolinite, and anastase.

Moreover, in particular instances, the body 201 of the shaped abrasive particles can be formed from a seeded sol-gel. In at least one embodiment, the body of any of the abrasive particles of the embodiments herein may be essentially free of iron, rare-earth oxides, and a combination thereof. Reference herein to a body having a certain features (e.g., composition) will also be understood to refer to a batch of abrasive particles that can have the same feature (e.g., composition).

In accordance with certain embodiments, certain shaped abrasive particles can be compositional composites, such that at least two different types of grains are contained within the body of the abrasive particle. It will be appreciated that different types of grains are crystallite grains having different compositions with regard to each other. For example, the body of the abrasive particle can be formed such that it includes at least two different types of grains, wherein the types of grains are selected from the group of nitrides, oxides, carbides, borides, oxynitrides, oxyborides, oxycarbides, carbon-based materials, diamond, naturally occurring minerals, rare-earth-containing materials, natural minerals, synthetic materials, and a combination thereof.

The body 201 of the shaped abrasive particles may include additives, such as dopants, which may be in the form of elements or compounds (e.g., oxides). Certain suitable additives can include any of the materials described herein. The body of an abrasive article may include a specific content of one or more additives (e.g., dopant). For example, the body may include not greater than about 30 wt % additives for the total weight of the body. In still other embodiments, the amount of additives may be less, such as not greater than about 25 wt % or not greater than about 20 wt % or not greater than about 18 wt % or not greater than about 15 wt % or not greater than about 12 wt % or not greater than about 10 wt % or not greater than about 8 wt % or not greater than 5 wt % or not greater than 2 wt %. Still, the amount of additives can be at least about 0.5 wt % for a total weight of the body, such as at least about 1 wt %, at least about 2 wt % or at least about 3 wt % or at least about 4 wt % or at least about 5 wt % or at least about 8 wt % or even at least about 10 wt %. It will be appreciated that the amount of additive within the body may be within a range including any of the minimum and maximum percentages noted above.

The body of the abrasive particle may be particularly dense. For example, the body may have a density of at least about 95% theoretical density, such as at least about 96% or at least 97% or at least 98% or at least 99% theoretical density.

The shaped abrasive particles of the embodiments herein are a particular type of shaped abrasive particle. Shaped abrasive particles can be formed such that each particle has substantially the same arrangement of surfaces and edges relative to each other. For example, a group of shaped abrasive particles generally have the same arrangement and orientation and or two-dimensional shape of the surfaces and edges relative to each other. As such, the shaped abrasive particles have a relatively high shape fidelity and consistency in the arrangement of the surfaces and edges relative to each other. Moreover, constant height (or thickness) abrasive particles (CHAPs) can also be formed through particular processes that facilitate formation of thin-shaped bodies that can have irregular two-dimensional shapes when viewing the major surface top-down or the particle in the plane of the length and width. CHAPs can have less shape fidelity than shaped abrasive particles, but can have substantially planar and parallel major surfaces separated by a side surface.

By contrast, non-shaped particles can be formed through different processes and have different shape attributes compared to shaped abrasive particles and CHAPs. For example, non-shaped particles are typically formed by a comminution process wherein a mass of material is formed and then crushed and sieved to obtain abrasive particles of a certain size. However, a non-shaped particle will have a generally random arrangement of surfaces and edges, and generally will lack any recognizable two-dimensional or three-dimensional shape in the arrangement of the surfaces and edges. Moreover, non-shaped particles do not necessarily have a consistent shape with respect to each other, and therefore have a significantly lower shape fidelity compared to shaped abrasive particles or CHAPs. The non-shaped particles generally are defined by a random arrangement of surfaces and edges for each particle and with respect to other non-shaped particles.

Figure 3:
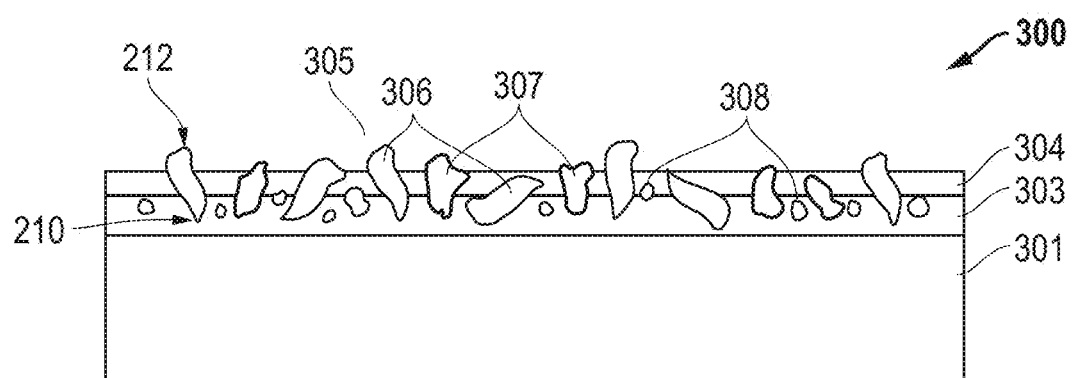
FIG. 3 includes a cross-sectional illustration of a portion of a coated abrasive article according to an embodiment.

FIG. 3 includes a cross-sectional illustration of a coated abrasive article incorporating the shaped abrasive particles in accordance with an embodiment. As illustrated, the coated abrasive 300 can include a substrate 301 and a make coat 303 overlying a surface of the substrate 301. In one particular embodiment, the coated abrasive 300 can further include a plurality of abrasive particles 305. The plurality of abrasive particles 305 may include, but need not necessarily include, different types of abrasive particles. For example, the plurality of abrasive particles 305 may include a first type of abrasive particle 406 (e.g., shaped abrasive particles), a second type of abrasive particle 307 (e.g., unshaped or irregular abrasive particles), and optionally a third type of abrasive particle 308 (e.g., diluent abrasive particles), which may have a random shape. The coated abrasive 300 may further include size coat 304 overlying and bonded to the plurality of abrasive particles 305 and the make coat 303.

In accordance with an embodiment, the plurality of abrasive particles included in the coated abrasive article can include at least a portion of shaped abrasive particles. For example, in one embodiment, at least 5% of the abrasive particles in the plurality of abrasive particles a coated abrasive article can include shaped abrasive particles as calculated based on the number of particles. In other embodiments, the content of shaped abrasive particles can be greater, such as at least 10% or at least 20% or at least 30% or at least 40% or at least 50% or at least 60% or at least 70% or at least 80% or at least 90% or at least 95% or at least 99%. In one embodiment, the plurality of abrasive particles on a coated abrasive can consist entirely of shaped abrasive particles. Still, in one non-limiting embodiment, the plurality of abrasive particles may include not greater than 99% shaped abrasive particles calculated on the number of particles in the plurality, such as not greater than 95% or not greater than 90% or not greater than 80% or not greater than 70% or not greater than 60% or not greater than 50%. It will be appreciated that the percentage of shaped abrasive particles present in the plurality of abrasive particles can be within a range including any of the minimum and maximum values noted above. The above percentages may represent a percentage based on total count of the abrasive particles of weight percent based on the total weight of the plurality of abrasive particles.

According to one embodiment, the substrate 301 can include an organic material, inorganic material, and a combination thereof. In certain instances, the substrate 301 can include a woven material. However, the substrate 301 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 303 can be applied to the surface of the substrate 301 in a single process, or alternatively, the plurality of abrasive particles 305 can be combined with a make coat 303 material and applied as a mixture to the surface of the substrate 301. Suitable materials of the make coat 303 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 303 can include a polyester resin. The coated substrate can then be heated in order to cure the resin and the abrasive particulate material to the substrate. In general, the coated substrate 301 can be heated to a temperature of between about 100° C. to less than about 250° C. during this curing process.

Moreover, it will be appreciated that the coated abrasive article 300 can include one or more types of abrasive particles in the plurality of abrasive particles 305. The different types of abrasive particles can differ from each other in composition, two-dimensional shape, three-dimensional shape, grain size, particle size, hardness, friability, agglomeration, or any combination thereof. In one embodiment, the coated abrasive article 300 can include different amounts of the different types of abrasive particles depending upon the application. It will be appreciated that in some embodiments the coated abrasive may not necessarily include different types of shaped abrasive particles and can consist essentially of a single type of shaped abrasive particle.

According to one particular embodiment, the plurality of abrasive particles 305 may include a limited content of agglomerated particles, and more particularly, a limited content of agglomerated tapered particles. Some agglomerates of shaped abrasive particles may be joined or sinter-bonded to each other. In one aspect, the plurality of abrasive particles 305 may include not greater than 50% of agglomerated particles for a total count of particles in the plurality of abrasive particles 305, such as not greater than 48% or not greater than 46% or not greater than 44% or not greater than 42% or not greater than 40% or not greater than 38% or not greater than 36% or not greater than 34% or not greater than 32% or not greater than 30% or not greater than 28% or not greater than 26% or not greater than 24% or not greater than 22% or not greater than 20% or not greater than 18% or not greater than 16% or not greater than 14% or not greater than 12% or not greater than 10% or not greater than 8% or not greater than 6% or not greater than 4% or not greater than 2%. In one particular embodiment, the plurality of abrasive particles 305 can be free of agglomerated particles, and more particularly, shaped abrasive particles that are joined or sinter-bonded to each other. Notably, in certain conventional fixed abrasive articles including shaped abrasive particles, the fixed abrasive particles may agglomerate in the form of "twins" or "triplets" which are particles that are sintered to each other. The processes herein may facilitate formation of batches of abrasive particles and fixed abrasives including a plurality of abrasive particles having a limited content of agglomerated particles.

Figure 4:
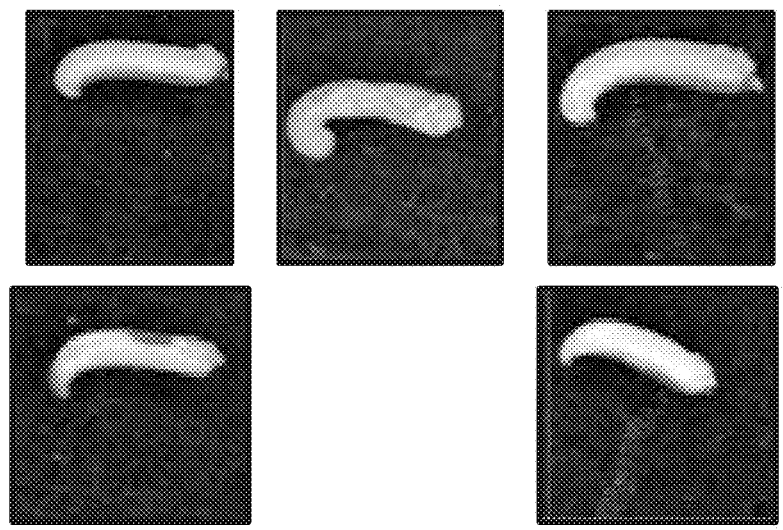
FIG. 4 includes images of various hook-shaped abrasive particles.

Furthermore, in one embodiment, the plurality of abrasive particles 305 may include a limited content of hook-shaped abrasive particles. Hook shaped abrasive particles may include extruded, hook-shaped abrasive particles. Hook-shaped abrasive particles are characterized by at least one end of the body that curls significantly back toward the particle to be characterized as a hook-shape. FIG. 4 includes images of various hook-shaped abrasive particles.

Various methods may be used to place the abrasive particles on the backing (i.e., substrate), including for example, but not limited to, projection (e.g., mechanical or electrostatic), gravity feeding, production tools with suitably sized openings to temporarily hold the abrasive particles in a desired orientation until they are transferred to the backing or an adhesive layer, vibration, pick-and-place systems, and the like. Certain methodologies may be more suitable for controlling one or more aspects of the position and/or orientation of the abrasive particles relative to each other and the backing.

According to one particular embodiment, the shaped abrasive particles may have a particular orientation, such as a vertical orientation relative to the substrate 301. As described in other embodiments herein, the shaped abrasive particles 306 can have a first tip region 210 and a second tip region 211 opposite the first tip region 210 across the length of the body 201. In one aspect, a certain content of shaped abrasive particles 306 can be oriented with at least one tip region 210 or 211 closer to the substrate 301 than the elongated region 212, and particularly with a tilt angle greater than 45 degrees, as described in other embodiments herein. In at least one embodiment, a majority of the shaped abrasive particles can have a vertical orientation, such as at least 60%, such as at least 70% or at least 80% or at least 90% of the shaped abrasive particles.

After sufficiently forming the make coat 303 with the plurality of abrasive particles 305 contained therein, the size coat 304 can be formed to overlie and bond the plurality of abrasive particles 305 to the substrate 301. The size coat 304 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 5:
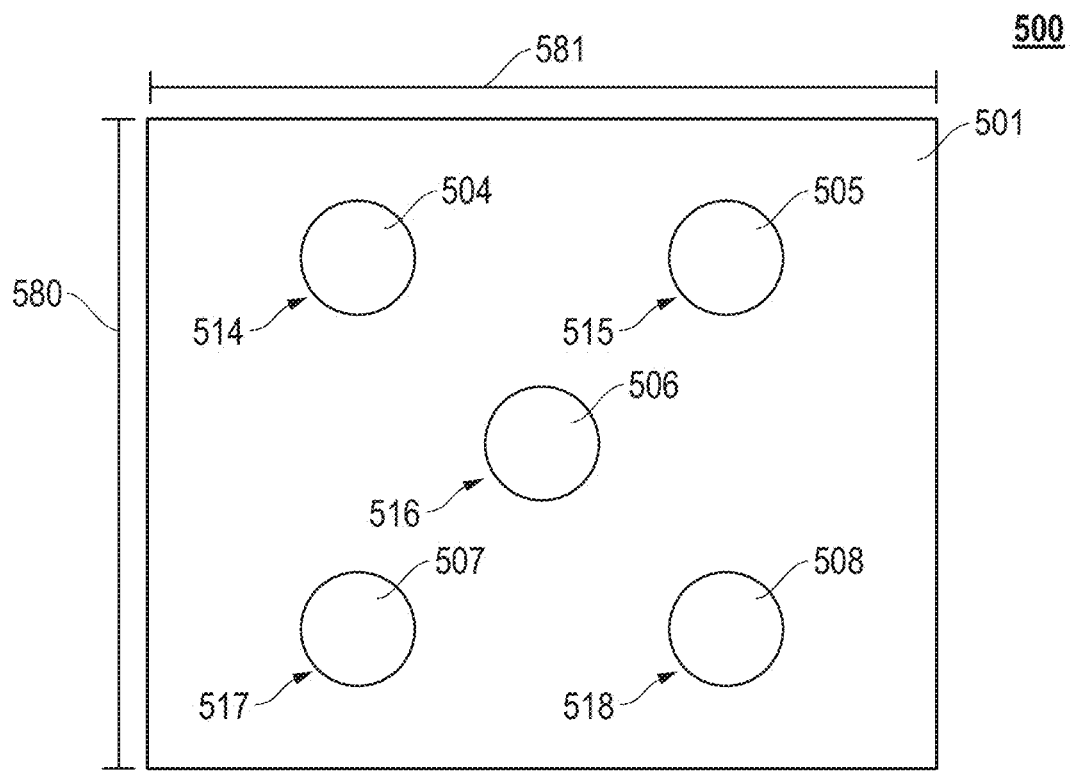
FIG. 5 includes a top-view illustration of a portion of a coated abrasive article according to an embodiment.

FIG. 5 includes a top-view illustration of a portion of a coated abrasive article according to an embodiment. As illustrated, the coated abrasive article 500 can include a backing 501 and a plurality of abrasive particles 503 including shaped abrasive particles 504, 505, 506, 507, and 508 (504-508) overlying the backing 501, and more particularly, coupled to the backing 501. It will be appreciated that the shaped abrasive particles are depicted as circles for ease of reference and not for accuracy of shape. In one embodiment, at least a portion, such as a majority or even all of the plurality of abrasive particles 503 can be placed in predetermined positions on the backing 501. According to one embodiment, the plurality of abrasive particles 503 can have a predetermined position relative to each other. In a particular embodiment, the plurality of abrasive particles 503 may have at least one of a predetermined lateral position, a predetermined longitudinal position, a predetermined radial position, a predetermined rotational orientation, and/or a predetermined tilt angle relative to the backing 501 and relative to each other. In a more particular embodiment, the plurality of abrasive particles 503 may have a combination of two or more of a predetermined lateral position, a predetermined longitudinal position, a predetermined radial position, a predetermined rotational orientation or a predetermined tilt angle relative to the backing 501 and relative to each other.

According to a particular embodiment, each of the shaped abrasive particles 504-508 may be disposed in a predetermined position on the backing 501. For example, each of the shaped abrasive particles 504-508 may have at least one of a predetermined lateral position, a predetermined longitudinal position, a predetermined radial position, and/or a predetermined rotational orientation relative to the backing 501 and relative to each other. In a more particular embodiment, each of the shaped abrasive particles 504-508 may have a combination of two or more of a predetermined lateral position, a predetermined longitudinal position, a predetermined radial position, and/or a predetermined rotational orientation relative to the backing 501 and relative to each other.

According to one aspect, the shaped abrasive particles 504-508 are disposed on predetermined lateral and longitudinal positions on the backing 501. As illustrated in the non-limiting embodiment of FIG. 5, the shaped abrasive particle 504 is disposed at a predetermined position 514, the shaped abrasive particle 505 is disposed at a predetermined position 515, the shaped abrasive particle 506 is disposed at a predetermined position 516, the shaped abrasive particle 507 is disposed at a predetermined position 517, and the shaped abrasive particle 508 is disposed at a predetermined position 518. Each of the predetermined positions 514, 515, 516, 517, and 518 (514-518) define a position on the backing relative to the longitudinal and lateral axes 580 and 581, respectively. The longitudinal axis 580 can extend along and define a length of the backing 501 and a lateral axis 581 can extend along and define a width of a backing 501. The lateral axis 581 can be perpendicular to the longitudinal axis 580 in the plane of the backing 501. It will be appreciated that the spacing between adjacent abrasive particles (e.g., shaped abrasive particles 504-508) can be modified depending upon the content and desired distribution of the abrasive particles. Moreover, it will also be appreciated that such predetermined positions are equally applicable to ellipsoidal backings, which do not necessarily have longitudinal and lateral axes, but have radial axes extending through 360 degrees and distances from a center.

In accordance with another embodiment, the plurality of abrasive particles 503 on a coated abrasive article can be arranged in a predetermined distribution relative to each other as viewed top-down. A predetermined distribution can be defined by a combination of predetermined positions on a backing that are purposefully selected. In one embodiment, a predetermined distribution can include a pattern, such that the predetermined positions can define a two-dimensional array. In another embodiment, an array may include have short range order defined by a unit of abrasive particles. In yet another aspect, an array may also be a pattern, having long range order including regular and repetitive units linked together, such that the arrangement may be symmetrical and/or predictable. In some instances, an array may have an order that can be predicted by a mathematical formula. It will be appreciated that two-dimensional arrays can be formed in the shape of polygons, ellipsis, ornamental indicia, product indicia, or other designs.

In another aspect, a predetermined distribution can also include a non-shadowing arrangement. For example, a non-shadowing arrangement may include a controlled, non-uniform distribution, a controlled uniform distribution, and a combination thereof. In some non-limiting instances, a non-shadowing arrangement may include a radial pattern, a spiral pattern, a phyllotactic pattern, an asymmetric pattern, a self-avoiding random distribution, a self-avoiding random distribution and a combination thereof. In one embodiment, a non-shadowing arrangement may include a particular arrangement of abrasive particles (i.e., shaped abrasive particles and/or diluent particles) relative to each other, wherein the degree of overlap of the abrasive particles during an initial phase of a material removal operation is not greater than about 25%, such as not greater than about 20%, not greater than about 15%, not greater than about 10%, or even not greater than about 5%. In particular instances, a non-shadowing arrangement may include a distribution of abrasive particles, wherein upon engagement with a workpiece during an initial stage of a material removal operation, a portion (e.g., a minority of all shaped abrasive particles on the backing, a majority of all shaped abrasive particles on the backing, or even essentially all) of the abrasive particles engage a different region of the surface of the workpiece. A non-shadowing arrangement may utilize a particular distribution of shaped abrasive particles relative to each other and relative to a grinding direction and/or one or more axes of the backing.

In one embodiment, the predetermined distribution can be partially, substantially, or fully asymmetric. For example, according to one embodiment, the predetermined distribution can overlie the entire abrasive article, can cover substantially the entire abrasive article (i.e. greater than 50% but less than 100%), overlie multiple portions of the abrasive article, or overlie a fraction of the abrasive article (i.e, less than 50% of the surface area of the article). As used herein, "a phyllotactic pattern" means a pattern related to phyllotaxis. Phyllotaxis is the arrangement of lateral organs such as leaves, flowers, scales, florets, and seeds in many kinds of plants. Many phyllotactic patterns are marked by the naturally occurring phenomenon of conspicuous patterns having arcs, spirals, and whorls. The pattern of seeds in the head of a sunflower is an example of this phenomenon.

Figure 6A:
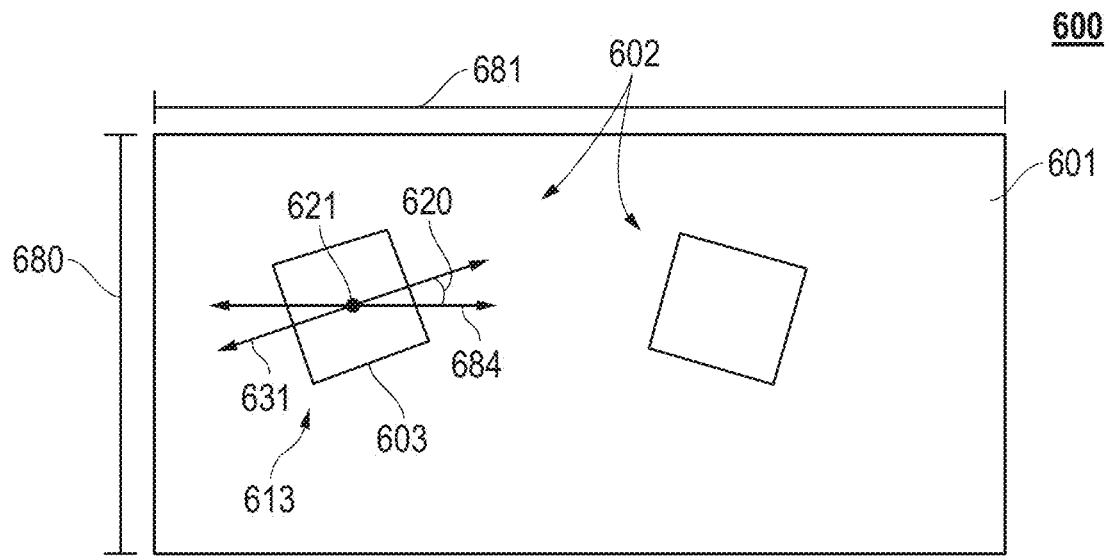
FIG. 6A includes a top-down illustration of a portion of a coated abrasive article according to an embodiment.

FIG. 6A includes a top-down illustration of a portion of a coated abrasive article according to an embodiment. The coated abrasive article 600 includes a backing 601 and a plurality of abrasive particles 602, which may include one or more shaped abrasive particles. In one embodiment, at least a portion of plurality of abrasive particles 602 may have a predetermined rotational orientation, which may be the orientation of an abrasive particle around a Z-axis extending perpendicular to the plane of the backing 601. In one embodiment, the abrasive particle 603 overlying the backing 601 in a first position 613 may have a rotational orientation relative to a lateral axis 681 defining the width of the backing 601. In particular aspects, the abrasive particle 603 can have a predetermined rotational orientation defined by a rotational angle 620. The rotational angle 620 can be the smallest angle formed between the lateral plane 684 extending through the center point 621 and a bisecting axis 631 parallel to the reference dimension of the particle (e.g., thickness or width) also extending through the center point 621 as viewed top-down. According to one embodiment, the abrasive particle 602 can have a predetermined rotational orientation defined by the rotational angle 620 which is measured as the smallest angle between a bisecting axis 631 and the lateral plane 184. In accordance with an embodiment, the rotational angle 201 can be 0 degrees, such as at least about 2 degrees, at least about 5 degrees, at least about 10 degrees, at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees, at least about 70 degrees, at least about 80 degrees, or even at least about 85 degrees. Still, the predetermined rotational orientation as defined by the rotational angle 201 may be not greater than about 90 degrees, such as not greater than about 85 degrees, not greater than about 80 degrees, not greater than about 75 degrees, not greater than about 70 degrees, not greater than about 65 degrees, not greater than about 60 degrees, such as not greater than about 55 degrees, not greater than about 50 degrees, not greater than about 45 degrees, not greater than about 40 degrees, not greater than about 35 degrees, not greater than about 30 degrees, not greater than about 25 degrees, not greater than about 20 degrees, such as not greater than about 15 degrees, not greater than about 10 degrees, or even not greater than about 5 degrees. It will be appreciated that the predetermined rotational orientation can be within a range between any of the above minimum and maximum values.

Figure 6B:
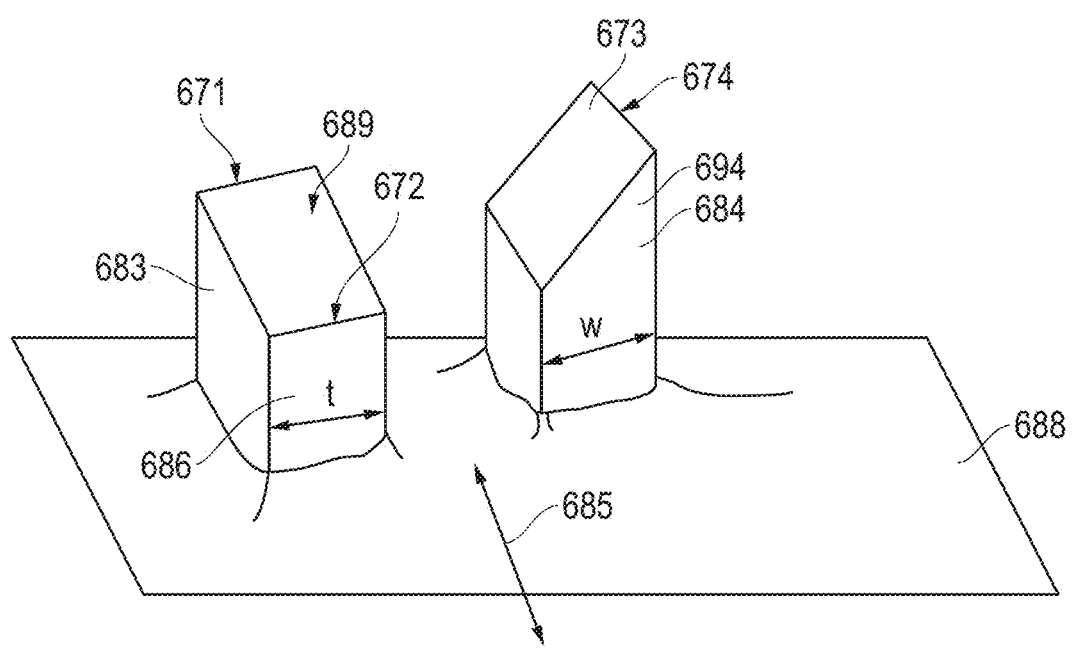
FIG. 6B includes a perspective view illustration of a portion of a coated abrasive article according to an embodiment.

FIG. 6B includes a perspective view illustration of two orientations for the shaped abrasive particles of the embodiments herein. In one embodiment, the shaped abrasive particle 683 is in a front orientation relative to the grinding direction 685, which may also relate in a similar manner to one or more dimensions of the substrate 688 to which the shaped abrasive particle 683 is attached. In the front orientation, grinding will be initiated by surface of 686 or 689, and more particularly, likely initiated at edges 671 or 672. In a front orientation, the dimension of thickness (t) of the body may be substantially orthogonal (90 degrees plus or minus 45 degrees or even plus or minus 20 degrees) to the grinding direction 685 or corresponding dimensions of the substrate.

Figure 7:
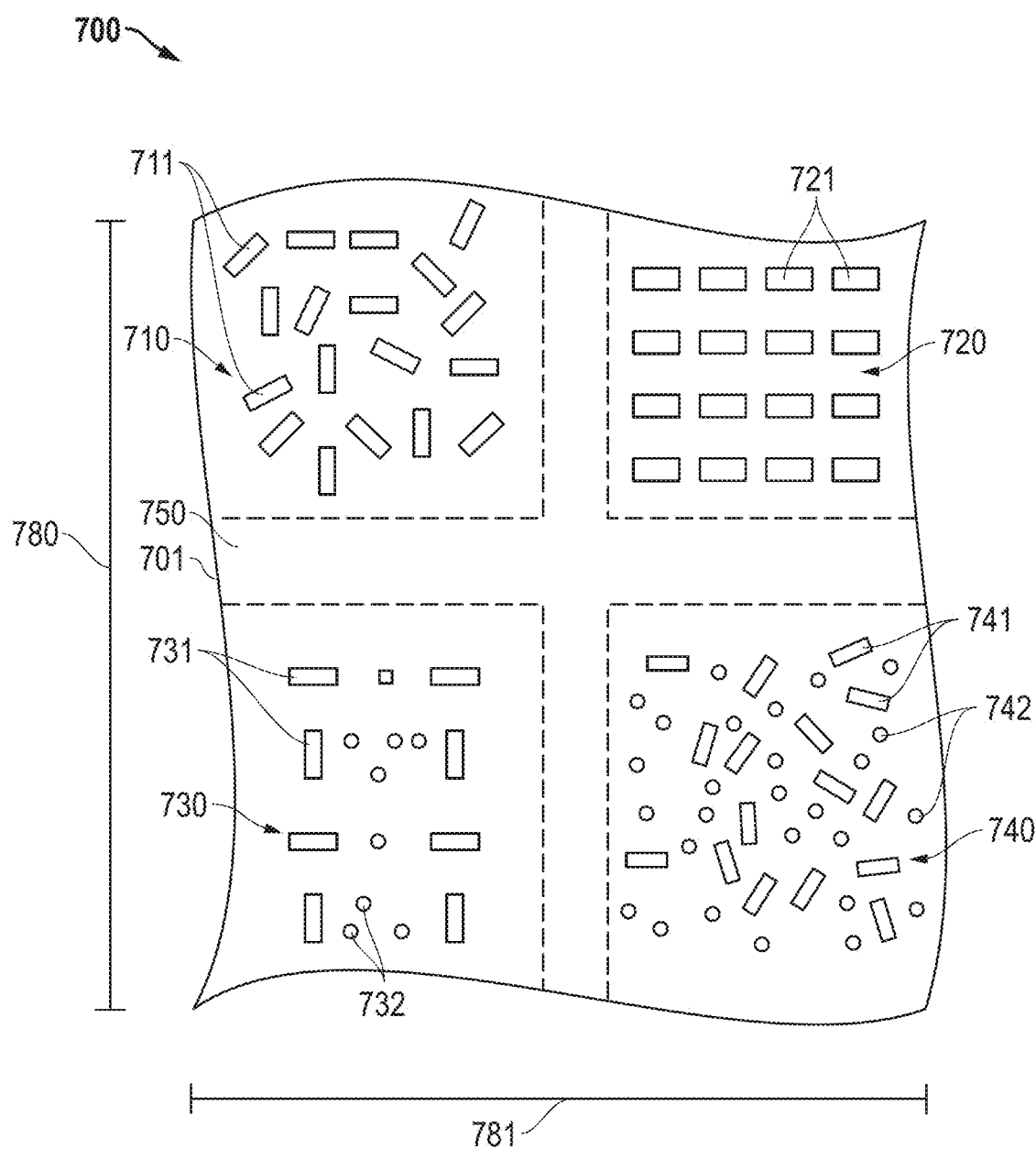
FIG. 7 includes a top-down illustration of a portion of a coated abrasive article according to an embodiment.

In another embodiment, the shaped abrasive particle 694 is in a side orientation relative to the grinding direction 685, which may also relate in a similar manner to one or more dimensions of the substrate 688 to which the shaped abrasive particle 694 is attached. In the side orientation, grinding will be initiated by surface of 687 or 673, and more particularly, likely initiated at edge 674. In a side orientation, the dimension of width (W) of the body may be substantially orthogonal (90 degrees plus or minus 45 degrees or even plus or minus 20 degrees) to the grinding direction 685 or corresponding dimensions of the substrate 688. FIG. 7 includes a top-down illustration of a portion of a coated abrasive article according to an embodiment. In one embodiment, the coated abrasive article 700 can include a substrate 701 including a longitudinal axis 780 and a lateral axis 781. The coated abrasive article 700 may further include plurality of regions, such as a first region 710, a second region 720, a third region 730 and a fourth region 740. In one aspect, each of the regions 710, 720, 730, and 740 can be separated by a channel region 750, wherein the channel region 750 defines a region the backing that is free of particles. The channel region 750 can have any size and shape and may be particularly useful for removing swarf and improved grinding operations. In a particular embodiment, the channel region 750 may have a length (i.e., longest dimension) and width (i.e., shortest dimension perpendicular to the length) that is greater than the average spacing between immediately adjacent abrasive particles within any of the regions 710, 720, 730, and 740. The channel region 750 can be an optional feature for any of the embodiments herein.

According to one embodiment, the first region 710 can include a group of abrasive particles 711 having a generally random rotational orientation with respect to each other. The group of abrasive particles 711 can be arranged in a random distribution relative to each other, such that there is no discernable short-range order or long-range order with regard to the placement of the group of abrasive particles 711. In one embodiment, the group of abrasive particles 711 may be substantially homogenously distributed within the first region 710, such that the formation of clumps (two or more particles in contact with each other) is limited.

In another aspect, the second region 720 can include a group of abrasive particles 721 arranged in a controlled distribution relative to each other. For one embodiment, the group of abrasive particles 721 can have a regular and controlled rotational orientation relative to each other. In another embodiment, the group of shaped abrasive particles 721 can have generally the same rotational orientation as defined by the same rotational angle on the backing of the coated abrasive 701. In one aspect, the group of shaped abrasive particles 721 can be substantially homogenously distributed within the second region 720, such that the formation of clumps (two or more particles in contact with each other) is limited.

According to another aspect, the third region 730 can include a group of abrasive particles 731 and secondary particles 732. In one embodiment, the group of abrasive particles 731 and secondary particles 732 can be arranged in a controlled distribution relative to each other. For example, the group of shaped abrasive particles 731 can have a regular and controlled rotational orientation relative to each other. According to another non-limiting embodiment, the group of shaped abrasive particles 731 can have generally one of two types of rotational orientations on the backing of the coated abrasive 701. In one instance, the group of shaped abrasive particles 731 and secondary particles 732 can be substantially homogenously distributed within the third region 730, such that the formation of clumps (two or more particles in contact with each other) is limited.

For another aspect, a fourth region 740 can include a group of abrasive particles 741 and secondary particles 742 having a generally random distribution with respect to each other. For example, the group of abrasive particles 741 can have a random rotational orientation with respect to each other. In one embodiment, group of abrasive particles 741 and secondary particles 742 can be arranged in a random distribution relative to each other, such that there is no discernable short-range or long-range order. In another embodiment, the group of shaped abrasive particles 741 and the secondary particles 742 can be substantially homogenously distributed within the fourth region 740, such that the formation of clumps (two or more particles in contact with each other) is limited.

The coated abrasive article 700 can include different regions 710, 720, 730, and 740, each of which can include different groups of particles, such as shaped particles and secondary particles. The coated abrasive article 700 is intended to illustrate the different types of groupings, arrangements, and distributions of particles that may be created using the systems and processes of the embodiments herein. The illustration is not intended to be limited to only those groupings of particles and it will be appreciated that coated abrasive articles can be made including only one region as illustrated in FIG. 7. It will also be understood that other coated abrasive articles can be made including a different combination or arrangement of one or more of the regions illustrated in FIG. 7.

FIG. 8 includes a side-view illustration of abrasive particles on a backing according to an embodiment. In one aspect, the coated abrasive articles of the embodiments herein can have plurality of abrasive particles having a controlled tilt angle, which may facilitate improved performance. To better understand these features, FIG. 8 provides a side-view illustration of three abrasive particles in various orientations. It will be appreciated that the coated abrasive articles of the embodiments herein can have various contents of particles in the depicted orientations as described in more detail herein. The first particle 802 can have a particle axis 803 extending at a particular tilt angle 804 relative to the surface of the backing 801. The particle axis 803 can be parallel to the longitudinal axis of the first particle 802 that defines the length of the first particle 802. The first particle 802 is representative of a particle in an upright orientation having a tilt angle 804 within a range of greater than 71 degrees to 90 degrees. The second particle 811 can have a particle axis 812 extending at a particular tilt angle 813 relative to the surface of the backing 801. The particle axis 812 can be parallel to a longitudinal axis of the second particle 811 that defines the length of the second particle 811. The second particle 811 is representative of a particle in a slanted orientation having a tilt angle 813 within a range of greater than 44 degrees to 71 degrees. The third particle 821 can have a particle axis 822 extending at a particular tilt angle 823 relative to the surface of the backing 801. The particle axis 822 can be parallel to a longitudinal axis of the third particle 821 that defines the length of the third particle 821. The third particle 821 is representative of a particle in a flat orientation having a tilt angle 823 within a range of at least 0 degrees to not greater than 44 degrees. It will be appreciated that the first, second and third particles 802, 811 and 821, respectively, can be any type of particle, including but not limited to, shaped abrasive particles as described in the embodiments herein.

According to one aspect, the plurality of abrasive particles on the coated abrasive may have a particular tilt angle, such as at least 2 degrees, such as at least 5 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 70 degrees, at least 80 degrees, or even at least 85 degrees. Still, the tilt angle 136 may be not greater than about 90 degrees, such as not greater than about 85 degrees, not greater than about 80 degrees, not greater than about 75 degrees, not greater than about 70 degrees, not greater than about 65 degrees, not greater than about 60 degrees, such as not greater than about 55 degrees, not greater than about 50 degrees, not greater than about 45 degrees, not greater than about 40 degrees, not greater than about 35 degrees, not greater than about 30 degrees, not greater than about 25 degrees, not greater than about 20 degrees, such as not greater than about 15 degrees, not greater than about 10 degrees, or even not greater than about 5 degrees. It will be appreciated that the tilt angle can be within a range between any of the above minimum and maximum degrees. The tilt angle may be measured using techniques disclosed in US 2019/0160630 incorporated by reference herein in its entirety.

According to one particular aspect, the content of abrasive particles overlying the backing can be controlled based on the intended application. For example, the plurality abrasive particles can be overlying at least 5% of the total surface area of the backing, such as at least 10% or at least 20% or at least 30% or at least 40% or at least 50% or at least 60% or at least 70% or at least 80% or at least 90%. In still another embodiment, the coated abrasive article may be essentially free of silane.

Furthermore, the abrasive articles of the embodiments herein can have a particular content of particles overlying the substrate. In one embodiment, the particles can define an open coat abrasive product having a coating density of particles (i.e., abrasive particles, secondary particles, or both abrasive particles and secondary particles) of not greater than about 70 particles/cm$^2$. In other instances, the density of particles per square centimeter of the abrasive article may be not greater than about 65 particles/cm$^2$, such as not greater than about 60 particles/cm$^2$, not greater than about 55 particles/cm$^2$, or even not greater than about 50 particles/cm$^2$. Still, in one non-limiting embodiment, the density of the open coat coated abrasive can be at least about 5 particles/cm$^2$, or even at least about 10 particles/cm$^2$. It will be appreciated that the density of particles per square centimeter of abrasive article can be within a range between any of the above minimum and maximum values.

In certain instances, the abrasive article can have an open coat density of not greater than about 50% of particles (i.e., abrasive particles or secondary particles or the total of abrasive particles and secondary particles) covering the exterior abrasive surface of the article. In other embodiments, the area of the particles relative to the total area of the surface on which the particles are placed can be not greater than about 40%, such as not greater than about 30%, not greater than about 25%, or even not greater than about 20%. Still, in one non-limiting embodiment, the percentage coating of the particles relative to the total area of the surface can be at least about 5%, such as at least about 10%, at least about 15%, at least about 20%, at least about 25%, at least about 30%, at least about 35%, or even at least about 40%. It will be appreciated that the percent coverage of the particles can be within a range between any of the above minimum and maximum values.

Some abrasive articles may have a particular content of particles (i.e., abrasive particles or secondary particles or the total of abrasive particles and secondary particles) for a given area (e.g., ream, wherein 1 ream=30.66 m$^2$) of the backing. For example, in one embodiment, the abrasive article may utilize a normalized weight of particles of at least about 1 lbs/ream (14.8 grams/m$^2$), such as at least 5 lbs/ream or at least 10 lbs/ream or at least about 15 lbs/ream or at least about 20 lbs/ream or at least about 25 lbs/ream or even at least about 30 lbs/ream. Still, in one non-limiting embodiment, the abrasive article can include a normalized weight of particles of not greater than about 90 lbs/ream (1333.8 grams/m$^2$), such as not greater than 80 lbs/ream or not greater than 70 lbs/ream or not greater than 60 lbs/ream or not greater than about 50 lbs/ream or even not greater than about 45 lbs/ream. It will be appreciated that the abrasive articles of the embodiments herein can utilize a normalized weight of particles within a range between any of the above minimum and maximum values.

In certain instances, the abrasive articles can be used on particular workpieces. A suitable exemplary workpiece can include an inorganic material, an organic material, a natural material, and a combination thereof. According to a particular embodiment, the workpiece can include a metal or metal alloy, such as an iron-based material, a nickel-based material, and the like. In one embodiment, the workpiece can be steel, and more particularly, can consist essentially of stainless steel (e.g., 304 stainless steel).

Figure 10:
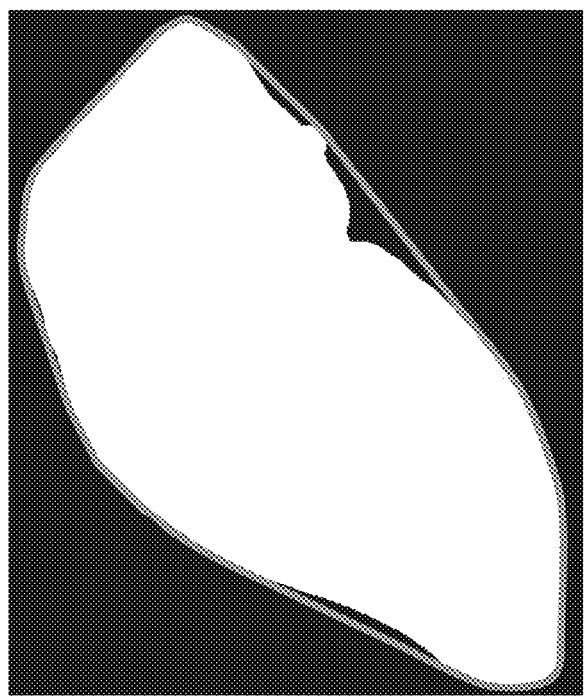
FIG. 10 includes a black and white image of an outline of a shaped abrasive particle according to an embodiment for calculation of solidity.

In still another aspect, the abrasive particles may have a particularly regular shape as defined by solidity. The solidity of the particle is measured by dividing the actual area of the body of a particle as viewed in two dimensions by a convex hull area of the body of the particle as viewed in two-dimensions. Measurement of the actual area and convex hull area of the particles can be conducted by taking images of a statistically relevant sample size of abrasive particles from a batch or a fixed abrasive article. The images can be taken by a suitable optical imaging device (e.g., Olympus DSX) at a suitable magnification (e.g., 10-20×). The images are then saved and analyzed using image processing software, such as ImageJ. A separate image is created for each abrasive particle. Each of the images of the abrasive particles is turned into a black and white only image. FIG. 10 includes a two-dimensional black and white image of an abrasive particle according to an embodiment. Using an image like the image of FIG. 10, the image processing software calculates the area in white as the actual area of the body of the particle as viewed in two-dimensions of the length and width or length and thickness. Using the image processing software, a convex hull is drawn around the perimeter of the particle using the shape filter plugin in ImageJ. The imaging processing software then calculates the area inside the convex hull. The solidity is calculated for each particle based on the actual area of each particle divided by the convex hull area. The average solidity is the average of the solidity values for all of the measured particles. The solidity standard deviation is also calculated from all of the solidity values measured from the particles in the sample.

According to one embodiment, the shaped abrasive particles can have a particular solidity that may result from the forming process and may also facilitate improved performance. For example, the shaped abrasive particles can have an average solidity of at least 0.87 or at least 0.88 or at least 0.89 or at least 0.90 or at least 0.91 or at least 0.92 or at least 0.93 or at least 0.94 or at least 0.95 or at least 0.96 or at least 0.97. In another non-limiting embodiment, the shaped abrasive particles may have an average solidity of not greater than 0.9999 or not greater than 0.99 or not greater than 0.98 or not greater than 0.97 or not greater than 0.96 or not greater than 0.95. It will be appreciated that the average solidity of the shaped abrasive particles may be within a range including any of the minimum and maximum values noted above.

In yet another aspect, the shaped abrasive particles may have a particular solidity standard deviation that can be notably distinct from other shaped abrasive particles and indicate a high degree of shape fidelity. For example, the shaped abrasive particles may have a solidity standard deviation of not greater than 0.05 or not greater than 0.045 or not greater than 0.04 or not greater than 0.035 or not greater than 0.030 or not greater than 0.025 or not greater than 0.020. In one non-limiting embodiment, the shaped abrasive particles may have a solidity standard deviation of at least 0.0001 or at least 0.001 or at least 0.01 or at least 0.015 or at least 0.020. It will be appreciated that the solidity standard deviation can be within a range including any of the minimum and maximum values noted above.

According to one embodiment, the plurality of abrasive particles can have a particular solidity that may result of the forming process and may also facilitate improved performance. For example, the plurality of abrasive particles can have an average batch solidity of at least 0.87 or at least 0.88 or at least 0.89 or at least 0.90 or at least 0.91 or at least 0.92 or at least 0.93 or at least 0.94 or at least 0.95 or at least 0.96 or at least 0.97. In another non-limiting embodiment, the plurality of abrasive particles may have an average batch solidity of not greater than 0.9999 or not greater than 0.99 or not greater than 0.98 or not greater than 0.97 or not greater than 0.96 or not greater than 0.95. It will be appreciated that the average batch solidity of the plurality of abrasive particles may be within a range including any of the minimum and maximum values noted above. The average batch solidity of the plurality of abrasive particles may be measured in the same manner as used to measure the average solidity of the shaped abrasive particles, but instead is measured on a sample representative of a batch or a fixed abrasive article.

In yet another aspect, the plurality of abrasive particles may have a particular batch solidity standard deviation that can be notably distinct from other shaped abrasive particles and indicate a high degree of shape fidelity. For example, the plurality of abrasive particles may have a batch solidity standard deviation of not greater than 0.05 or not greater than 0.045 or not greater than 0.04 or not greater than 0.035 or not greater than 0.030 or not greater than 0.025 or not greater than 0.020. In one non-limiting embodiment, the plurality of abrasive particles may have a batch solidity standard deviation of at least 0.0001 or at least 0.001 or at least 0.01 or at least 0.015 or at least 0.020. It will be appreciated that the batch solidity standard deviation can be within a range including any of the minimum and maximum values noted above.

In another embodiment, the shaped abrasive particles may have a particular sharpness that may facilitate improved performance. In at least one embodiment, the body of the shaped abrasive particles can have a sharpness that is not greater than 200 microns or not greater than 180 microns or not greater than 160 microns or not greater than 140 microns or not greater than 120 microns or not greater than 110 microns or not greater than 100 microns or not greater than 90 microns or not greater than 80 microns or not greater than 70 microns. Still, in one non-limiting embodiment, the sharpness can be at least 10 microns or at least 20 microns or at least 30 microns. It will be appreciated that the sharpness can be within a range including any of the minimum and maximum values noted above. Furthermore, it will be appreciated that the sharpness values can be average sharpness calculated from a statistically relevant sample set of abrasive particles.

In another embodiment, a plurality of abrasive particles may have a particular average batch sharpness that may facilitate improved performance. In at least one embodiment, the average batch sharpness may be not greater than 200 microns or not greater than 180 microns or not greater than 160 microns or not greater than 140 microns or not greater than 120 microns or not greater than 110 microns or not greater than 100 microns or not greater than 90 microns or not greater than 80 microns or not greater than 70 microns. Still, in one non-limiting embodiment, the average batch sharpness can be at least 10 microns or at least 20 microns or at least 30 microns. It will be appreciated that the average batch sharpness can be within a range including any of the minimum and maximum values noted above.

Figure 11:
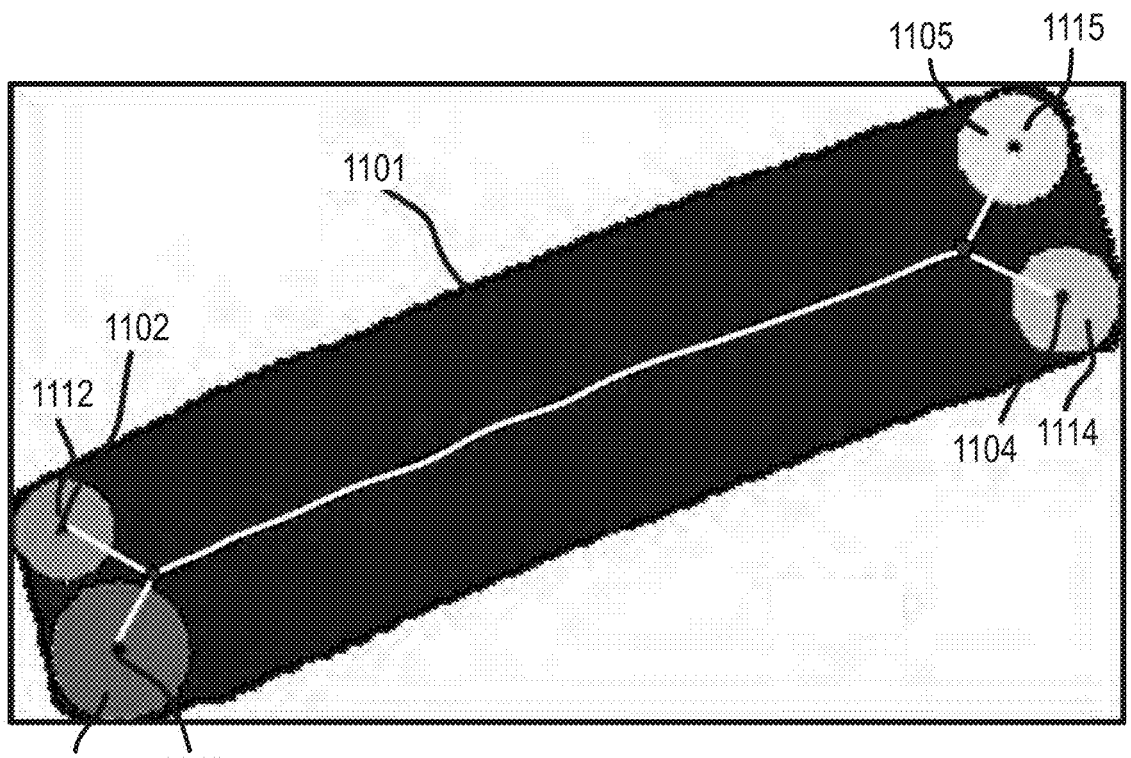
FIG. 11 includes a black and white image of an outline of a shaped abrasive particle according to an embodiment for calculation of sharpness.

Sharpness can be measured using two-dimensional imaging analysis of the abrasive particles. A plurality of shaped abrasive particles are mounted and set on a stage for imaging. Imaging may be completed via an optical microscope such as Olympus DSX 700 at a suitable magnification, such as 10-20×. After taking a suitable image of a suitable statistically relevant sample size of the particles (e.g., at least 200 particles) the images of each of the particles is saved. The sharpness is measured for each particle by image processing software (e.g., ImageJ). Each of the images is converted to a black and white image via Otsu's method where the white pixels represent the body of the particle. A skeletonized image of each particle is then created from each black and white image using the skeletonize function of the software. See FIG. 11. The distance from the boundary 1101 of the body to the terminal points 1102, 1103, 1104, and 1105 of the skeleton are evaluated by smallest fit circles 1112, 1113, 1114, and 1115 at the terminal points 1102-1105, respectively. The smallest fit circles 1112-1115 have a center at the terminal points 1102-1105 and at least one point on the circumference of each smallest fit circle 1112-1115 intersects at least a point on the boundary 1101 of the body. The number of smallest fit circles can vary depending upon the terminal points of the skeleton. The radius of each circle is measured in pixels and converted to microns. The sharpness of a single abrasive particle is an individual average of the measured radii of the smallest fit circles 1112-1115 in a single particle. An average batch sharpness can be calculated from the individual average values for all particles in the plurality of particles. As will be understood, low radii circles represent sharper corners than high radii circles, thus the lower the sharpness value, the better the relative sharpness.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A plurality of extruded shaped abrasive particles comprising an average solidity of at least 0.87.

Embodiment 2. The plurality of extruded shaped abrasive particles of embodiment 1, wherein the average solidity is at least 0.88 or at least 0.89 or at least 0.90 or at least 0.91 or at least 0.92 or at least 0.93 or at least 0.94 or at least 0.95 or at least 0.96 or at least 0.97.

Embodiment 3. The plurality of extruded shaped abrasive particles of embodiment 1, wherein the average solidity is not greater than 0.9999 or not greater than 0.99 or not greater than 0.98 or not greater than 0.97 or not greater than 0.96 or not greater than 0.95.

Embodiment 4. The plurality of extruded shaped abrasive particles of embodiment 1, wherein each of the extruded shaped abrasive particles comprises a body and striations extending along an exterior surface of the body in a direction of a length of the body.

Embodiment 5. The plurality of extruded shaped abrasive particles of embodiment 4, wherein the striations:
a) extend along a majority of an exterior surface area of the body; or
b) extend along a majority of the length of the body; or
c) extend in the direction of the length of the body on surfaces that define a width and a thickness of the body; or
any combination of a)-c).

Embodiment 6. The plurality of extruded shaped abrasive particles of embodiment 4, wherein each of the particles of the plurality of extruded shaped abrasive particles comprises a body having a plurality of side surfaces extending between the end surfaces, and wherein a majority of the side surfaces have striations.

Embodiment 7. The plurality of extruded shaped abrasive particles of embodiment 6, wherein at least one of the end surfaces is substantially free of striations.

Embodiment 8. The plurality of extruded shaped abrasive particles of embodiment 6, wherein the end surfaces are substantially free of striations.

Embodiment 9. The plurality of extruded shaped abrasive particles of embodiment 1, wherein each of the particles of the plurality of extruded shaped abrasive particles comprises a body having a plurality of side surfaces extending between the end surface, and wherein the end surfaces are substantially parallel to each other.

Embodiment 10. The plurality of extruded shaped abrasive particles of embodiment 9, wherein the end surfaces have an average parallelism not greater than 10 degrees.

Embodiment 11. The plurality of extruded shaped abrasive particles of embodiment 9, wherein the end surfaces have a parallelism at least 0.000001 degrees.

Embodiment 12. The plurality of extruded shaped abrasive particles of embodiment 9, wherein the end surfaces are cut surfaces.

Embodiment 13. The plurality of extruded shaped abrasive particles of embodiment 1, wherein each of the particles of the plurality of extruded shaped abrasive particles comprises a body having a plurality of side surfaces extending between end surfaces, and wherein the end surfaces are cut surfaces.

Embodiment 14. The plurality of extruded shaped abrasive particles of embodiment 1, wherein each of the particles of the plurality of extruded shaped abrasive particles comprises a body having a plurality of side surfaces extending between the end surface, and wherein at least one end surface has a different surface roughness as compared to at least one side surfaces.

Embodiment 15. The plurality of extruded shaped abrasive particles of embodiment 14, wherein at least one of the end surfaces has an average surface roughness Ra1 that is different than an average surface roughness of at least one side surface Ra2.

Embodiment 16. The plurality of extruded shaped abrasive particles of embodiment 15, wherein Ra1 is less than Ra2.

Embodiment 17. The plurality of extruded shaped abrasive particles of embodiment 15, wherein Ra1 is at least 10% less than Ra2 or at least 15% or at least 20% or at least 25% less than Ra2.

Embodiment 18. The plurality of extruded shaped abrasive particles of embodiment 1, wherein the body includes a plurality of side surfaces extending between end surfaces, and wherein the side surfaces have a greater surface area as compared to a total surface area of the end surfaces.

Embodiment 19. The plurality of extruded shaped abrasive particles of embodiment 1, wherein the body includes a plurality of side surfaces extending between end surfaces, and wherein at least a first end surface is joined to a first side surface at a first obtuse angle and joined to a second side surface at a first acute angle.

Embodiment 20. The plurality of extruded shaped abrasive particles of embodiment 19, wherein the first side surface and second side surface are opposite each other across a thickness or width of the body.

Embodiment 21. The plurality of extruded shaped abrasive particles of embodiment 19, wherein the first side surface is substantially parallel to the second side surface.

Embodiment 22. The plurality of extruded shaped abrasive particles of embodiment 19, wherein the first side surface is separate from the second side surface by at least one intervening side surface.

Embodiment 23. The plurality of extruded shaped abrasive particles of embodiment 19, wherein the first obtuse angle and first acute angle are supplementary angles.

Embodiment 24. The plurality of extruded shaped abrasive particles of embodiment 19, wherein the first acute angle is at least 5 degrees or at least 8 degrees or at least 10 degrees or at least 15 degrees or at least 20 degrees or at least 25 degrees or at least 30 degrees or at least 35 degrees or at least 40 degrees or at least 45 degrees.

Embodiment 25. The plurality of extruded shaped abrasive particles of embodiment 19, wherein the first acute angle is not greater than 85 degrees or not greater than 80 degrees or not greater than 70 degrees or not greater than 60 degrees or not greater than 50 degrees or not greater than 40 degrees or not greater than 30 degrees.

Embodiment 26. The plurality of extruded shaped abrasive particles of embodiment 19, wherein the first obtuse angle is at least 95 degrees or at least 100 degrees or at least 110 degrees or at least 120 degrees or at least 130 degrees or at least 140 degrees or at least 150 degrees or at least 160 degrees.

Embodiment 27. The plurality of extruded shaped abrasive particles of embodiment 19, wherein the first obtuse angle is not greater than 175 degrees or not greater than 170 degrees or not greater than 160 degrees or not greater than 150 degrees or not greater than 140 degrees or not greater than 130 degrees.

Embodiment 28. The plurality of extruded shaped abrasive particles of embodiment 19, further comprising a second end surface opposite the first end surface across a length of the body, wherein the second end surface is joined to the first side surface at a second acute angle and joined to the second side surface at a second obtuse angle.

Embodiment 29. The plurality of extruded shaped abrasive particles of embodiment 28, wherein the first obtuse angle and second acute angle are supplementary angles.

Embodiment 30. The plurality of extruded shaped abrasive particles of embodiment 28, wherein the first acute angle and second obtuse angle are supplementary angles.

Embodiment 31. The plurality of extruded shaped abrasive particles of embodiment 28, wherein the first acute angle and second acute angle are complementary angles.

Embodiment 32. The plurality of extruded shaped abrasive particles of embodiment 28, wherein the second acute angle is at least 5 degrees or at least 8 degrees or at least 10 degrees or at least 15 degrees or at least 20 degrees or at least 25 degrees or at least 30 degrees or at least 35 degrees or at least 40 degrees or at least 45 degrees.

Embodiment 33. The plurality of extruded shaped abrasive particles of embodiment 28, wherein the second acute angle is not greater than 85 degrees or not greater than 80 degrees or not greater than 70 degrees or not greater than 60 degrees or not greater than 50 degrees or not greater than 40 degrees or not greater than 30 degrees.

Embodiment 34. The plurality of extruded shaped abrasive particles of embodiment 28, wherein the first acute angle is not more than 20% different than the second acute angle or not more than 18% different or not more than 16% or not more than 14% or not more than 12% or not more than 10% or not more than 8% or not more than 6% or not more than 4% or not more than 2%.

Embodiment 35. The plurality of extruded shaped abrasive particles of embodiment 28, wherein the second obtuse angle is at least 95 degrees or at least 100 degrees or at least 110 degrees or at least 120 degrees or at least 130 degrees or at least 140 degrees or at least 150 degrees or at least 160 degrees.

Embodiment 36. The plurality of extruded shaped abrasive particles of embodiment 28, wherein the second obtuse angle is not greater than 175 degrees or not greater than 170 degrees or not greater than 160 degrees or not greater than 150 degrees or not greater than 140 degrees or not greater than 130 degrees.

Embodiment 37. The plurality of extruded shaped abrasive particles of embodiment 28, wherein the first obtuse angle is not more than 20% different than the second obtuse angle or not more than 18% different or not more than 16% or not more than 14% or not more than 12% or not more than 10% or not more than 8% or not more than 6% or not more than 4% or not more than 2%.

Embodiment 38. The plurality of extruded shaped abrasive particles of embodiment 1, wherein each of the particles of the plurality of extruded shaped abrasive particles comprises a body having a length, a width, and a thickness, wherein length>width>thickness.

Embodiment 39. The plurality of extruded shaped abrasive particles of embodiment 38, wherein the plurality of extruded abrasive particles comprises a primary aspect ratio (length/width) of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10.

Embodiment 40. The plurality of extruded shaped abrasive particles of embodiment 39, wherein the primary aspect ratio (length/width) is not greater than 1000 or not greater than 100 or not greater than 50 or not greater than 20 or not greater than 10 or not greater than 5 or not greater than 3 or not greater than 2.8.

Embodiment 41. The plurality of extruded shaped abrasive particles of embodiment 38, wherein the plurality of extruded abrasive particles comprises a primary aspect ratio standard deviation [STDEV(length/width)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15.

Embodiment 42. The plurality of extruded shaped abrasive particles of embodiment 41, wherein the primary aspect ratio standard deviation [STDEV(length/width)] is at least 0.01 or at least 0.05 or at least 0.1 or at least 0.15 or at least 0.2 or at least 0.25 or at least 0.30 or at least 0.35 or at least 0.4.

Embodiment 43. The plurality of extruded shaped abrasive particles of embodiment 38, wherein the plurality of extruded abrasive particles comprises a secondary aspect ratio (length/thickness) of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10.

Embodiment 44. The plurality of extruded shaped abrasive particles of embodiment 43, wherein the secondary aspect ratio (length/thickness) is not greater than 1000 or not greater than 100 or not greater than 50 or not greater than 20 or not greater than 10 or not greater than 5 or not greater than 3 or not greater than 2.8.

Embodiment 45. The plurality of extruded shaped abrasive particles of embodiment 38, wherein the plurality of extruded abrasive particles comprises a secondary aspect ratio standard deviation [STDEV(length/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10.

Embodiment 46. The plurality of extruded shaped abrasive particles of embodiment 45, wherein the secondary aspect ratio standard deviation [STDEV(length/thickness)] is at least 0.01 or at least 0.05 or at least 0.07 or at least 0.1 or at least 0.15 or at least 0.2 or at least 0.25 or at least 0.30 or at least 0.35 or at least 0.4.

Embodiment 47. The plurality of extruded shaped abrasive particles of embodiment 38, wherein the plurality of extruded abrasive particles comprises a tertiary aspect ratio (width/thickness) of at least 0.5 or at least 0.6 or at least 0.7 or at least 0.8 or at least 0.9 or at least 1.0 or at least 1.1 or at least 1.2 or at least 1.3 or at least 1.4 or at least 1.5 or at least 2 or at least 2.5 or at least 3 or at least 4.

Embodiment 48. The plurality of extruded shaped abrasive particles of embodiment 47, wherein the tertiary aspect ratio (width/width) is not greater than 10 or not greater than 8 or not greater than 5 or not greater than 3 or not greater than 2 or not greater than 1.5 or not greater than 1.3 or not greater than 1.1.

Embodiment 49. The plurality of extruded shaped abrasive particles of embodiment 38, wherein the plurality of extruded abrasive particles comprises a tertiary aspect ratio standard deviation [STDEV(width/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10.

Embodiment 50. The plurality of extruded shaped abrasive particles of embodiment 49, wherein the tertiary aspect ratio standard deviation [STDEV(width/thickness)] is at least 0.01 or at least 0.05 or at least 0.07 or at least 0.1 or at least 0.15 or at least 0.2 or at least 0.25 or at least 0.30 or at least 0.35 or at least 0.4.

Embodiment 51. The plurality of extruded shaped abrasive particles of embodiment 1, further comprising a solidity standard deviation of not greater than 0.05 or not greater than 0.045 or not greater than 0.04 or not greater than 0.035 or not greater than 0.030 or not greater than 0.025 or not greater than 0.020.

Embodiment 52. The plurality of extruded shaped abrasive particles of embodiment 51, wherein the solidity standard deviation is at least 0.0001 or at least 0.001.

Embodiment 53. A coated abrasive article comprising:
a substrate; and
a plurality of abrasive particles having an average solidity of at least 0.87 and less than 0.97, wherein each of the abrasive particles of the plurality of abrasive particles comprises a body and striations extending along an exterior surface of the body in a direction of a length of the body.

Embodiment 54. The coated abrasive article of embodiment 53, wherein the striations extend along a majority of an exterior surface area of the body.

Embodiment 55. The coated abrasive article of embodiment 53, wherein the striations extend along a majority of the length of the body.

Embodiment 56. The coated abrasive article of embodiment 53, wherein the striations extend in the direction of the length of the body on surfaces that define a width and a thickness of the body.

Embodiment 57. The coated abrasive article of embodiment 53, wherein each of the particles of the plurality of particles is extruded.

Embodiment 58. The coated abrasive article of embodiment 53, wherein the plurality of abrasive particles includes at least 10 grams of abrasive particles or at least 100 grams of abrasive particles or at least 500 grams of abrasive particles or at least 1 kg of abrasive particles or at least 10 kg of abrasive particles.

Embodiment 59. The coated abrasive article of embodiment 53, wherein the plurality of abrasive particles includes at least 10 abrasive particles or at least 20 abrasive particles or at least 30 abrasive particles or at least 50 abrasive particles or at least 100 abrasive particles or at least 500 abrasive particles.

Embodiment 60. The coated abrasive article of embodiment 53, wherein each of the abrasive particles comprises a body having a length, a width, and a thickness, wherein length>width>thickness.

Embodiment 61. The coated abrasive article of embodiment 53, wherein the abrasive particles have a primary aspect ratio (length/width) of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10.

Embodiment 62. The coated abrasive article of embodiment 53, wherein the primary aspect ratio (length/width) is not greater than 1000 or not greater than 100 or not greater than 50 or not greater than 20 or not greater than 10 or not greater than 5 or not greater than 3 or not greater than 2.8.

Embodiment 63. The coated abrasive article of embodiment 53, wherein the abrasive particles comprise a primary aspect ratio standard deviation [STDEV(length/width)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15.

Embodiment 64. The coated abrasive article of embodiment 53, wherein the primary aspect ratio standard deviation [STDEV(length/width)] is at least 0.01 or at least 0.05 or at least 0.1 or at least 0.15 or at least 0.2 or at least 0.25 or at least 0.30 or at least 0.35 or at least 0.4.

Embodiment 65. The coated abrasive article of embodiment 53, wherein the abrasive particles have a secondary aspect ratio (length/thickness) of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10.

Embodiment 66. The coated abrasive article of embodiment 53, wherein the secondary aspect ratio (length/thickness) is not greater than 1000 or not greater than 100 or not greater than 50 or not greater than 20 or not greater than 10 or not greater than 5 or not greater than 3 or not greater than 2.8.

Embodiment 67. The coated abrasive article of embodiment 53, wherein the abrasive particles comprise a secondary aspect ratio standard deviation [STDEV(length/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10.

Embodiment 68. The coated abrasive article of embodiment 53, wherein the secondary aspect ratio standard deviation [STDEV(length/thickness)] is at least 0.01 or at least 0.05 or at least 0.07 or at least 0.1 or at least 0.15 or at least 0.2 or at least 0.25 or at least 0.30 or at least 0.35 or at least 0.4.

Embodiment 69. The coated abrasive article of embodiment 53, wherein the abrasive particles have a tertiary aspect ratio (width/thickness) of at least 0.5 or at least 0.6 or at least 0.7 or at least 0.8 or at least 0.9 or at least 1.0 or at least 1.1 or at least 1.2 or at least 1.3 or at least 1.4 or at least 1.5 or at least 2 or at least 2.5 or at least 3 or at least 4.

Embodiment 70. The coated abrasive article of embodiment 53, wherein the tertiary aspect ratio (width/width) is not greater than 10 or not greater than 8 or not greater than 5 or not greater than 3 or not greater than 2 or not greater than 1.5 or not greater than 1.3 or not greater than 1.1.

Embodiment 71. The coated abrasive article of embodiment 53, wherein the abrasive particles comprise a tertiary aspect ratio standard deviation [STDEV(width/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10.

Embodiment 72. The coated abrasive article of embodiment 53, wherein the tertiary aspect ratio standard deviation [STDEV(width/thickness)] is at least 0.01 or at least 0.05 or at least 0.07 or at least 0.1 or at least 0.15 or at least 0.2 or at least 0.25 or at least 0.30 or at least 0.35 or at least 0.4.

Embodiment 73. The coated abrasive article of embodiment 53, wherein each of the abrasive particles of the plurality of abrasive particles comprises a body having a length, a width, and a thickness, wherein length>width>thickness.

Embodiment 74. The coated abrasive article of embodiment 73, wherein the plurality of abrasive particles comprises a primary aspect ratio [B(length/width)] of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10.

Embodiment 75. The coated abrasive article of embodiment 74, wherein the primary aspect ratio [B(length/width)] is not greater than 1000 or not greater than 100 or not greater than 50 or not greater than 20 or not greater than 10 or not greater than 5 or not greater than 3 or not greater than 2.8.

Embodiment 76. The coated abrasive article of embodiment 73, wherein the plurality of abrasive particles comprises a primary aspect ratio standard deviation [STDEV-B(length/width)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15.

Embodiment 77. The coated abrasive article of embodiment 76, wherein the primary aspect ratio standard deviation [STDEV-B(length/width)] is at least 0.01 or at least 0.05 or at least 0.1 or at least 0.15 or at least 0.2 or at least 0.25 or at least 0.30 or at least 0.35 or at least 0.4.

Embodiment 78. The coated abrasive article of embodiment 73, wherein the plurality of abrasive particles comprises a secondary aspect ratio [B(length/thickness)] of at least 1.1 or at least 1.2 or at least 1.5 or at least 2 or at least 2.5 or at least 3 or at least 3.5 or at least 4 or at least 4.5 or at least 5 or at least 5.5 or at least 6 or at least 8 or at least 10.

Embodiment 79. The coated abrasive article of embodiment 78, wherein the secondary aspect ratio [B(length/thickness)] is not greater than 1000 or not greater than 100 or not greater than 50 or not greater than 20 or not greater than 10 or not greater than 5 or not greater than 3 or not greater than 2.8 or not greater than 1.3 or not greater than 1.1.

Embodiment 80. The coated abrasive article of embodiment 73, wherein the plurality of particles comprises a secondary aspect ratio standard deviation [STDEV-B(length/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10.

Embodiment 81. The coated abrasive article of embodiment 80, wherein the secondary aspect ratio standard deviation [STDEV-B(length/thickness)] is at least 0.01 or at least 0.05 or at least 0.07 or at least 0.1 or at least 0.15 or at least 0.2 or at least 0.25 or at least 0.30 or at least 0.35 or at least 0.4.

Embodiment 82. The coated abrasive article of embodiment 73, wherein the plurality of abrasive particles comprises a tertiary aspect ratio [B(width/thickness)] of at least 0.5 or at least 0.6 or at least 0.7 or at least 0.8 or at least 0.9 or at least 1.0 or at least 1.1 or at least 1.2 or at least 1.3 or at least 1.4 or at least 1.5 or at least 2 or at least 2.5 or at least 3 or at least 4.

Embodiment 83. The coated abrasive article of embodiment 82, wherein the tertiary aspect ratio [B(width/width)] is not greater than 10 or not greater than 8 or not greater than 5 or not greater than 3 or not greater than 2 or not greater than 1.5 or not greater than 1.3 or not greater than 1.1.

Embodiment 84. The coated abrasive article of embodiment 73, wherein the plurality of abrasive particles comprises a tertiary aspect ratio standard deviation [STDEV-B (width/thickness)] of not greater than 0.55 or not greater than 0.52 or not greater than 0.50 or not greater than 0.48 or not greater than 0.45 or not greater than 0.42 or not greater than 0.40 or not greater than 0.38 or not greater than 0.35 or not greater than 0.32 or not greater than 0.30 or not greater than 0.28 or not greater than 0.25 or not greater than 0.22 or not greater than 0.20 or not greater than 0.18 or not greater than 0.15 or not greater than 0.12 or not greater than 0.10.

Embodiment 85. The coated abrasive article of embodiment 84, wherein the tertiary aspect ratio standard deviation [STDEV-B(width/thickness)] is at least 0.01 or at least 0.05 or at least 0.07 or at least 0.1 or at least 0.15 or at least 0.2 or at least 0.25 or at least 0.30 or at least 0.35 or at least 0.4.

Embodiment 86. The coated abrasive article of embodiment 53, wherein each of the abrasive particles comprises a body including a tip region including a tip of the body, a base region including a base of the body, wherein the base region is at an opposite end of the body from the tip region along a length of the body.

Embodiment 87. The coated abrasive article of embodiment 86, wherein the tip is defined by a convergence of at least 2 surfaces of the body or a convergence of at least 3 surfaces of the body or a convergence of at least 4 surfaces of the body.

Embodiment 88. The coated abrasive article of embodiment 86, wherein the tip includes a tip edge having a length that is less than an average width or average thickness of the body.

Embodiment 89. The coated abrasive article of embodiment 86, wherein the tip comprises a tip edge having a wedge shape defined by a convergence of side surfaces in the dimension of the width of the particle, wherein a tip edge length is substantially similar to a thickness of the body.

Embodiment 90. The coated abrasive article of embodiment 86, wherein the tip comprises a tip edge having a tip edge length that is not greater than 99% of the average thickness of the body or not greater than 95% or not greater than 90% or not greater than 85% or not greater than 80% or not greater than 75% or not greater than 70% or not greater than 60% or not greater than 50% or not greater than 40% or not greater than 30% of the average thickness of the body.

Embodiment 91. The coated abrasive article of embodiment 90, wherein the tip edge length is at least 20% of the average thickness of the body or at least 30% or at least 40% or at least 50% or at least 60% or at least 70% or at least 80% or at least 90% or at least 95%.

Embodiment 92. The coated abrasive article of embodiment 86, wherein the tip includes a tip edge having a length that is less than an average width of the body.

Embodiment 93. The coated abrasive article of embodiment 92, wherein the tip edge length is not greater than 99% of the average width or not greater than 95% or not greater than 90% or not greater than 85% or not greater than 80% or not greater than 75% or not greater than 70% or not greater than 60% or not greater than 50% or not greater than 40% or not greater than 30% of the average width.

Embodiment 94. The coated abrasive article of embodiment 93, wherein the tip edge length is at least 0.1% of the average width or at least 1% or at least 2% or at least 3% or at least 5% or at least 8% or at least 10% or at least 12% or at least 15% or at least 20%.

Embodiment 95. The coated abrasive article of embodiment 86, wherein the tip includes a tip edge having a length substantially similar to the thickness of the body.

Embodiment 96. The coated abrasive article of embodiment 86, wherein the tip region is defined by a taper including a reduction in the width or thickness of the body over a tip region length.

Embodiment 97. The coated abrasive article of embodiment 86, wherein the tip region is defined by a taper including a reduction in the width of the body over a tip region length.

Embodiment 98. The coated abrasive article of embodiment 97, wherein the tip region is defined by a taper including a reduction in the width and thickness of the body over a tip region length.

Embodiment 99. The coated abrasive article of embodiment 97, wherein the tip region is defined by a taper including a change in the width of the body that is greater than a change in the thickness of the body in the tip region.

Embodiment 100. The coated abrasive article of embodiment 97, wherein the tip region is defined by a taper including a change in the width of the body and wherein the thickness is substantially the same throughout the length of the tip region.

Embodiment 101. The coated abrasive article of embodiment 86, wherein the tip region comprises an asymmetric taper including a first surface and a second surface, wherein the first surface has a different contour as compared to the second surface.

Embodiment 102. The coated abrasive article of embodiment 86, wherein the base comprises a projection extending from the body, wherein the projection extends at an angle relative to a longitudinal axis of the body.

Embodiment 103. The coated abrasive article of embodiment 86, wherein the base region comprises a base including a base surface, wherein the base surface is angled relative to the longitudinal axis of the body.

Embodiment 104. The coated abrasive article of embodiment 86, wherein the base region comprises a base including a base surface, wherein the base surface is angled relative to the longitudinal axis of the body.

Embodiment 105. The coated abrasive article of embodiment 104, wherein the base surface is angled at an acute angle relative to the longitudinal axis of the body.

Embodiment 106. The coated abrasive article of embodiment 105, wherein the base surface is angled at not greater than 90 degrees relative to the longitudinal axis of the body or not greater than 88 degrees or not greater than 86 degrees or not greater than 84 degrees or not greater than 82 degrees or not greater than 80 degrees or not greater than 75 degrees or not greater than 70 degrees or not greater than 65 degrees or not greater than 60 degrees or not greater than 55 degrees or not greater than 50 degrees or not greater than 45 degrees or not greater than 40 degrees.

Embodiment 107. The coated abrasive article of embodiment 106, wherein the base surface is angled at an angle of at least 5 degrees relative to the longitudinal axis of the body or at least 10 degrees or at least 15 degrees or at least 20 degrees or at least 25 degrees or at least 30 degrees or at least 35 degrees or at least 40 degrees or at least 45 degrees or at least 50 degrees or at least 55 degrees.

Embodiment 108. The coated abrasive article of embodiment 86, wherein the base comprises a base surface including peaks and valleys.

Embodiment 109. The coated abrasive article of embodiment 108, wherein the arrangement of peaks and valleys is a random arrangement of peaks and valleys.

Embodiment 110. The coated abrasive article of embodiment 86, wherein the base comprises a base surface having a surface roughness greater than a surface roughness of a side surface of the body in an elongated region or the tip region.

Embodiment 111. The coated abrasive article of embodiment 86, wherein the base comprises a base surface having a plurality of peaks, wherein at least one peak of the plurality of peaks has a tip radius less than a tip radius of the tip of the body.

Embodiment 112. The coated abrasive article of embodiment 111, wherein at least 2 different peaks of the plurality of peaks each have a tip radius less than a tip radius of the tip of the body.

Embodiment 113. The coated abrasive article of embodiment 86, wherein the base comprises a primary peak as viewed in two dimensions define by the length and the width, wherein the primary peak comprises a primary peak angle of at least 45 degrees and not greater than 150 degrees.

Embodiment 114. The coated abrasive article of embodiment 113, wherein the primary peak angle is at least 50 degrees or at least 55 or at least 60 degrees or at least 65 degrees or at least 70 degrees or at least 75 degrees or at least 80 degrees or at least 85 degrees or at least 90 degrees or at least 95 degrees or at least 100 degrees.

Embodiment 115. The coated abrasive article of embodiment 113, wherein the primary peak angle is not greater than 145 degrees or not greater than 140 degrees or not greater than 135 degrees or not greater than 130 degrees or not greater than 125 degrees or not greater than 120 degrees or not greater than 115 degrees or not greater than 110 degrees or not greater than 100 degrees or not greater than 95 degrees.

Embodiment 116. The coated abrasive article of embodiment 86, wherein the base comprises a base surface that is defined by one or more facets having a substantially planar surface extending toward a primary peak of the base surface.

Embodiment 117. The coated abrasive article of embodiment 116, wherein the base surface comprises at least two facets that are abutting each other and define a common edge extending between the two facets.

Embodiment 118. The coated abrasive article of embodiment 86, wherein the base comprises a primary peak and a secondary peak separated from each other by a first primary valley as viewed in two-dimensions by a plane defined by the length and thickness of the body or in two-dimensions by a plane defined by the length and width of the body.

Embodiment 119. The coated abrasive article of embodiment 86, wherein the base comprises a primary peak as viewed in two dimensions define by the length and the width, wherein the primary peak comprises a tip sharpness that is greater than a tip sharpness of the tip of the body.

Embodiment 120. The coated abrasive article of embodiment 119, wherein the primary peak tip sharpness, as measured by a tip angle in two-dimensions defined by a plane of the length and width of the body, is at least 5% less than the tip sharpness of the tip of the body, wherein the tip sharpness is measured by a tip angle in two-dimensions defined by the plane of the length and width of the body or at least 8% or at least 10% or at least 12% or at least 15% or at least 20% or at least 25% or at least 30% or at least 40% or at least 50% or at least 60% or at least 70% or at least 80% or at least 90%.

Embodiment 121. The coated abrasive article of embodiment 86, further comprising an elongated region extending between the tip region and the base region.

Embodiment 122. The coated abrasive article of embodiment 121, wherein the elongated region defines a region between the tip region and the base region having a substantially constant width.

Embodiment 123. The coated abrasive article of embodiment 121, wherein the elongated region defines a region between the tip region and the base region having a substantially constant thickness.

Embodiment 124. The coated abrasive article of embodiment 121, wherein the elongated region defines a region having a change in width or thickness of not greater than 10% over the length of the elongated region or not greater than 8% or not greater than 5% or not greater than 3%.

Embodiment 125. The coated abrasive article of embodiment 86, wherein the body is linear for at least a majority of a total length of the body.

Embodiment 126. The coated abrasive article of embodiment 53, further comprising not greater than 50% of agglomerated particles for a total count of particles in the plurality of abrasive particles or not greater than 48% or not greater than 46% or not greater than 44% or not greater than 42% or not greater than 40% or not greater than 38% or not greater than 36% or not greater than 34% or not greater than 32% or not greater than 30% or not greater than 28% or not greater than 26% or not greater than 24% or not greater than 22% or not greater than 20% or not greater than 18% or not greater than 16% or not greater than 14% or not greater than 12% or not greater than 10% or not greater than 8% or not greater than 6% or not greater than 4% or not greater than 2%, wherein the plurality of abrasive particles is free of agglomerated particles.

Embodiment 127. The coated abrasive article of embodiment 86, wherein the plurality of abrasive particles comprise a taper fraction standard deviation of at least 0.025 or at least 0.028 or at least 0.030 or at least 0.032 or at least 0.035 or at least 0.038 or at least 0.040 or at least 0.042 or at least 0.045 or at least 0.048 or at least 0.050 or at least 0.052 or at least 0.055 or at least 0.058 or at least 0.060.

Embodiment 128. The coated abrasive article of embodiment 127, wherein the taper fraction standard deviation is not greater than 0.090 or not greater than 0.088 or not greater than 0.085 or not greater than 0.082 or not greater than 0.080 or not greater than 0.078 or not greater than 0.075 or not greater than 0.072 or not greater than 0.070 or not greater than 0.068 or not greater than 0.065 or not greater than 0.062 or not greater than 0.060 or not greater than 0.058 or not greater than 0.055 or not greater than 0.052 or not greater than 0.050 or not greater than 0.048 or not greater than 0.045 or not greater than 0.042 or not greater than 0.040.

Embodiment 129. The coated abrasive article of embodiment 127, wherein the taper fraction standard deviation is within a range of at least 0.025 and not greater than 0.090 or within a range of at least 0.025 and not greater than 0.085 or within a range of at least 0.028 and not greater than 0.070 or within a range of at least 0.03 and not greater than 0.06.

Embodiment 130. The coated abrasive article of embodiment 86, wherein the plurality of abrasive particles have an average taper fraction value of at least 0.05 or at least 0.08 or at least 0.1 or at least 0.12 or at least 0.14 or at least 0.16 or at least 0.18 or at least 0.20 or at least 0.22 or at least 0.24 or at least 0.26 or at least 0.28 or at least 0.30 or at least 0.32 or at least 0.34 or at least 0.35.

Embodiment 131. The coated abrasive article of embodiment 130, wherein the average taper fraction value is not greater than 0.8 or not greater than 0.75 or not greater than 0.70 or not greater than 0.65 or not greater than 0.60 or not greater than 0.55 or not greater than 0.50 or not greater than 0.45 or not greater than 0.40 or not greater than 0.35 or not greater than 0.32 or not greater than 0.30 or not greater than 0.28.

Embodiment 132. The coated abrasive article of embodiment 86, further comprising a batch taper fraction standard deviation of at least 0.025 and not greater than 0.090.

Embodiment 133. The coated abrasive article of embodiment 132, wherein the batch taper fraction standard deviation is at least 0.028 or at least 0.030 or at least 0.032 or at least 0.035 or at least 0.038 or at least 0.040 or at least 0.042 or at least 0.045 or at least 0.048 or at least 0.050 or at least 0.052 or at least 0.055 or at least 0.058 or at least 0.060.

Embodiment 134. The coated abrasive article of embodiment 133, wherein the batch taper fraction standard deviation is not greater than 0.088 or not greater than 0.085 or not greater than 0.082 or not greater than 0.080 or not greater than 0.078 or not greater than 0.075 or not greater than 0.072 or not greater than 0.070 or not greater than 0.068 or not greater than 0.065 or not greater than 0.062 or not greater than 0.060 or not greater than 0.058 or not greater than 0.055 or not greater than 0.052 or not greater than 0.050 or not greater than 0.048 or not greater than 0.045 or not greater than 0.042 or not greater than 0.040.

Embodiment 135. The coated abrasive article of embodiment 132, wherein the batch taper fraction standard deviation is within a range of at least 0.025 and not greater than 0.085 or within a range of at least 0.028 and not greater than 0.070 or within a range of at least 0.03 and not greater than 0.060.

Embodiment 136. The coated abrasive of embodiment 53, further comprising an average batch taper fraction value of at least 0.05 or at least 0.08 or at least 0.1 or at least 0.12 or at least 0.14 or at least 0.16 or at least 0.18 or at least 0.20 or at least 0.22 or at least 0.24 or at least 0.26 or at least 0.28 or at least 0.30 or at least 0.32 or at least 0.34 or at least 0.35.

Embodiment 137. The coated abrasive article of embodiment 136, further comprising an average batch taper fraction value of not greater than 0.80 or not greater than 0.75 or not greater than 0.70 or not greater than 0.65 or not greater than 0.60 or not greater than 0.55 or not greater than 0.50 or not greater than 0.45 or not greater than 0.40 or not greater than 0.35 or not greater than 0.32 or not greater than 0.30 or not greater than 0.28.

Embodiment 138. The coated abrasive article of embodiment 86, wherein each of the abrasive particles of the plurality of abrasive particles comprises a body having an elongation region, and wherein the elongation region taper fraction value is at least 0.15 or at least 0.18 or at least 0.20 or at least 0.25 or at least 0.30 or at least 0.35 or at least 0.40 or at least 0.45 or at least 0.50.

Embodiment 139. The coated abrasive article of embodiment 138, wherein the elongation region taper fraction value is not greater than 1 or not greater than 0.9 or not greater than 0.8 or not greater than 0.7 or not greater than 0.6.

Embodiment 140. The coated abrasive article of embodiment 138, further comprising an elongation region taper fraction value standard deviation of at least 0.03 or at least 0.05 or at least 0.08 or at least 0.10 or at least 0.12 or at least 0.16 or at least 0.18.

Embodiment 141. The coated abrasive article of embodiment 140, wherein the elongation region taper fraction value standard deviation is not greater than 0.3 or not greater than 0.2 or not greater than 0.18 or not greater than 0.16 or not greater than 0.15 or not greater than 0.14

Embodiment 142. The coated abrasive article of embodiment 53, wherein the average solidity is at least 0.88 or at least 0.89 or at least 0.90 or at least 0.91 or at least 0.92 or at least 0.93 or at least 0.94 or at least 0.95 or at least 0.96 or at least 0.97.

Embodiment 143. The coated abrasive article of embodiment 142, wherein the average solidity is not greater than 0.9999 or not greater than 0.99 or not greater than 0.98 or not greater than 0.95.

Embodiment 144. The coated abrasive article of embodiment 53, further comprising an average batch solidity of at least 0.87 or at least 0.88 or at least 0.89 or at least 0.90 or at least 0.91 or at least 0.92 or at least 0.93 or at least 0.94 or at least 0.95 or at least 0.96 or at least 0.97.

Embodiment 145. The coated abrasive article of embodiment 144, wherein the average batch solidity is not greater than 0.9999 or not greater than 0.99 or not greater than 0.98 or not greater than 0.95.

Embodiment 146. The coated abrasive article of embodiment 53, wherein the plurality of abrasive particles comprise a solidity standard deviation of not greater than 0.05 or not greater than 0.045 or not greater than 0.04 or not greater than 0.035 or not greater than 0.030 or not greater than 0.025 or not greater than 0.020.

Embodiment 147. The coated abrasive article of embodiment 146, wherein the solidity standard deviation is at least 0.0001 or at least 0.001.

Embodiment 148. The coated abrasive article of embodiment 53, further comprising a batch solidity standard deviation of not greater than 0.05 or not greater than 0.045 or not greater than 0.04 or not greater than 0.035 or not greater than 0.030 or not greater than 0.025 or not greater than 0.020.

Embodiment 149. The coated abrasive article of embodiment 148, wherein the batch solidity standard deviation is at least 0.0001 or at least 0.001.

Embodiment 150. A method for making shaped abrasive particles comprising:
  forming a mixture into a green body;
  sectioning the green body with minimal distortion to create a plurality of precursor shaped abrasive particles having an average solidity of at least 0.87.

Embodiment 151. The method of embodiment 150, wherein forming a mixture into a green body includes extruding the mixture through a die.

Embodiment 152. The method of embodiment 150, wherein the die comprises at least one opening that is angled relative to a primary extrusion direction.

Embodiment 153. The method of embodiment 150, wherein sectioning is conducted in a non-perpendicular plane relative to the green body longitudinal axis.

Embodiment 154. The method of embodiment 150, wherein sectioning creates at least one end surface that is a cut surface on an end of a precursor shaped abrasive particle.

Embodiment 155. The method of embodiment 150, wherein the end surface is angled with respect to the side surfaces in a non-perpendicular manner.

Embodiment 156. The method of embodiment 150, wherein each of the precursor shaped abrasive particles comprises a body having a plurality of side surfaces extending between the end surface, and wherein the end surfaces are substantially parallel to each other.

Embodiment 157. The method of embodiment 150, wherein each of the precursor shaped abrasive particles comprises a body including a plurality of side surfaces extending between end surfaces, and wherein the side surfaces have a greater surface area as compared to a total surface area of the end surfaces.

Embodiment 158. The method of embodiment 157, wherein the body includes a plurality of side surfaces extending between end surfaces, and wherein at least a first end surface is joined to a first side surface at a first obtuse angle and joined to a second side surface at a first acute angle.

Embodiment 159. The method of embodiment 158, wherein the first obtuse angle and first acute angle are supplementary angles.

Embodiment 160. The method of embodiment 158, wherein the first acute angle is at least 5 degrees or at least 8 degrees or at least 10 degrees or at least 15 degrees or at least 20 degrees or at least 25 degrees or at least 30 degrees or at least 35 degrees or at least 40 degrees or at least 45 degrees.

Embodiment 161. The method of embodiment 158, wherein the first acute angle is not greater than 85 degrees or not greater than 80 degrees or not greater than 70 degrees or not greater than 60 degrees or not greater than 50 degrees or not greater than 40 degrees or not greater than 30 degrees.

Embodiment 162. The method of embodiment 158, wherein the first obtuse angle is at least 95 degrees or at least 100 degrees or at least 110 degrees or at least 120 degrees or at least 130 degrees or at least 140 degrees or at least 150 degrees or at least 160 degrees.

Embodiment 163. The method of embodiment 158, wherein the first obtuse angle is not greater than 175 degrees or not greater than 170 degrees or not greater than 160 degrees or not greater than 150 degrees or not greater than 140 degrees or not greater than 130 degrees.

Embodiment 164. The method of embodiment 158, further comprising a second end surface opposite the first end surface across a length of the body, wherein the second end surface is joined to the first side surface at a second acute angle and joined to the second side surface at a second obtuse angle.

Embodiment 165. The method of embodiment 164, wherein the first obtuse angle and second acute angle are supplementary angles.

Embodiment 166. The method of embodiment 164, wherein the first acute angle and second obtuse angle are supplementary angles.

Embodiment 167. The method of embodiment 164, wherein the second acute angle is at least 5 degrees or at least 8 degrees or at least 10 degrees or at least 15 degrees or at least 20 degrees or at least 25 degrees or at least 30 degrees or at least 35 degrees or at least 40 degrees or at least 45 degrees.

Embodiment 168. The method of embodiment 164, wherein the second acute angle is not greater than 85 degrees or not greater than 80 degrees or not greater than 70 degrees or not greater than 60 degrees or not greater than 50 degrees or not greater than 40 degrees or not greater than 30 degrees.

Embodiment 169. The method of embodiment 164, wherein the first acute angle is not more than 20% different than the second acute angle or not more than 18% different or not more than 16% or not more than 14% or not more than 12% or not more than 10% or not more than 8% or not more than 6% or not more than 4% or not more than 2%.

Embodiment 170. The method of embodiment 164, wherein the second obtuse angle is at least 95 degrees or at least 100 degrees or at least 110 degrees or at least 120 degrees or at least 130 degrees or at least 140 degrees or at least 150 degrees or at least 160 degrees.

Embodiment 171. The method of embodiment 164, wherein the second obtuse angle is not greater than 175 degrees or not greater than 170 degrees or not greater than 160 degrees or not greater than 150 degrees or not greater than 140 degrees or not greater than 130 degrees.

Embodiment 172. The method of embodiment 164, wherein the first obtuse angle is not more than 20% different than the second obtuse angle or not more than 18% different or not more than 16% or not more than 14% or not more than 12% or not more than 10% or not more than 8% or not more than 6% or not more than 4% or not more than 2%.

Embodiment 173. The method of embodiment 150, wherein sectioning includes simultaneous sectioning of the green body during forming of the green body.

Embodiment 174. The method of embodiment 150, wherein sectioning includes continuous and simultaneous sectioning of portions of the green body while forming of the green body.

Embodiment 175. The method of embodiment 150, further comprising treating at least one surface of the green body after forming and before sectioning, wherein treating can include at least one of forming of an additive on at least one surface of the green body, forming a coating on at least a portion of the green body, wrapping at least a portion of the green body, changing the temperature of the green body.

Embodiment 176. The method of embodiment 175, wherein sectioning is conducted after treating.

Embodiment 177. The method of embodiment 150, wherein sectioning includes addition of at least one sectioning additive to the sectioning mechanism to minimize distortion of the green body during sectioning.

Embodiment 178. The method of embodiment 150, wherein the average solidity of the green body is at least 0.88 or at least 0.89 or at least 0.90 or at least 0.91 or at least 0.92 or at least 0.93 or at least 0.94 or at least 0.95 or at least 0.96 or at least 0.97.

Embodiment 179. The method of embodiment 150, wherein the average solidity of the green body is not greater than 0.9999 or not greater than 0.99 or not greater than 0.98 or not greater than 0.97 or not greater than 0.96 or not greater than 0.95.

Embodiment 180. The method of embodiment 150, further comprising sintering the green body to form a plurality of shaped abrasive particles having an average solidity of at least 0.87.

Embodiment 181. The shaped abrasive particles, fixed abrasive article, or method of any of the preceding embodiments, wherein the body of the shaped abrasive particle comprises a cross-sectional shape selected from the group consisting of a regular polygon, an irregular polygon, an ellipse, a circle or any combination thereof.

EXAMPLES

Example 1

Shaped abrasive particles were made according to the following conditions. A mixture was created including approximately 60-66 wt % boehmite, which was obtained from Sasol Corporation. One suitable type of commercially available boehmite is Disperal. The boehmite was mixed and seeded with 1% alpha alumina seeds relative to the total alumina content of the mixture. The alpha alumina seeds were made by milling of corundum using conventional techniques, described for example in U.S. Pat. No. 4,623,364. The mixture also included 34-40 wt % water and 2.5-7 wt % additional nitric acid. The ingredients were mixed in a planetary mixer of conventional design and mixed under reduced pressure to remove gaseous elements from the mixture (e.g., bubbles). The coil value was approximately 3000 N.

After gelling, the mixture was extruded into a die having a plurality of openings angled at an extrusion angle of 15 degrees relative to the major surface of the die. The die of FIG. 1B is generally representative of the die used. The extrusion rate and sectioning rate were controlled to facilitate formation of a batch of precursor shaped abrasive particles. The precursor shaped abrasive particles were dried overnight at 90 C. The precursor shaped abrasive particles were sintered between 1300-1350° C. for approximately 10 minutes to form shaped abrasive particles. The shaped abrasive particles had end surfaces disposed between side surfaces, wherein the first and second acute angles of the particles was approximately 15-30 degrees. The shaped abrasive particles of FIG. 2A are representative of the particles formed as Sample S1.

The shaped abrasive particles of Sample S1 had a square cross-sectional shape as viewed in the plane of the width and thickness. The shaped abrasive particles of Sample S1 had an average length of approximately 1.5 mm, an average width of approximately 0.6 mm microns and an average thickness of approximately 0.6 mm with a square cross-sectional shape as viewed in the elongated region in the plane of the width and thickness. The shaped abrasive particles of Sample S1 were formed essentially of a seeded sol-gel alumina material having an average grain size of less than 1 micron. The shaped abrasive particles of Sample S1 had a solidity of 0.90 with a standard deviation of approximately 0.06 as measured on 245 shaped abrasive particles.

Example 2

A second sample (i.e., Sample S2) of shaped abrasive particles were made from the mixture used to form the shaped abrasive particles of Sample S1, except that the solids loading was approximately 48-53 wt %. The mixture was extruded through a die having a plurality of openings, each of the openings having rectangular two-dimensional shape with a width of approximately 1100 microns and a thickness of approximately 550 microns. The mixture was sectioned after being extruded through the die openings. Notably, the die used to extrude the mixture of Sample S2 had openings oriented as shown in the embodiment of FIG. 1C. The precursor shaped abrasive particles were dried overnight and sintered between 1300-1350° C. for approximately 10 minutes to form shaped abrasive particles.

The shaped abrasive particles had end surfaces disposed between side surfaces, wherein the first and second acute angles of the particles were approximately 45 degrees. The shaped abrasive particles of FIG. 2B are representative of the particles formed for Sample S2.

The shaped abrasive particles of Sample S2 had a rectangular cross-sectional shape as viewed in the plane of the width and thickness. The shaped abrasive particles of Sample S2 had an average length of approximately 1.46 mm, an average width of approximately 540 microns and an average thickness of approximately 270 microns. The shaped abrasive particles of Sample S1 were formed essentially of a seeded sol-gel alumina material having an average grain size of less than 1 micron. The shaped abrasive particles of Sample S2 had a solidity of 0.94 with a standard deviation of approximately 0.05 as measured on 100 shaped abrasive particles.

A third group of shaped abrasive particles (Sample S3) was formed according to the process used to form the shaped abrasive particles of Sample S2, except that the bodies had a square cross-sectional shape as viewed in the plane defined by width and thickness of the particles. The width and thickness each had dimensions of approximately 550 microns. The average length and solidity of the particles of Sample S3 were substantially the same as for Sample S2.

A fourth group of shaped abrasive particles (Sample S4) was formed according to the process used to form the shaped abrasive particles of Sample S2, except that the bodies had a triangular cross-sectional shape as viewed in the plane defined by width and thickness of the particles. The cross-sectional shape was an isosceles triangle with a width of approximately 1500 microns and thickness of approximately 1100 microns. The average length and solidity of the particles of Sample S3 were substantially the same as for Sample S2.

Example 3

The shaped abrasive particles of Samples S1 and S2 are tested according to a single grit grinding test (SGGT) in two different orientations: 1) a front orientation; and 2) a side orientation, wherein in a front orientation the tall side of the bevel is the first to contact the workpiece, and in a side orientation, the particle is rotated 90 degrees about the length of the body wherein a portion of the tip of the bevel is in contact with the workpiece initially. In conducting the SGGT, one single abrasive particle is held in a grit holder by a bonding material of epoxy. The abrasive particle is secured in the desired orientation (i.e., tip region up orientation or base region up orientation) and moved across a workpiece of 304 stainless steel or Inconel (as reported for a given test) for a scratch length of 8 inches using a wheel speed of 22 m/s and an initial scratch depth of 30 microns. The abrasive particle produces a groove in the workpiece having a cross-sectional area (AR). For each sample set, each shaped abrasive particle completes 15 passes across the 8 inch length, 10 individual particles are tested for each of the orientation and the results are analyzed. The test measures the forces exerted by the grit on the workpiece. The tangential force (Ft) is in the direction that is parallel to the surface of the workpiece and the direction of the groove. The normal force (Fn) perpendicular to the surface of the workpiece is also measured. The combination of manual touch-off by infeeding a spinning grain slowly at micron intervals and net change in the measured cross-sectional area of the groove from beginning to the end of the scratch length is used to determine the shaped abrasive particle wear. The net change in the cross-sectional area of the groove for each pass can be measured. For the SGGT, the net cross-sectional area of the groove is defined as the difference between the cross-sectional area of the groove below the surface and the cross-sectional area of the material displaced above the surface. Performance (Ft/A or Fn/A) is defined as the ratio of the tangential or normal force to the net cross-sectional area of the groove.

Figure 12A:
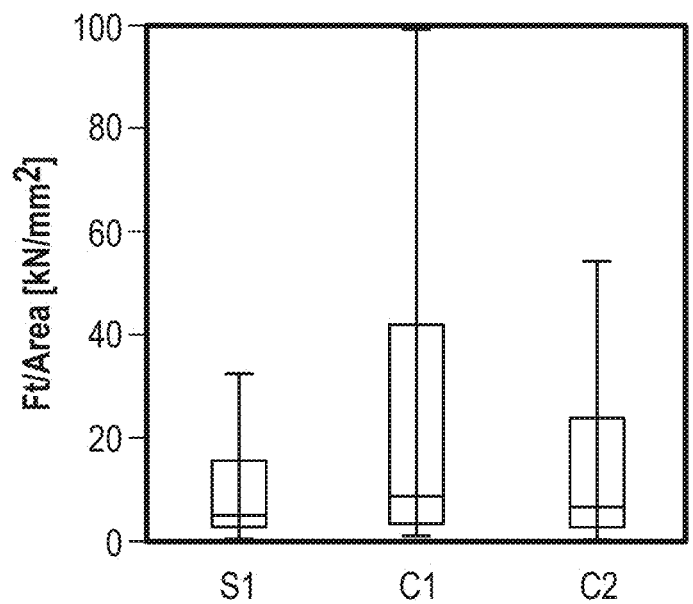
FIGS. 12A and 12B include plots of force/area for various abrasive particle samples, including shaped abrasive particles of embodiments herein and conventional abrasive particles.
Figure 12B:
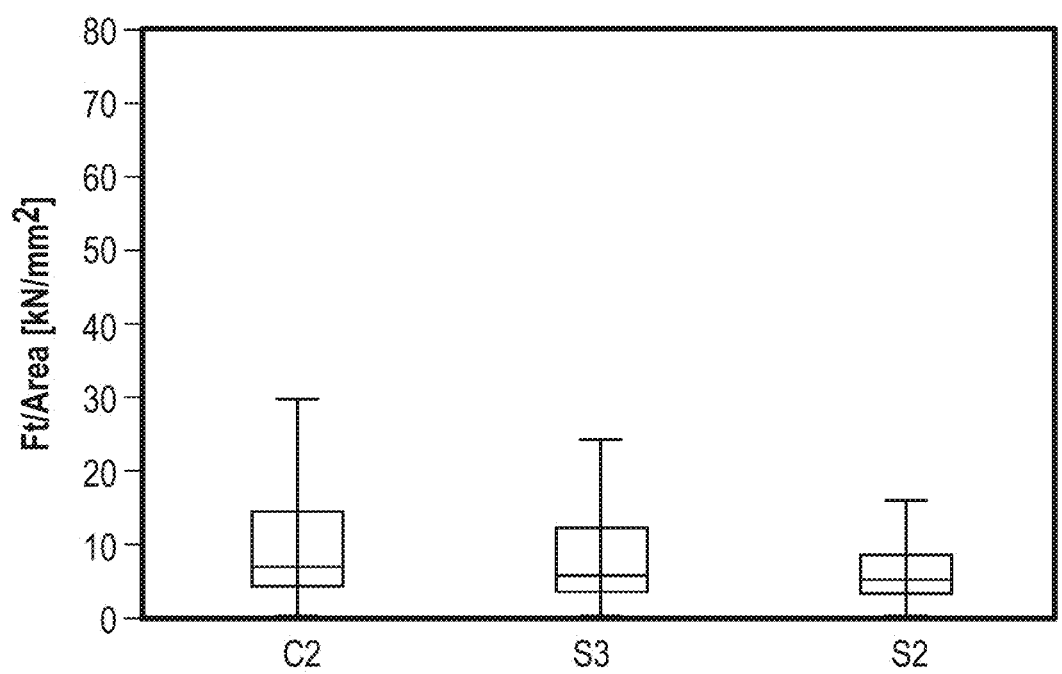

FIG. 12A includes a plot of median force per total area removed from the workpiece for Sample S1 as compared to conventionally extruded abrasive particles (Sample C1), commercially available from Saint-Gobain as Targa, generally formed according to U.S. Pat. No. 5,090,968A, and randomly shaped crushed grains (Sample C2) on 304 SS. For these particular results, the grains had a random orientation and no particular side or front orientation. FIG. 12B includes a plot of median force per total area removed from the workpiece (718 Inconel) for Sample S2, Sample S3, and randomly shaped crushed grains (Sample C2).

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A plurality of extruded shaped abrasive particles comprising an average solidity of at least 0.87, wherein each of the extruded shaped abrasive particles comprises a body having a length, a width, and a thickness, wherein length>width>thickness, wherein the average solidity is measured in a plane defined by the length and width and wherein the body comprises striations extending along an exterior surface of the body in a direction of a length of the body.

2. The plurality of extruded shaped abrasive particles of claim 1, wherein the average solidity is at least 0.90.

3. The plurality of extruded shaped abrasive particles of claim 1, wherein the average solidity is not greater than 0.99.

4. The plurality of extruded shaped abrasive particles of claim 1, wherein each of the particles of the plurality of extruded shaped abrasive particles comprises a body having a plurality of side surfaces extending between the end surface, and wherein the end surfaces are substantially parallel to each other.

5. The plurality of extruded shaped abrasive particles of claim 4, wherein the end surfaces have an average parallelism not greater than 10 degrees.

6. The plurality of extruded shaped abrasive particles of claim 4, wherein the end surfaces are cut surfaces.

7. The plurality of extruded shaped abrasive particles of claim 1, wherein the body includes a plurality of side surfaces extending between end surfaces, and wherein at least a first end surface is joined to a first side surface at a first obtuse angle and joined to a second side surface at a first acute angle.

8. The plurality of extruded shaped abrasive particles of claim 7, wherein the first obtuse angle and first acute angle are supplementary angles.

9. The plurality of extruded shaped abrasive particles of claim 1, wherein the plurality of extruded abrasive particles comprises a primary aspect ratio (length/width) of at least 1.1.

10. The plurality of extruded shaped abrasive particles of claim 1, wherein the plurality of extruded abrasive particles comprises a primary aspect ratio standard deviation [STDEV(length/width)] of not greater than 0.55.

11. The plurality of extruded shaped abrasive particles of claim 1, wherein the plurality of extruded abrasive particles comprises a secondary aspect ratio (length/thickness) of at least 1.1.

12. The plurality of extruded shaped abrasive particles of claim 1, wherein the plurality of extruded abrasive particles comprises a secondary aspect ratio standard deviation [STDEV(length/thickness)] of not greater than 0.55.

13. A coated abrasive article comprising:
a substrate; and
a plurality of abrasive particles having an average solidity of at least 0.87, wherein each of the abrasive particles of the plurality of abrasive particles comprises a body having a length, a width, and a thickness, wherein length>width>thickness, wherein the average solidity is measured in a plane defined by the length and width and wherein the body comprises striations extending along an exterior surface of the body in a direction of a length of the body.

14. The coated abrasive article of claim 13, wherein the abrasive particles have a primary aspect ratio (length/width) of at least 1.1.

15. The coated abrasive article of claim 13, wherein each of the abrasive particles comprises a body including a tip region including a tip of the body, a base region including a base of the body, wherein the base region is at an opposite end of the body from the tip region along a length of the body.

16. The coated abrasive article of claim 15, wherein the tip region is defined by a taper including a reduction in the width or thickness of the body over a tip region length.

17. The coated abrasive article of claim 15, wherein the base comprises a projection extending from the body, wherein the projection extends at an angle relative to a longitudinal axis of the body.

18. The abrasive particle of claim 1, wherein the abrasive particle comprises a ceramic material.

19. The abrasive particle of claim 1, wherein the abrasive particle comprises alumina.

20. The abrasive particle of claim 4, wherein at least one of the end surfaces is substantially free of striations.

21. The abrasive particle of claim 1, wherein the body comprises a theoretical density of at least about 95%.

22. The abrasive particle of claim 13, wherein the body comprises a theoretical density of at least about 95%.

* * * * *